(12) United States Patent
Mehta et al.

(10) Patent No.: US 12,197,579 B2
(45) Date of Patent: Jan. 14, 2025

(54) SYSTEMS AND METHODS IMPLEMENTING A PARALLEL SEARCH ARCHITECTURE FOR MACHINE LEARNING-BASED ACCELERATION OF DATA SECURITY, DATA SECURITY ARCHITECTURES, AND DATA SECURITY COMPLIANCE ACTIVITIES

(71) Applicant: Secureframe, Inc., San Francisco, CA (US)

(72) Inventors: Shrav Mehta, New York City, NY (US); Chintan Parikh, Atlanta, GA (US); Nicholas Hu, Denver, CO (US); Apostolos Delis, Sacramento, CA (US); Nick Roberts, Victor, ID (US)

(73) Assignee: Secureframe, Inc, San Francisco, CA (US)

( * ) Notice: Subject to any disclaimer, the term of this patent is extended or adjusted under 35 U.S.C. 154(b) by 0 days.

(21) Appl. No.: 18/534,555

(22) Filed: Dec. 8, 2023

(65) Prior Publication Data
US 2024/0265106 A1 Aug. 8, 2024

Related U.S. Application Data

(60) Provisional application No. 63/601,352, filed on Nov. 21, 2023, provisional application No. 63/455,231, filed on Mar. 28, 2023, provisional application No. 63/434,280, filed on Dec. 21, 2022, provisional application No. 63/431,185, filed on Dec. 8, 2022.

(51) Int. Cl.
*G06F 21/57* (2013.01)
*G06F 16/953* (2019.01)

(52) U.S. Cl.
CPC .......... *G06F 21/57* (2013.01); *G06F 16/953* (2019.01); *G06F 2221/034* (2013.01)

(58) Field of Classification Search
CPC ...................... G06F 16/953; G06F 2221/034
See application file for complete search history.

(56) References Cited

U.S. PATENT DOCUMENTS

| 9,747,570 | B1* | 8/2017 | Vescio | G06Q 10/0635 |
| 11,321,289 | B1* | 5/2022 | Litman | G06F 16/2465 |
| 2007/0022099 | A1* | 1/2007 | Yoshimura | G06F 16/3329 |

(Continued)

OTHER PUBLICATIONS

PCT Search Report and Written Opinion received in PCT/US23/83260, dated Mar. 5, 2024, pp. 29.

*Primary Examiner* — Mark E Hershley
(74) *Attorney, Agent, or Firm* — Padowithz Alce; Alce PLLC

(57) ABSTRACT

Systems and methods for machine learning-informed response and augmentation of incomplete queries and query artifacts that include executing parallel search engines in a machine learning pipeline based on an input of a query to retrieve one or more corpora of candidate digital artifacts, constructing a merged corpus of candidate digital artifacts based on the retrieved corpora of digital artifacts, ranking each candidate digital artifact of the merged corpus of candidate digital artifacts based on a computed relevance to the input query, and returning, via a user interface, a response to the input query based on a subset of prioritized candidate digital artifacts most relevant to the input query.

20 Claims, 33 Drawing Sheets

(56) References Cited

U.S. PATENT DOCUMENTS

| | | | |
|---|---|---|---|
| 2009/0119141 A1* | 5/2009 | McCalmont | G06Q 10/06395 705/7.41 |
| 2009/0171907 A1* | 7/2009 | Radovanovic | G06F 16/951 |
| 2009/0254572 A1* | 10/2009 | Redlich | G06Q 10/10 |
| 2011/0125734 A1* | 5/2011 | Duboue | G09B 7/00 707/723 |
| 2011/0289588 A1* | 11/2011 | Sahai | G06Q 90/00 726/25 |
| 2012/0216243 A1* | 8/2012 | Gill | G06F 21/55 726/1 |
| 2014/0201126 A1* | 7/2014 | Zadeh | A61B 5/165 706/52 |
| 2014/0272909 A1* | 9/2014 | Isensee | G09B 7/02 434/362 |
| 2016/0134654 A1* | 5/2016 | Ghent | G06F 16/9024 707/800 |
| 2016/0239487 A1* | 8/2016 | Potharaju | G06F 16/24578 |
| 2017/0041296 A1* | 2/2017 | Ford | G06F 21/64 |
| 2017/0344656 A1* | 11/2017 | Koren | G06F 16/972 |
| 2018/0268309 A1* | 9/2018 | Childress | G06F 40/237 |
| 2018/0375892 A1* | 12/2018 | Ganor | G06Q 10/0635 |
| 2019/0171438 A1* | 6/2019 | Franchitti | G06N 3/08 |
| 2019/0354583 A1* | 11/2019 | Ralhan | G06F 16/13 |
| 2020/0250213 A1* | 8/2020 | Duchin | G06F 16/319 |
| 2020/0401703 A1* | 12/2020 | Storms | G06F 21/577 |
| 2021/0034625 A1* | 2/2021 | Shah | G06F 16/248 |
| 2021/0056150 A1* | 2/2021 | Karandish | G06F 16/3329 |
| 2021/0089980 A1* | 3/2021 | Akey | G06Q 30/0203 |
| 2021/0133670 A1* | 5/2021 | Cella | G06N 3/044 |
| 2021/0201412 A1* | 7/2021 | Goh | G06Q 40/02 |
| 2021/0234885 A1* | 7/2021 | Campbell | H04L 63/20 |
| 2021/0303638 A1* | 9/2021 | Zhong | G06F 40/169 |
| 2021/0357779 A1* | 11/2021 | Kabra | G06N 5/04 |
| 2021/0397634 A1* | 12/2021 | Gerber, Jr | G06F 16/313 |
| 2022/0019624 A1* | 1/2022 | Gwozdz | G06F 40/30 |
| 2022/0036302 A1* | 2/2022 | Cella | G06N 20/00 |
| 2022/0121884 A1* | 4/2022 | Zadeh | G06N 3/006 |
| 2022/0129816 A1* | 4/2022 | Ralhan | G06F 40/216 |
| 2022/0129837 A1* | 4/2022 | Barday | H04L 67/535 |
| 2022/0245574 A1* | 8/2022 | Cella | G06Q 10/087 |
| 2022/0300999 A1* | 9/2022 | Ortiz | H04N 21/6245 |
| 2022/0358240 A1* | 11/2022 | Neal | G06F 21/6245 |
| 2022/0400130 A1* | 12/2022 | Kapoor | H04L 63/10 |
| 2023/0005360 A1* | 1/2023 | Zhou | G06N 20/20 |
| 2023/0036730 A1* | 2/2023 | Casa | G06Q 20/363 |
| 2023/0325501 A1* | 10/2023 | Chhetri | G06F 21/53 726/24 |
| 2024/0086501 A1* | 3/2024 | Osborn | G06F 21/31 |

* cited by examiner

| QUESTIONS | YES/NO | COMMENTS |
|---|---|---|
| IS THERE A RISK ASSESSMENT PROGRAM THAT HAS BEEN APPROVED BY MANAGEMENT, COMMUNICATED TO CONSTITUENTS AND AN OWNER TO MAINTAIN AND REVIEW THE PROGRAM? | YES | YES. OUR RISK MANAGEMENT POLICY IS REVIEWED BY MANAGEMENT, COMMUNICATED TO CONSTITUENTS AND MAINTAINED BY OUR SECURITY TEAM. |
| IS THERE A PROGRAM TO MANAGE THE TREATMENT OF RISKS IDENTIFIED DURING ASSESSMENTS? | YES | YES. THERE IS A PROCESS DESCRIBED IN OUR RISK ASSESSMENT PROGRAM |
| DO SUBCONTRACTORS HAVE ACCESS TO SCOPED SYSTEMS AND DATA? (BACKUP VENDORS, SERVICE PROVIDERS, EQUIPMENT SUPPORT MAINTENANCE, SOFTWARE MAINTENANCE VENDORS, DATA RECOVERY VENDORS, ETC.) IF YES, IS THERE: | YES | YES. SECUREFRAME HELPS REVIEW AND ASSESS THIRD PARTY VENDORS. |
| A DOCUMENTED VENDOR MANAGEMENT PROCESS IN PLACE FOR THE SELECTION, OVERSIGHT AND RISK ASSESSMENT OF THIRD PARTY VENDORS? | YES | YES. SECUREFRAME HELPS REVIEW AND ASSESS THIRD PARTY VENDORS. |
| DO EXTERNAL PARTIES HAVE ACCESS TO SCOPED SYSTEMS AND DATA OR PROCESSING FACILITIES? | YES | |
| THE MATURITY OF IT MANAGEMENT PROCESSES FORMALLY EVALUATED AT LEAST ANNUALLY USING AN ESTABLISHED BENCHMARK? | YES | ALL SECUREFRAME POLICIES AND PROCEDURES ARE REVIEWED AND UPDATED NO LESS THAN ANNUALLY. |
| ARE THERE REGULAR PRIVACY RISK ASSESSMENTS CONDUCTED? IF YES, PROVIDE FREQUENCY AND SCOPE. IF NO, EXPLAIN REASON. | YES | ALL SECUREFRAME POLICIES ARE REVIEWED AND UPDATED AT LEAST ANNUALLY. |
| ARE IDENTIFIED PRIVACY RISKS AND ASSOCIATED MITIGATION PLANS FORMALLY DOCUMENTED AND REVIEWED BY MANAGEMENT? | YES | REQUIREMENTS FOR NON-DISCLOSURE CONFIDENTIALITY AGREEMENTS REFLECTING ORGANIZATIONAL DATA PROTECTION NEEDS AND OPERATIONAL DETAILS ARE IDENTIFIED, DOCUMENTED, AND REVIEWED NO LESS THAN ANNUALLY |
| ARE REASONABLE RESOURCES (IN TIME AND MONEY) ALLOCATED TO MITIGATING IDENTIFIED PRIVACY RISKS? | YES | SECUREFRAME'S SYSTEMS, PRODUCTS, AND BUSINESS PRACTICES ARE BASED ON PRIVACY PRINCIPLES BY DESIGN AND IN ACCORDANCE WITH INDUSTRY BEST PRACTICES AND COMPLIANCE OBLIGATIONS. |
| IS THERE A COMPLIANCE RISK MANAGEMENT SYSTEM THAT ADDRESSES THE QUALITY AND ACCURACY OF REPORTED CONSUMER DATA? | YES | SECUREFRAME'S RISK MANAGEMENT POLICY IS REVIEWED BY MANAGEMENT, COMMUNICATED TO CONSTITUENTS AND MAINTAINED BY OUR SECURITY TEAM. NICKY HAS EDITED THIS RESPONSE AGAIN |
| IS THERE A COMPLIANCE RISK MANAGEMENT SYSTEM THAT ADDRESSES THE QUALITY OF ASSEMBLING AND MAINTAINING THE DATA? | YES | YES. OUR RISK MANAGEMENT POLICY IS REVIEWED BY OUR SECURITY TEAM. NICKY HAS EDITED THIS RESPONSE AGAIN |
| IS THERE AN INFORMATION SECURITY POLICY THAT HAS BEEN APPROVED BY MANAGEMENT, COMMUNICATED TO APPROPRIATE CONSTITUENTS AND AN OWNER TO MAINTAIN AND REVIEW THE POLICY? | YES | YES. SHRAV MEHTA IS OUR CISO AND IS RESPONSIBLE FOR OUR SECURITY INITIATIVES |
| C. ORGANIZATIONAL SECURITY | | |
| IS THERE AN INFORMATION SECURITY OFFICER FUNCTION RESPONSIBLE FOR SECURITY INITIATIVES? | YES | YES. SHRAV MEHTA IS OUR CISO AND IS RESPONSIBLE FOR OUR SECURITY INITIATIVES |
| D. ASSET AND INFORMATION MANAGEMENT | | |
| IS THERE AN ASSET MANAGEMENT POLICY APPROVED BY MANAGEMENT, COMMUNICATED TO CONSTITUENTS AND AN OWNER TO MAINTAIN AND REVIEW? | YES | ALL SECUREFRAME POLICIES ARE REVIEWED AND UPDATED NO LESS THAN ANNUALLY. |
| ARE ENCRYPTION TOOLS MANAGED AND MAINTAINED FOR SCOPED DATA? | YES | APPROPRIATE DATA PROTECTION ENCRYPTION ALGORITHMS ARE USED AND CONSIDER DATA CLASSIFICATION, ASSOCIATED RISKS, AND ENCRYPTION TECHNOLOGY USABILITY WHEN APPLICABLE AND IN ACCORDANCE WITH COMPLIANCE OBLIGATIONS. |
| IS THERE A DATA CLASSIFICATION RETENTION PROGRAM THAT IDENTIFIES THE DATA TYPES THAT REQUIRE ADDITIONAL MANAGEMENT AND GOVERNANCE? | YES | SECUREFRAME MAINTAINS A DATA CLASSIFICATION POLICY. |
| IS THERE A SELF-SERVICE PORTAL OR API CALL AVAILABLE TO CLIENTS WHICH PROVIDES THE ABILITY TO PLACE A LEGAL HOLD ON CLIENT DATA WHICH MAY BE SUBJECT TO A LEGAL ACTION, WITHOUT IMPACTING EITHER CLIENTS DATA RETENTION OR DESTRUCTION SCHEDULES? | YES | SECUREFRAME DOES NOT REQUIRE OR PROACTIVELY COLLECT PERSONAL DATA AS PART OF ITS SERVICES TO ITS CUSTOMERS. ANY PERSONAL DATA PROVIDED TO SECUREFRAME BY ITS CUSTOMERS IS DONE VOLUNTARILY AND AT WILL AND THOSE CUSTOMERS RETAIN THE CAPABILITIES TO MODIFY OR DELETE THAT DATA AT ANY TIME. |
| E. HUMAN RESOURCE SECURITY | | |
| IS THERE A HUMAN RESOURCE POLICY APPROVED BY MANAGEMENT, COMMUNICATED TO CONSTITUENTS AND AN OWNER TO MAINTAIN AND REVIEW? | YES | ALL SECUREFRAME POLICIES AND PROCEDURES ARE UPDATED NO LESS THAN ANNUALLY. |

|   | A | B | C | D | E |
|---|---|---|---|---|---|
| 1 | Domain | Question # | Details | Yes/No | Maturity Level |
| 2 | Organization and Management | 189 | Lorem ipsum dolor adipiscing elit, sed do eius labore et dolore magna. | Section | 4 |
| 3 | Organization and Management | 178 | Ut enim ad minim ve exercitation ullamco labor commodo consequat. | Subsection / Question | 3 |
| 4 | Communications | 221 | Duis aute irure dolo voluptate velit esse cillum pariatur. | Answer | 3 |
| 5 | Communications | 232 | Excepteur sint occae proident, sunt in culpa qu anim id est laborum. | Auto Select | 4 |
| 6 | Communications | 123 | Et malesuada fames ac turpis. Magna sit amet purus gravida quis blandit turpis cursus in. | | 3 |
| 7 | Communications | 104 | Quis eleifend quam adipiscing vitae | | 4 |
| 8 | Communications | 205 | A diam maecenas sed enim ut sem viverra aliquet. | | 4 |

FIGURE 20

|   | A | B | C | D | E |
|---|---|---|---|---|---|
| 1 | Domain | Question # | Details | Yes/No | Maturity Level |
| 2 | Organization and Management | 189 | Lorem ipsum dolor sit amet, consectetur adipiscing elit, sed do eiusmod tempor incididunt ut labore et dolore magna. | | 4 |
| 3 | Organization and Management | 178 | Ut enim ad minim veniam, quis nostrud exercitation ullamco laboris nisi ut aliquip ex ea commodo consequat. | | 3 |
| 4 | Communications | 221 | Duis aute irure dolor in reprehenderit in voluptate velit esse cillum dolore eu fugiat nulla pariatur. | | 3 |
| 5 | Communications | 232 | Excepteur sint occaecat cupidatat non proident, sunt in culpa qui officia deserunt mollit anim id est laborum. | | 4 |
| 6 | Communications | 123 | Et malesuada fames ac turpis. Magna sit amet purus gravida quis blandit turpis cursus in. | | 3 |
| 7 | Communications | 104 | Quis eleifend quam adipiscing vitae | | 4 |
| 8 | Communications | 205 | A diam maecenas sed enim ut sem viverra aliquet. | | 4 |

FIGURE 21

Example Subscriber Policy Parsing Scheme #1

The Security Incident Response Plan provides a systematic incident response process for all Information Security Incident(s) (defined below) that affect any of {{company_name}}'s information technology systems, network, or data, including {{company_name}} data held or services provided by third-party vendors or other service providers. From time to time, {{company_name}} may update this policy and implement different levels of security controls for different information assets, based on risk and other considerations.

This plan applies to all {{company_name}} assets utilized by personnel acting on behalf of {{company_name}} or accessing its applications, infrastructure, systems or data. All personnel are required to read, accept and follow all {{company_name}} policies and plans.

{{company_name}} has a Security Response Team (SRT) consisting of predetermined employees from key departments at {{company_name}} to manage security incidents. The SRT provides timely, organized, informed, and effective response to information security incidents to (a) avoid loss of or damage to the {{company_name}} systems, network, and data; (b) minimize economic, reputational, or other harms to {{company_name}} and its customers, employees, contractors and partners; and (c) manage litigation, enforcement, and other risks.

FIGURE 25

Example Subscriber Policy Parsing Scheme #2

Purpose and Scope

The Security Incident Response Plan provides a systematic incident response process for all Information Security Incident(s) (defined below) that affect any of {{company_name}}'s information technology systems, network, or data, including {{company_name}} data held or services provided by third-party vendors or other service providers. From time to time, {{company_name}} may update this policy and implement different levels of security controls for different information assets, based on risk and other considerations.

This plan applies to all {{company_name}} assets utilized by personnel acting on behalf of {{company_name}} or accessing its applications, infrastructure, systems or data. All personnel are required to read, accept and follow all {{company_name}} policies and plans.

Management

{{company_name}} has a Security Response Team (SRT) consisting of predetermined employees from key departments at {{company_name}} to manage security incidents. The SRT provides timely, organized, informed, and effective response to information security incidents to (a) avoid loss of or damage to the {{company_name}} systems, network, and data; (b) minimize economic, reputational, or other harms to {{company_name}} and its customers, employees, contractors and partners; and (c) manage litigation, enforcement, and other risks.

FIGURE 32

SYSTEMS AND METHODS IMPLEMENTING A PARALLEL SEARCH ARCHITECTURE FOR MACHINE LEARNING-BASED ACCELERATION OF DATA SECURITY, DATA SECURITY ARCHITECTURES, AND DATA SECURITY COMPLIANCE ACTIVITIES

CROSS-REFERENCE TO RELATED APPLICATIONS

This application claims the benefit of U.S. Provisional Patent Application No. 63/601,352, filed 21 Nov. 2023, U.S. Provisional Patent Application No. 63/455,231, filed 28 Mar. 2023, U.S. Provisional Patent Application No. 63/434,280, filed 21 Dec. 2022, and U.S. Provisional Patent Application No. 63/431,185, filed 8 Dec. 2022, which are incorporated in their entireties by this reference.

TECHNICAL FIELD

This invention relates generally to the computer-based learning field and, more specifically, to a new and useful system and method for accelerating data security and data security compliance activities.

BACKGROUND

Some entities are required to comply with information security standards, such as the Service Organization Control 2 ("SOC 2") information security standard, the International Organization for Standardization 27001 ("ISO 27001") information security standard, and/or the like. Often times, proving compliance with these information security standards may require an entity to collect or generate documentation (e.g., policy data, evidence data, etc.) that indicates how the entity complies with the requirements of a subject information security standard and/or may require that the entity provide this documentation to a third-party auditor. The third party auditor, in turn, may then evaluate such documentation to determine if the entity satisfies the requirements of a target information security standard.

This slow and tedious process is not only burdensome, time-intensive, error-prone, and expensive, but also fails to scale in instances where the entity needs to prove compliance with a voluminous number of information security standards. Accordingly, there is a need for new and useful systems and methods that enable an entity to efficiently manage compliance efforts for a growing number of information security standards.

The embodiments of the present application, described herein, provide technical solutions that address, at least, the needs described above, as well as the deficiencies of the state of the art.

BRIEF SUMMARY OF THE INVENTION(S)

In one embodiment, a computer-implemented method for machine learning-informed augmentation of incomplete query-embedded digital artifact includes, at a remote security response generation service being implemented by a distributed network of computers: receiving, via a user interface, a target security query, executing, by one or more processors, a security query search based on the target security query, wherein executing the security query search includes: (i) implementing a plurality of parallel search engines, the plurality of parallel search engines including a first search engine and a second search engine distinct from the first search engine, (ii) retrieving a first corpus of candidate digital artifacts via the first search engine based on an input of the target security query, and (iii) retrieving a second corpus of candidate digital artifacts via the second search engine based on an input of the target security query, constructing a merged corpus of candidate digital artifacts, the merged corpus comprising at least a subset of the first corpus of candidate digital artifacts and at least a subset of the second corpus of candidate digital artifacts, providing, as input, each candidate digital artifact of the merged corpus of candidate digital artifacts to a sentence transformer model to compute a relevance score for each candidate digital artifact in the merged corpus, and returning, via the user interface, a subset of prioritized candidate digital artifacts from the merged corpus of candidate digital artifacts that each have a corresponding relevance score that satisfies a relevance threshold.

In one embodiment, the method includes, if less than a threshold quantity of candidate digital artifacts in the merged corpus have corresponding relevance scores that satisfy the relevance threshold, retrieving one or more digital policy artifacts from a digital policy artifact repository based on one or more computed embedding distances, wherein each of the one or more computed embedding distances is based on a distance in a vector space between a computed embedding of each of the one or more digital policy artifacts and a computed embedding of the target security query, extracting one or more candidate responses to the target security query based on providing, as input, the target security query and each of the one or more retrieved digital policy artifacts to a response extraction model, and surfacing a subset of the one or more candidate responses via the graphical user interface.

In one embodiment, the method includes, if less than a threshold quantity of candidate digital artifacts in the merged corpus have corresponding relevance scores that satisfy the relevance threshold: constructing a security query prompt artifact comprising the target security query and one or more candidate digital artifacts from the merged corpus of candidate digital artifacts, providing, as input, the security query prompt artifact to a language generative machine learning model, and returning one or more candidate responses output by the language generative machine learning model via the graphical user interface.

In one embodiment, implementing the plurality of parallel search engines includes implementing the first search engine, wherein implementing the first search engine includes: constructing a security query embedding based on an input of the target security query to an embeddings model, computing an artifact embedding distance for each of one or more security digital artifacts, wherein computing the artifact embedding distance comprises computing a distance in a vector space between the security query embedding and an embedding of a corresponding security digital artifact of the one or more security digital artifacts, and retrieving a number n of security digital artifacts as the first corpus of candidate digital artifacts, wherein each of the n number of security digital artifacts has a corresponding artifact embedding distance that satisfies an embedding distance threshold.

In one embodiment, implementing the plurality of parallel search engines includes implementing the second search engine, wherein implementing the second search engine includes: extracting one or more tokens from the target security query based on a tokenizing scheme, computing a token frequency score for each security query artifact in a historical corpus of security query artifacts based on a token frequency for each token extracted from the target security query, and retrieving a number m of security query artifacts of the historical corpus of security query artifacts as the first corpus of candidate digital artifacts, wherein each of the m number of security query artifacts has a corresponding token frequency score that satisfies a token frequency threshold.

In one embodiment, the first corpus of candidate digital artifacts and the second corpus of candidate digital artifacts are returned from a historical corpus of completed query-embedded digital artifacts.

In one embodiment, the method includes, at the remote security response generation service: receiving, via the user interface, a user verification of a distinct prioritized candidate digital artifact of the subset of prioritized candidate digital artifacts for the target security query and identifying the distinct prioritized candidate digital artifact as a confirmed response digital artifact for the target security query.

In one embodiment, the method includes, at the remote security response generation service: sorting the candidate digital artifacts in the merged corpus of candidate digital artifacts in a sorting order based on the computed relevance score for each candidate digital artifact, wherein the subset of prioritized candidate digital artifacts is returned in a sorted list based on the sorting order.

In one embodiment, the target security query is one of a plurality of security queries of a query-embedded digital artifact, wherein the query-embedded digital artifact includes one or more incomplete query-answer sets that each include a security query and at least one empty answer value.

In one embodiment, the method includes, at the remote security response generation service: automatically appending query tag metadata to each security query of the query-embedded digital artifact.

In one embodiment, the relevance score for each candidate digital artifact indicates a degree of likelihood that the candidate digital artifact is relevant for responding to the target query, and the relevance threshold comprises a minimum relevance score value.

In one embodiment, a computer-implemented method for machine learning-informed augmentation of incomplete query-embedded digital artifacts includes, at a remote security response generation service implemented by a distributed network of computers: receiving, via a user interface, a target security query, executing, by one or more processors, a security query search based on the target security query, wherein executing the security query search includes retrieving a first corpus of candidate digital artifacts from a first search engine based on an input of the target security query, constructing an unprocessed queue of candidate digital artifacts, the unprocessed queue including at least a subset of the first corpus of candidate digital artifacts, providing, as input, each candidate digital artifact of the unprocessed queue of candidate digital artifacts to a sentence transformer machine learning model to generate a relevance score for each candidate digital artifact in the unprocessed queue, generating one or more candidate responses to the target security query based on a subset of prioritized candidate digital artifacts, the subset of prioritized candidate digital artifacts including one or more candidate digital artifacts from the unprocessed queue that each have a corresponding relevance score that satisfies a relevance threshold, and surfacing, via the user interface, the one or more candidate responses to the target security query.

In one embodiment, executing the security query search includes retrieving a second corpus of candidate digital artifacts from a second search engine distinct from the first search engine, and constructing the unprocessed queue of candidate digital artifacts includes aggregating each candidate digital artifact of the first corpus of candidate digital artifacts and each candidate digital artifact of the second corpus of candidate digital artifacts in the unprocessed queue.

In one embodiment, executing the security query search includes implementing the first search engine, where implementing the first search engine includes: constructing a security query embedding based on an input of the target security query to an embeddings model, computing an artifact embedding distance for each of one or more security digital artifacts, wherein computing the artifact embedding distance comprises computing a distance in a vector space between the security query embedding and an embedding of a corresponding security digital artifact of the one or more security digital artifacts, and retrieving a number n of security digital artifacts as the first corpus of candidate digital artifacts, wherein each of the n number of security digital artifacts has a corresponding artifact embedding distance that satisfies an embedding distance threshold.

In one embodiment, the method includes, if less than a threshold quantity of candidate digital artifacts in the unprocessed queue have corresponding relevance scores that satisfy the relevance threshold: retrieving one or more digital policy artifacts from a digital policy artifact repository based on one or more computed embedding distances, wherein each of the one or more computed embedding distances is based on a distance in a vector space between a computed embedding of each of the one or more digital policy artifacts and a computed embedding of the target security query, and extracting the one or more candidate responses to the target security query based on providing, as input, the target security query and each of the one or more retrieved digital policy artifacts to a response extraction model.

In one embodiment, the method includes, if less than a threshold quantity of candidate digital artifacts in the unprocessed queue have corresponding relevance scores that satisfy the relevance threshold: constructing a security query prompt artifact comprising the target security query and one or more candidate digital artifacts from the unprocessed queue of candidate digital artifacts, and generating the one or more candidate responses based on output by a language generative machine learning model, wherein the output of the language generative model is based on providing, as input, the security query prompt artifact to the language generative machine learning model.

In one embodiment, the target security query is one of a plurality of security queries of a query-embedded digital artifact, wherein the query-embedded digital artifact includes one or more incomplete query-answer sets that each include a security query and at least one empty answer value.

In one embodiment, a computer-implemented method for machine learning-informed augmentation of an incomplete query-embedded digital artifact includes, at a remote security response generation service implemented by a distributed network of computers: receiving, via a user interface, the incomplete query-embedded digital artifact, identifying one or more incomplete governance, risk, and compliance (GRC) query-answer sets in the incomplete query-embedded digital artifact, wherein each incomplete GRC query-answer set includes a GRC query and at least one empty answer value, computing, by one or more processors, one or more candidate response values for each of the at least one empty answer values for each incomplete GRC query-answer set, wherein computing the one or more candidate response values for each incomplete GRC query-answer set includes: (i) retrieving a first corpus of candidate historical query-answer sets based on executing a first search algorithm with an input of the GRC query of the incomplete GRC query-answer set and a second corpus of candidate historical query-answer sets based on executing a second search algorithm with an input of the GRC query of the incomplete GRC query-answer set, wherein the second search algorithm is distinct from the first search algorithm, (ii) constructing a merged corpus of candidate historical query-answer sets, the merged corpus comprising at least a subset of the first corpus of candidate historical query-answer sets and at least a subset of the second corpus of candidate historical query-answer sets, (iii) providing, as input, each candidate historical query-answer set of the merged corpus of candidate historical query-answer sets to a sentence transformer machine learning model to compute a relevance score for each candidate historical query-answer set in the merged corpus, and (iv) generating the one or more candidate response values based on a subset of prioritized candidate historical query-answer sets from the merged corpus that each have a corresponding relevance score that satisfies a relevance threshold, and surfacing the one or more candidate response values for each of the at least one empty answer values for each incomplete GRC query-answer set via the user interface.

In one embodiment, the method includes transforming the incomplete query-embedded digital artifact to a completed query-embedded digital artifact based on automatically populating each of the at least one empty answer values of each incomplete GRC query-answer set with one of the one or more candidate response values computed for the corresponding at least one empty answer value.

In one embodiment, the method includes storing the completed query-embedded digital artifact in a historical query-embedded digital artifact repository.

BRIEF DESCRIPTION OF THE FIGURES

FIGS. 4-21 illustrate example graphical user interfaces in accordance with one or more embodiments of the present application;

FIGS. 25 and 26 illustrate example results from parsing or encoding a GRC policy in accordance with one or more embodiments of the present application;

Figure 30:
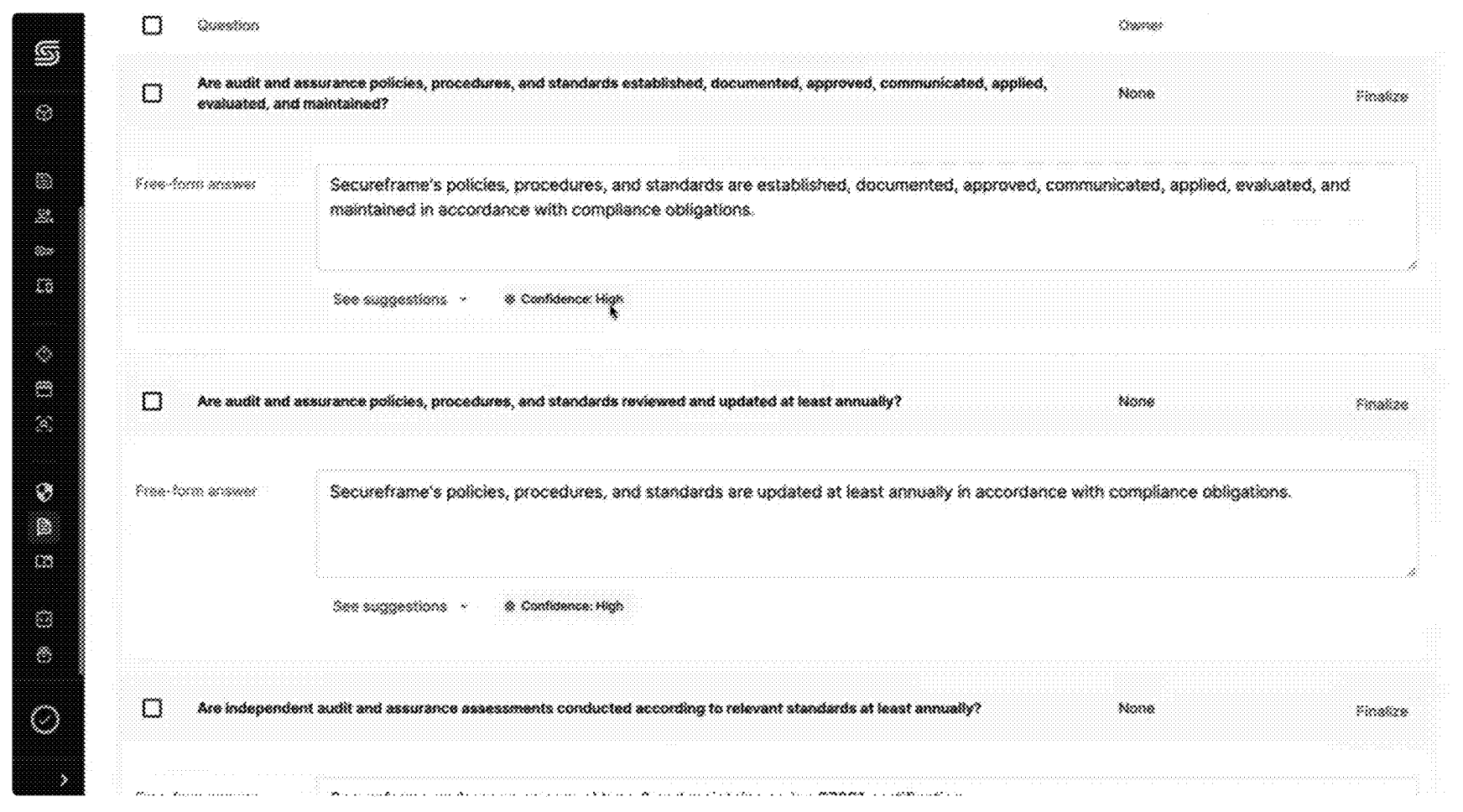
Figure 31:
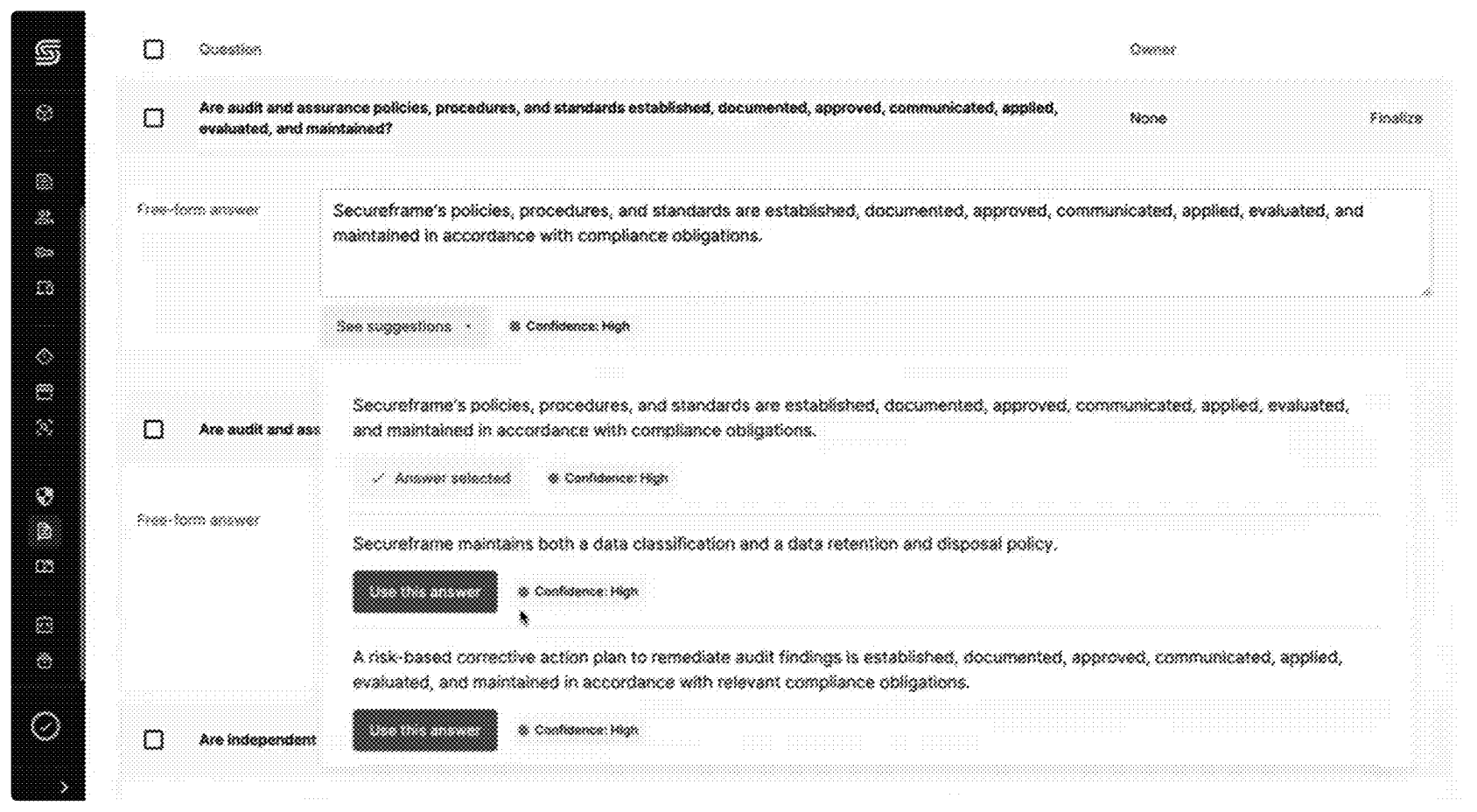

FIGS. 29-33 illustrate example graphical user interfaces in accordance with one or more embodiments of the present application.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

Figure 1:
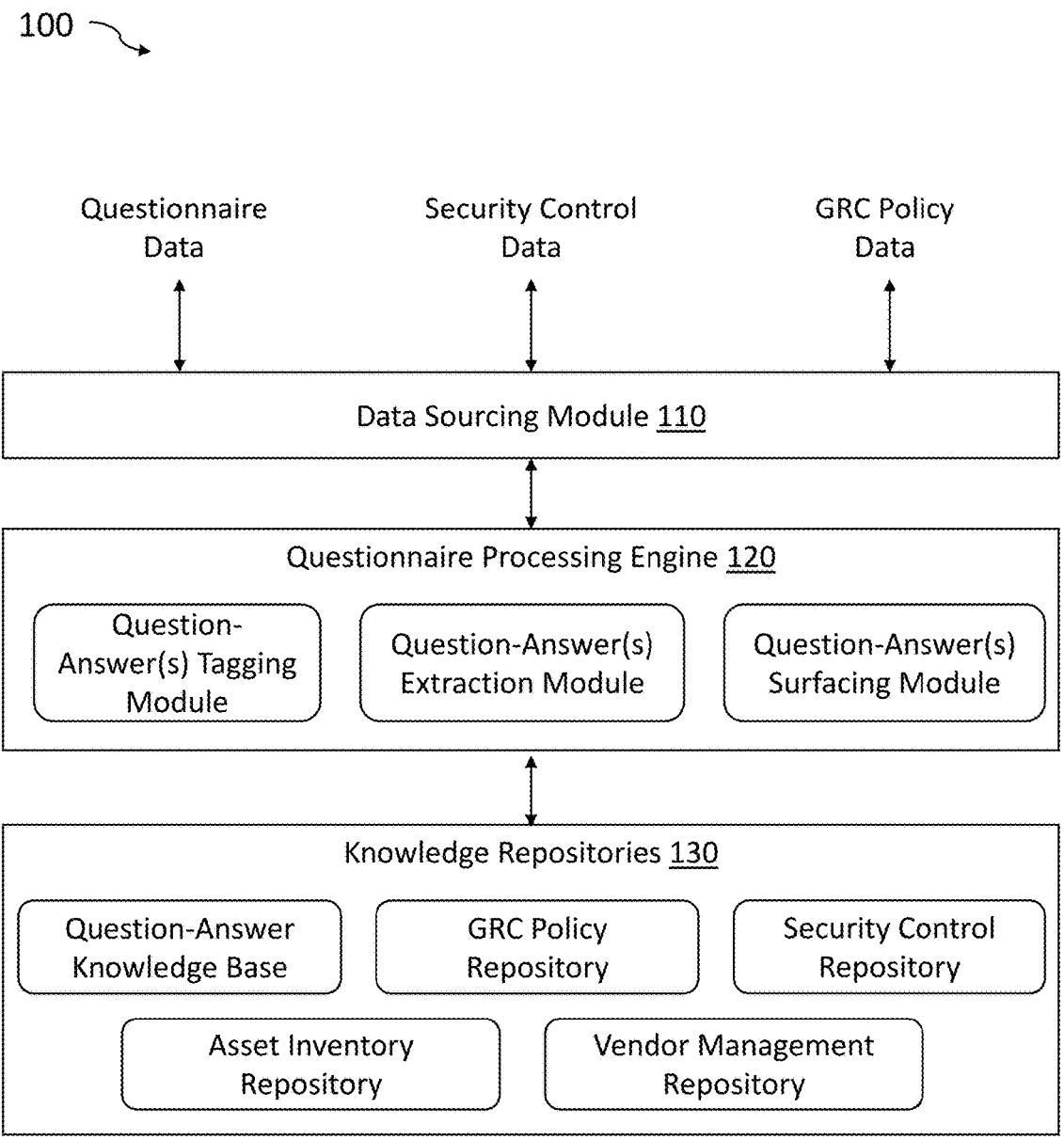
FIG. 1 illustrates a schematic representation of a system 100 in accordance with one or more embodiments of the present application.

1.00 System for Intelligently Handling and Processing Governance, Risk, and Compliance (GRC) Data As shown in FIG. 1, a system 100 for intelligently handling and processing GRC data may include a data sourcing module 110, a questionnaire processing engine 120, and one or more knowledge repositories 130.

1.10 Data Sourcing Module

The data sourcing module 110, in some embodiments, may function to ingest (or source) a corpus of knowledge-containing digital artifacts. In some examples, the data sourcing module 110 may function to implement one or more graphical user interfaces (GUIs), one or more command line interfaces (CLIs), and/or one or more application programming interfaces (APIs) that may be configured to allow a subscriber to upload (or transmit) digital artifacts to the system 100.

In some examples, the corpus of knowledge-containing digital artifacts sourced (or received) by the data sourcing module 110 may include one or more questionnaires, one or more GRC policies, one or more security controls, and/or the like. It shall be noted that a questionnaire, as generally referred to herein, may comprise one or more questions that may have been created to assess security, compliance, and privacy practices (e.g., GRC practices) of a subscriber and/or may comprise a subscriber-provided response to at least a subset of the questions defined in a target questionnaire.

Additionally, or alternatively, in some embodiments, the GRC policies sourced (or received) by the data sourcing module 110 may each relate to a distinct information technology (IT) objective and/or may include data (e.g., sentence data, paragraph data, image data, etc.) documenting the tools and processes implemented, by the subscriber, for achieving that distinct information technology objective. Likewise, in some embodiments, the security controls sourced (or received) by the data sourcing module 110 may relate to controls/safeguards implemented by the subscriber to avoid, detect, or mitigate security risks to physical property, computer systems, and/or other assets associated with the subscriber.

1.20 Questionnaire Processing Engine

The questionnaire processing engine 120 may function to process questionnaires sourced or obtained by the data sourcing module 110. The questionnaire processing engine 120, in some embodiments, may comprise a question-answer(s) tagging module, a question-answer(s) construction/extraction module, and/or a question-answer(s) surfacing module.

Question-Answer(s) Tagging Module

The question-answer(s) tagging module, in some embodiments, may function to generate (or compute) question-to-answer(s) tagging nexuses for a target questionnaire. It shall be noted that, a question-to-answer(s) tagging nexus, as generally referred to herein, may relate to a data structure that stores attributes/properties associated with a subject question and/or stores attributes/properties of one or more answers associated with the subject question.

It shall also be noted that, in some embodiments, to digitally tag pieces of content within a questionnaire, the questionnaire processing engine 120 may function to implement any suitable machine learning model or any suitable ensemble of machine learning models. The one or more ensembles of machine learning models implemented by the system 100 may employ any suitable type of machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement one or more of: a machine learning classifier, computer vision model, convolutional neural network (e.g., ResNet), visual transformer model (e.g., ViT), object detection model (e.g., R-CNN, YOLO, etc.), regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a semantic image segmentation model, an image instance segmentation model, a panoptic segmentation model, a keypoint detection model, a person segmentation model, an image captioning model, a 3D reconstruction model, a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation from transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system loo. Further, any suitable model (e.g., machine learning, non-machine learning, etc.) may be implemented in the various systems and/or methods described herein.

Question-Answer(s) Construction/Extraction Module

The question-answer(s) extraction/construction module, in some embodiments, may function to create/form one or more question-to-answer(s) data structures based on the computed (or generated) question-to-answer(s) tagging nexuses. In one implementation, the question-answer(s) extraction/construction module may function to construct the question-to-answer(s) data structures based on pieces of content tagged in the same row. Accordingly, in one example of such implementations, the question-answer(s) extraction/construction module may function to construct the question-to-answer(s) data structures by iterating through the rows of a knowledge-containing digital artifact that include tagged pieces of content and, in turn, constructing a distinct question-to-answer(s) data structure based on the pieces of content tagged in a respective row.

In some embodiments, a question-to-answer(s) data structure constructed for a target row may comprise the content tagged within the target row. For instance, in a non-limiting example, if a target row includes a piece of content tagged as question data (e.g., "Do external parties have access to Scoped Systems and Data or processing facilities?"), a piece of content tagged as binary answer data (e.g., "No"), and/or a piece of content tagged as free form answer data (e.g., "No, external parties do not have access to Scoped Systems and Data or processing facilities."), the question-to-answer(s) data structure constructed for such a row may include one or more of those pieces of content as attributes/properties of the data structure.

Question-Answer(s) Surfacing Module

The question-answer(s) surfacing module, in some embodiments, may function to surface digital representations of the constructed question-to-answer(s) data structures. It shall be noted that, in some embodiments, such surfacing may enable the subscriber to efficiently assess question-answer data extracted from a target knowledge-containing digital artifact and/or may enable the subscriber to efficiently perform any necessary adaptations to the extracted question-answer data.

In one implementation of such embodiments, the question-answer(s) surfacing module may function to surface digital representations of the question-to-answer(s) data structures via a question-to-answer(s) discovery graphical user interface. The question-to-answer(s) discovery user interface, in some embodiments, may include a digital representation corresponding to one or more (e.g., each) of the question-to-answer(s) data structures constructed by S230.

In some embodiments, a digital representation of a target question-to-answer(s) data structure may include a textual representation of the question data associated with the target question-to-answer(s) data structure, a textual representation of the binary answer data associated with the target question-to-answer(s) data structure, and/or a textual representation of the free form answer data associated with the target question-to-answer(s) data structure. Furthermore, in some embodiments, a digital representation of a respective question-to-answer(s) data structure may additionally, or alternatively, include one or more editable user interface elements that enable a subscriber to adapt question data, binary answer data, and/or free form answer data associated with a respective data structure and/or may include selectable user interface elements that, when selected, finalize/confirm the content stored within a question-to-answer(s) data structure.

1.30 Knowledge Repositories

In some embodiments, the one or more knowledge repositories 130 associated with a subscriber may be updated based on the corpus of digital artifacts sourced by the data sourcing module no and/or may be updated based on the question-to-answer(s) data structures constructed by the questionnaire processing engine 120. For instance, in one non-limiting example, the system 100 may function to automatically construct or augment a question-answer knowledge base associated with the subscriber, a governance, risk, and compliance (GRC) policy repository associated with the subscriber, a digital security control repository associated with the subscriber, an asset inventory repository associated with the subscriber, a vendor management repository associated with the subscriber, and/or the like.

Figure 2:
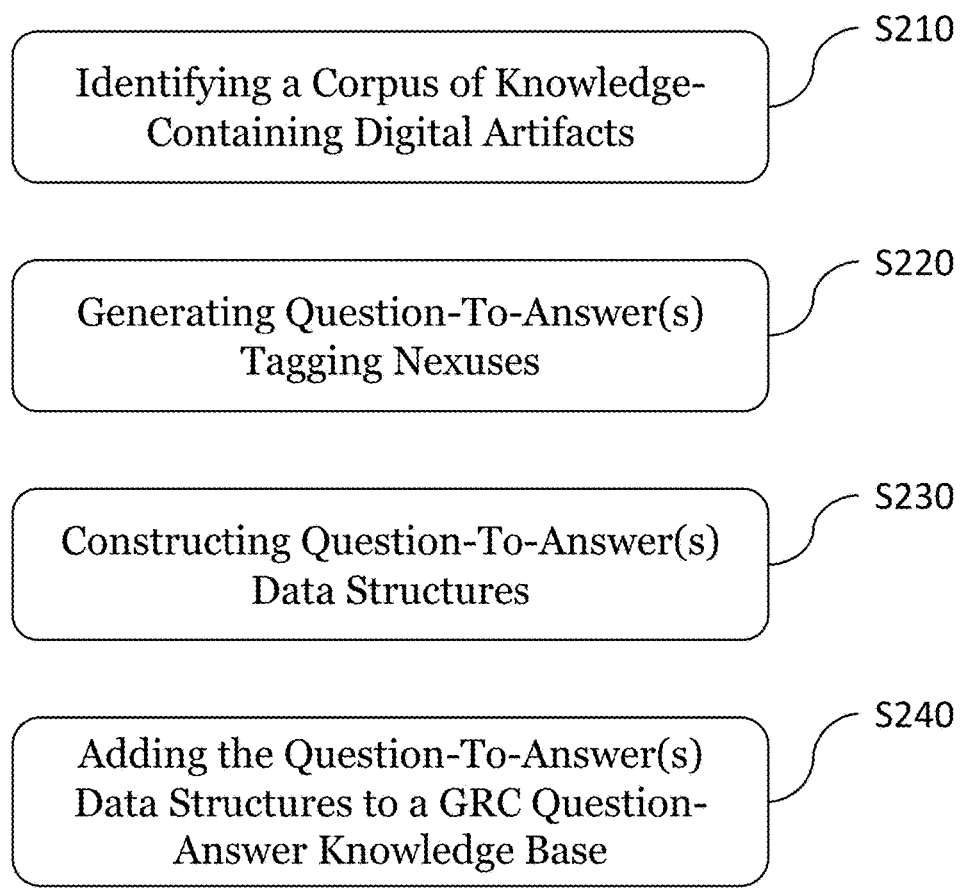
FIG. 2 illustrates an example method 200 in accordance with one or more embodiments of the present application.

2.00 Method for Intelligently Forming and Implementing a Governance, Risk, and Compliance (GRC) Question-Answer Knowledge Base As shown in FIG. 2, a method 200 for intelligently forming and implementing a governance, risk, and compliance (GRC) question-answer knowledge base may include identifying a corpus of knowledge-containing digital artifacts (S210), generating question-to-answer(s) tagging nexuses (S220), constructing question-to-answer(s) data structures (S230), and adding the question-to-answer(s) data structures to a GRC question-answer knowledge base (S240).

2.10 Identifying a Corpus of Knowledge-Containing Digital Artifacts|Identifying a GRC Data Corpus S210, which includes identifying a corpus of knowledge-containing digital artifacts, may function to ingest (or source) one or more digital artifacts from a subscriber. As will be described in more detail herein, in some embodiments, the corpus of knowledge-containing digital artifacts may support or aid the method 200 in constructing one or more distinct knowledge bases for the subscriber (and/or may support or aid the method 200 in augmenting one or more existing knowledge bases associated with the subscriber).

For instance, in one non-limiting example, based on S210 identifying the corpus of knowledge-containing digital artifacts, the method 200 may function to automatically construct or augment a question-answer knowledge base associated with the subscriber, a governance, risk, and compliance (GRC) policy repository associated with the subscriber, a digital security control repository associated with the subscriber, an asset inventory repository associated with the subscriber, a vendor management repository associated with the subscriber, and/or the like.

It shall be noted that, in some embodiments, the method 200 may function to augment only a subset of the knowledge bases (or repositories) associated with the subscriber. For instance, in a non-limiting example, if the corpus of knowledge-containing digital artifacts only includes questionnaire artifacts, the method 200 may function to only update the question-answer knowledge base associated with the subscriber and forgo updating the other knowledge bases/repositories associated with the subscriber. It shall also be noted that a questionnaire artifact, as generally referred to herein, may relate to a digital artifact comprising one or more questions that aid a third-party entity in evaluating GRC practices associated with the subscriber and/or may relate to a digital security questionnaire, a standardized information-gathering (SIG) questionnaire, a request for information (RFI) artifact, a request for proposal (RFP) artifact, a GRC assessment questionnaire, and/or the like.

Security Assessment Questionnaires

In some embodiments, the corpus of knowledge-containing digital artifacts may include one or more completed (or partially completed) security assessment questionnaires. These one or more completed (or partially completed) security assessment questionnaires, in some embodiments and as generally illustrated in FIG. 4, may comprise a list of one or more questions that may have been created by an external entity (e.g., an entity other than the subscriber) to gauge security and privacy practices of the subscriber and/or may comprise a subscriber-provided response to at least a subset of the one or more questions.

Furthermore, as also illustrated in FIG. 4, in some embodiments, a subscriber-provided response to a target question may comprise a binary response to the target question and/or may comprise a free form response to the target question. For instance, in a non-limiting example, the binary response to a target question may include the binary response/phrase 'Yes' if the security practices of the subscriber satisfy the target question or may include the binary response/phrase 'No' if the security practices of the subscriber do not satisfy the target question. It shall be noted that other types of binary answers (e.g., "True/False," "0/1," etc.) may also be indicated in a security assessment questionnaire artifact without departing from the scope of the inventions contemplated herein.

Conversely, in some embodiments, a free form response/answer to a target question may comprise unstructured sentence data, paragraph data, image data, and/or the like. For instance, in a non-limiting example, a free form answer to the question "Is there a risk assessment program that has been approved by management, communicated to constituents and an owner to maintain and review the program?" may include a text-based response/answer such as "Yes, our risk management policy is reviewed by management, communicated to constituents and maintained by our security team."

Identifying/Sourcing Security Assessment Questionnaires

In some embodiments, the one or more security assessment questionnaires may be obtained (or sourced) from a subscriber. In a first implementation of such embodiments, S210 may function to obtain/receive the one or more security assessment questionnaires via a questionnaire upload graphical user interface. As generally illustrated in FIGS. 5, 18, and 19, in some embodiments, the questionnaire upload graphical user interface may include an artifact upload user interface element that may be configured to (temporarily) store one or more digital artifacts that a subscriber has requested to be uploaded to a system (or service) implementing the method 200.

Figure 5:
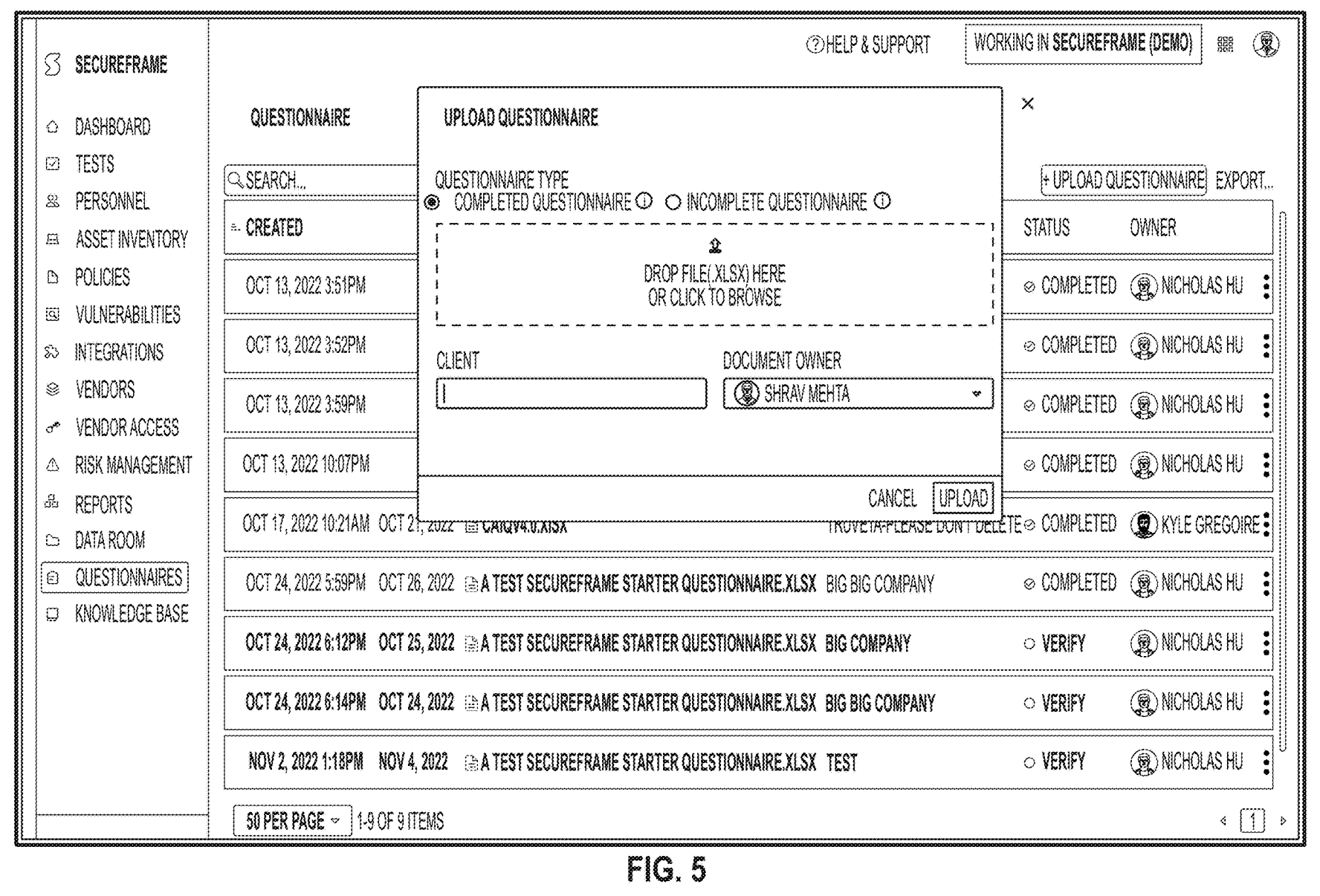
Figure 18:
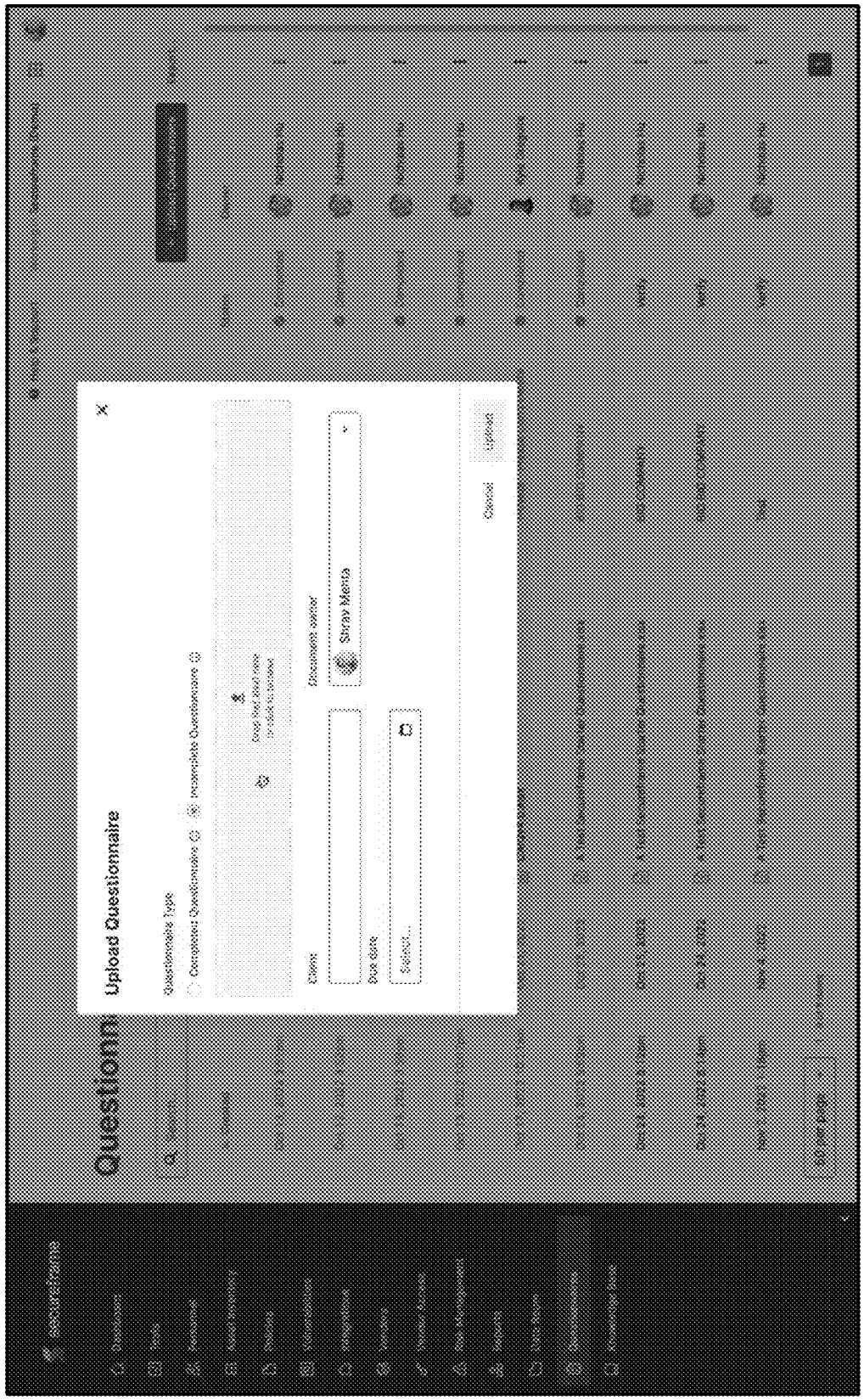
Figure 19:
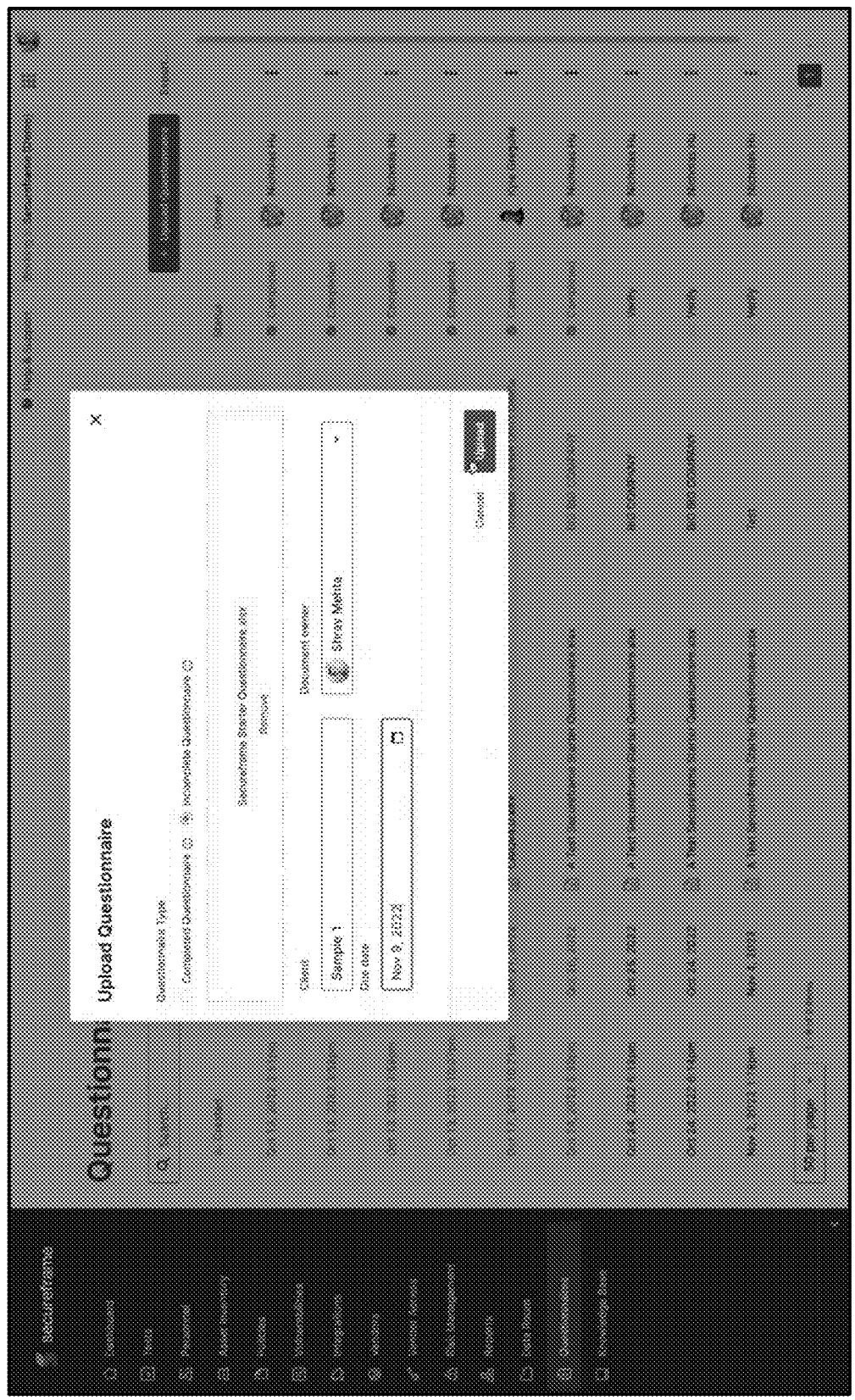

Furthermore, as also shown in FIGS. 5, 18, and 19, the questionnaire upload graphical user interface may additionally, or alternatively, include a plurality of selectable options. Example selectable options that may be displayed in the questionnaire upload graphical user interface will now be described. However, it shall be noted that the questionnaire upload graphical user interface may include additional, different, or fewer selectable options without departing from the scope of the inventions contemplated herein.

In some embodiments, the questionnaire upload graphical user interface may include a first selectable option that, when selected, indicates to the system (or service) that the digital artifact(s) being uploaded is/are "completed questionnaire(s)," and/or may include a second selectable option that, when selected, indicates to the system (or service) that the digital artifact(s) being uploaded is/are "incomplete questionnaire(s)." Additionally, or alternatively, in some embodiments, the questionnaire upload graphical user interface may include a third selectable option that, when selected, enables the subscriber to specify an owner of the digital artifacts, may include a fourth selectable option that, when selected, enables the subscriber to specify a client associated with the digital artifacts, may include a fifth selectable option that, when selected, enables the subscriber to forgo (e.g., cancel) uploading the digital artifacts to the system (or service), and/or may include a sixth selectable option that, when selected, causes the digital artifacts to be uploaded to the system (or service).

Additionally, or alternatively, in a second implementation, S210 may function to obtain/receive the one or more security assessment questionnaires via any other suitable technique. Other suitable techniques for obtaining/receiving the one or more security assessment questionnaires may include obtaining/receiving the one or more security assessment questionnaires via one or more command line interfaces (CLIs) and/or via one or more application programming interfaces (APIs) that are specifically configured to allow a subscriber to upload/transmit one or more security assessment questionnaires to the system (or service).

Identifying GRC Policy Data

In some embodiments, identifying the corpus of knowledge-containing digital artifacts may additionally, or alternatively, include identifying one or more GRC policies associated with the subscriber. These one or more GRC policies, in some embodiments, may relate to a distinct information technology (IT) objective and/or may include data (e.g., sentence data, paragraph data, text data, image data, etc.) documenting the tools and processes implemented, by the subscriber, for achieving that distinct information technology objective.

For instance, in a non-limiting example, one of the GRC policies identified by S210 may relate to an acceptable use policy that defines (e.g., documents) constraints and practices that a user must agree to before accessing a corporate network associated with the subscriber. Other example GRC policies that may be identified by S210 may include an access control and termination policy that defines (e.g., documents) how user access is managed when an employee leaves or changes roles, may include a business continuity and disaster recovery policy that defines (e.g., documents) how the subscriber plans to respond to unforeseen disruptive events, and/or the like. It shall be noted that S210 may function to identify fewer, different, or additional GRC policies without departing from the scope of the inventions contemplated herein.

It shall also be noted that, in some embodiments, as will be described in more detail herein, the identified GRC policy data may support or aid a system or service in computing response inferences (e.g., answers) for one or more future questionnaires associated with the subscriber (also referred to herein as "interrogative digital artifacts").

Identifying Security Control Data

In some embodiments, identifying the corpus of knowledge-containing digital artifacts may additionally, or alternatively, include identifying one or more security controls associated with the subscriber. These one or more security controls, in some embodiments, may relate to controls/safeguards implemented by the subscriber to avoid, detect, or mitigate security risks to physical property, computer systems, and/or other assets associated with the subscriber.

For instance, in a non-limiting example, one of the security controls identified by S210 may relate to a security control named "Audit log timestamps (Azure)." Other example security controls that may be identified by S210 may include a security control named "ECR repository image access restriction (AWS)," a security control named "Postgres SQL encryption at rest (Heroku)," and/or the like. It shall be noted that S210 may function to identify fewer, different, or additional security control data without departing from the scope of the inventions contemplated herein.

It shall also be noted that, in some embodiments, as will be described in more detail herein, the identified security controls may support or aid a system or service in computing response inferences (e.g., answers) for one or more future questionnaires associated with the subscriber (also referred to herein as "interrogative digital artifacts").

2.20 Generating Question-To-Answer(s) Tagging Nexuses|Tagging Knowledge-Containing Digital Artifacts S220, which includes generating question-to-answer(s) tagging nexuses, may function to digitally link (or digitally map) question data in a target knowledge-containing digital artifact to corresponding answer data. In some embodiments, a question-to-answer(s) tagging nexus, as generally referred to herein, may relate to a data structure that stores attributes/properties associated with a subject question and/or that stores attributes/properties of one or more answer(s) associated with the subject question.

For instance, in a non-limiting example, a question-to-answer(s) tagging nexus generated for a subject question may store question-related attributes/properties such as a digital location of the subject question in the target knowledge-containing digital artifact (e.g., {Column A, Row 2}, a memory address, and or the like), a textual representation of the subject question (e.g., "Is there a program to manage the treatment of risking identified during assessments?"), and/or the like. Furthermore, in some examples, the question-to-answer(s) tagging nexus generated for the subject question may additionally, or alternatively, store answer-related attributes/properties for the subject question such as a digital location of a binary answer associated with the subject question (e.g., {Column B, Row 2}, a memory address, and/or the like), a textual representation of the binary answer (e.g., "Yes"), a digital location of a free form/unstructured answer associated with the subject question (e.g., {Column C, Row 2}, a memory address, and/or the like), a textual representation of the free form answer (e.g., "Yes, our risk management policy is reviewed by management, communicated to constituents and maintained by our security team."), and/or the like.

It shall be noted that, in some embodiments, if the corpus of knowledge-containing digital artifacts includes a plurality of digital artifacts, S220 may function to sequentially or contemporaneously perform the techniques/processes described herein for each of the plurality of digital artifacts. Similarly, it shall also be noted that, in some embodiments, if the corpus of knowledge-containing digital artifacts includes a plurality of different kinds/types of digital artifacts, such as security control data, GRC policy data, security assessment questionnaires, S220 may function to perform the techniques/processes described herein for a subset of the digital artifacts (e.g., security assessment questionnaires) and forgo performing the technique/processes described herein for other types of digital artifacts (e.g., GRC policy data, security control data, and/or the like).

Generating Question-to-Answer Tagging Nexuses for Tabular Artifacts

In some embodiments, S220 may function to generate question-to-answer tagging nexuses for knowledge-containing digital artifacts that may be of a tabular format (e.g., comprise rows and columns). For instance, in a non-limiting example and as generally illustrated in FIG. 4, S220 may function to generate question-to-answer tagging nexuses for knowledge-containing digital artifacts that may include questions arranged along a first column (e.g., Column A), binary answers arranged along a second column (e.g., Column B), and free form/unstructured answers arranged along a third column (e.g., Column C).

It shall be noted that, in some embodiments and as also illustrated in FIG. 4, the knowledge-containing digital artifact(s) being assessed by S220 may additionally, or alternatively, include column headers (e.g., "Questions," "Yes/No," "Comments," etc.) and/or may include section headers that indicate different groupings of content.

Subscriber-Informed Tagging

In some embodiments, S220 may request that a subscriber digitally tag a row, in the knowledge-containing digital artifact, that contains the "head question" (e.g., the first question of a list of questions). In one example of such embodiments, tagging such a row may include tagging a data structure (e.g., digital cell) that includes the "head question" as question data, tagging a data structure (e.g., digital cell) that includes a binary answer associated with the "head question" as binary answer data, and/or tagging a data structure (e.g., digital cell) that includes an unstructured answer associated with the "head question" as free form answer data.

Figure 6:
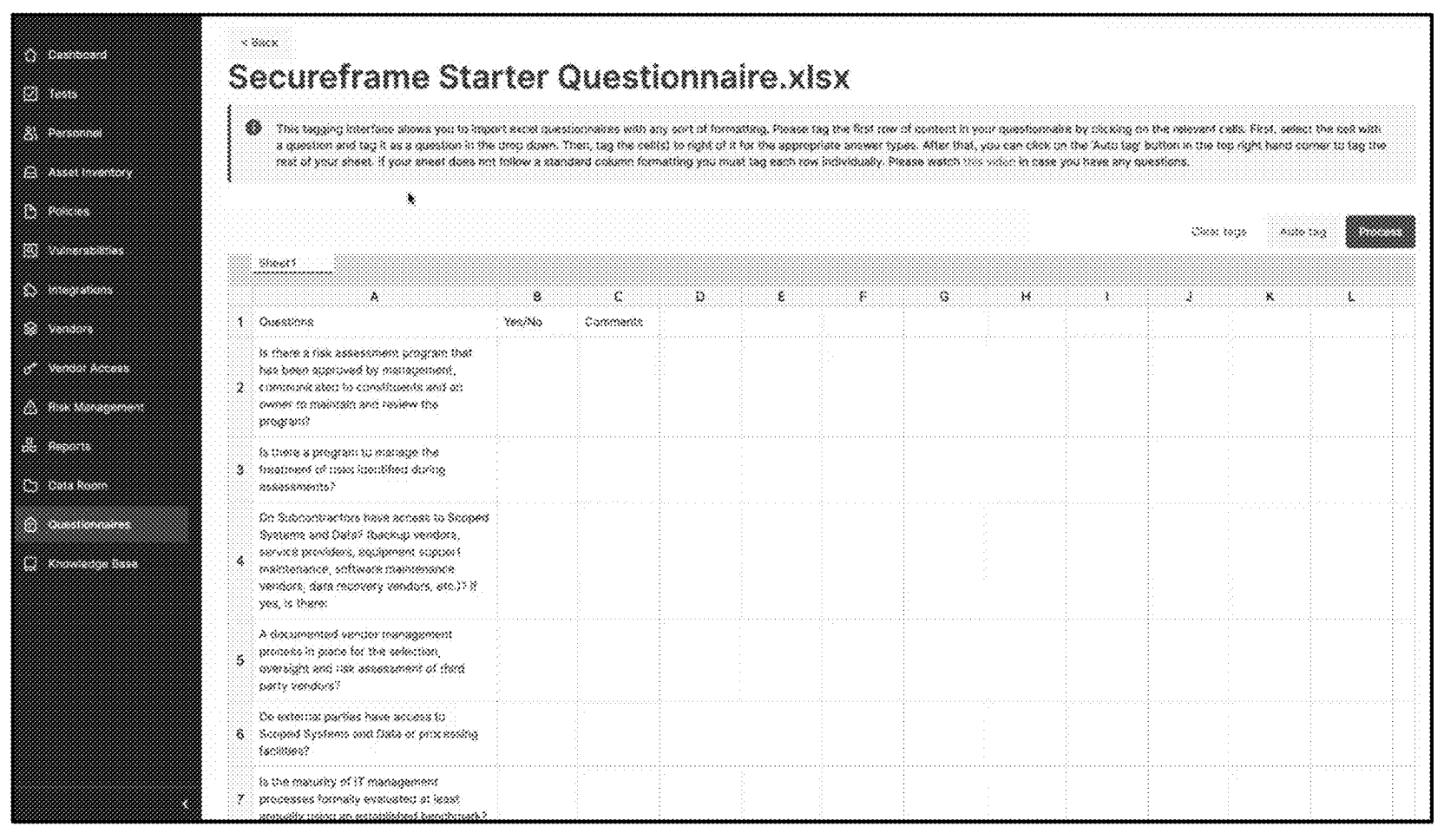
Figure 7:
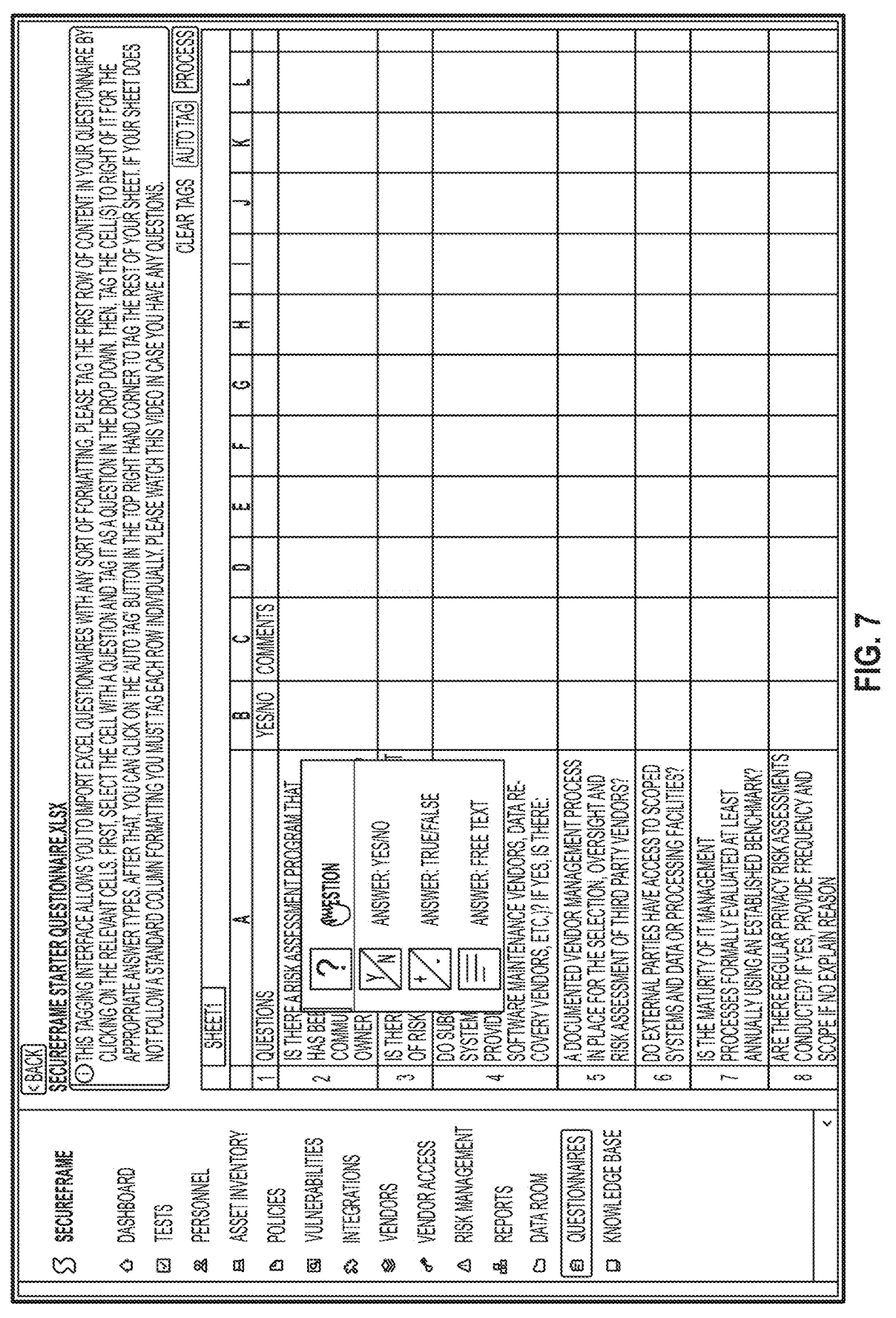
Figure 8:
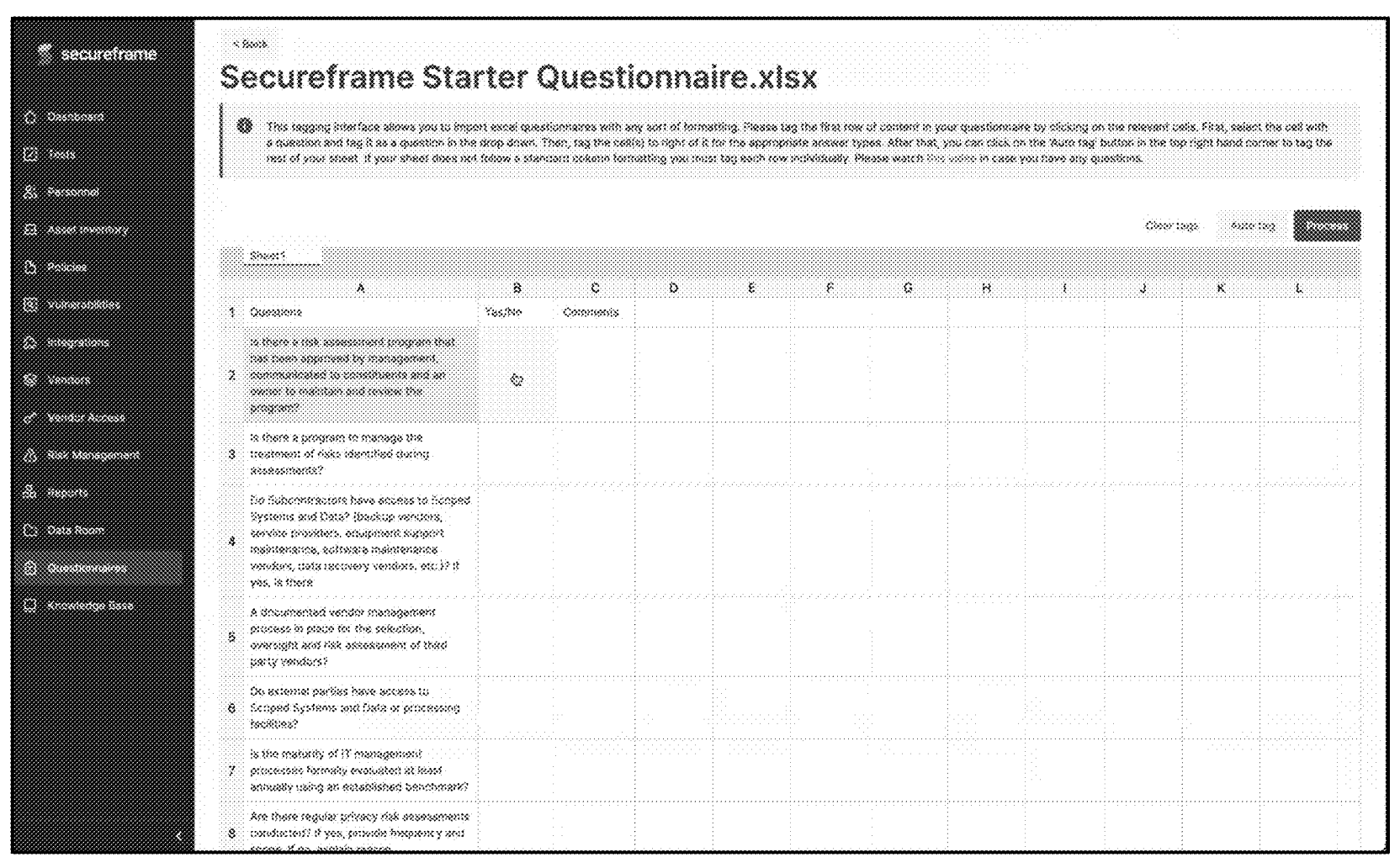

In one implementation, to allow the subscriber to digitally tag such a row, S220 may function to generate an intelligent content tagging user interface. The intelligent content tagging user interface, in some embodiments and as generally illustrated in FIG. 6, may include a digital representation of a target knowledge-containing digital artifact and/or may be configured to allow a subscriber to tag distinct pieces of content within the artifact as "question data." For instance, as shown in FIGS. 7 and 8, the intelligent content tagging user interface may detect subscriber input indicating that a piece of content (e.g., row 2, column A) includes the "head question" and, in response, may digitally tag (and, optionally, visually indicate) a data structure/digital cell corresponding to that piece of content as "question data."

Figure 9:
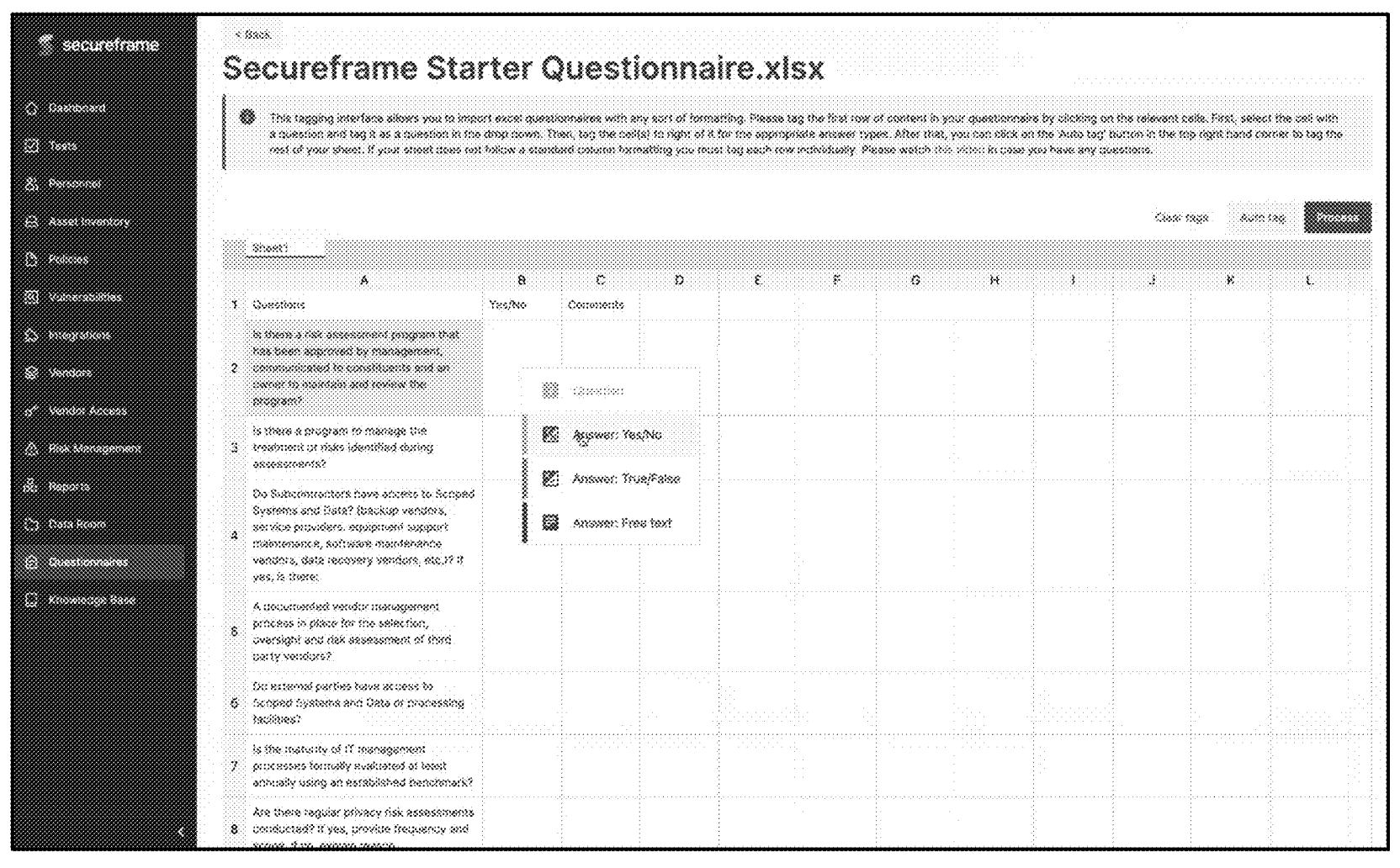
Figure 10:
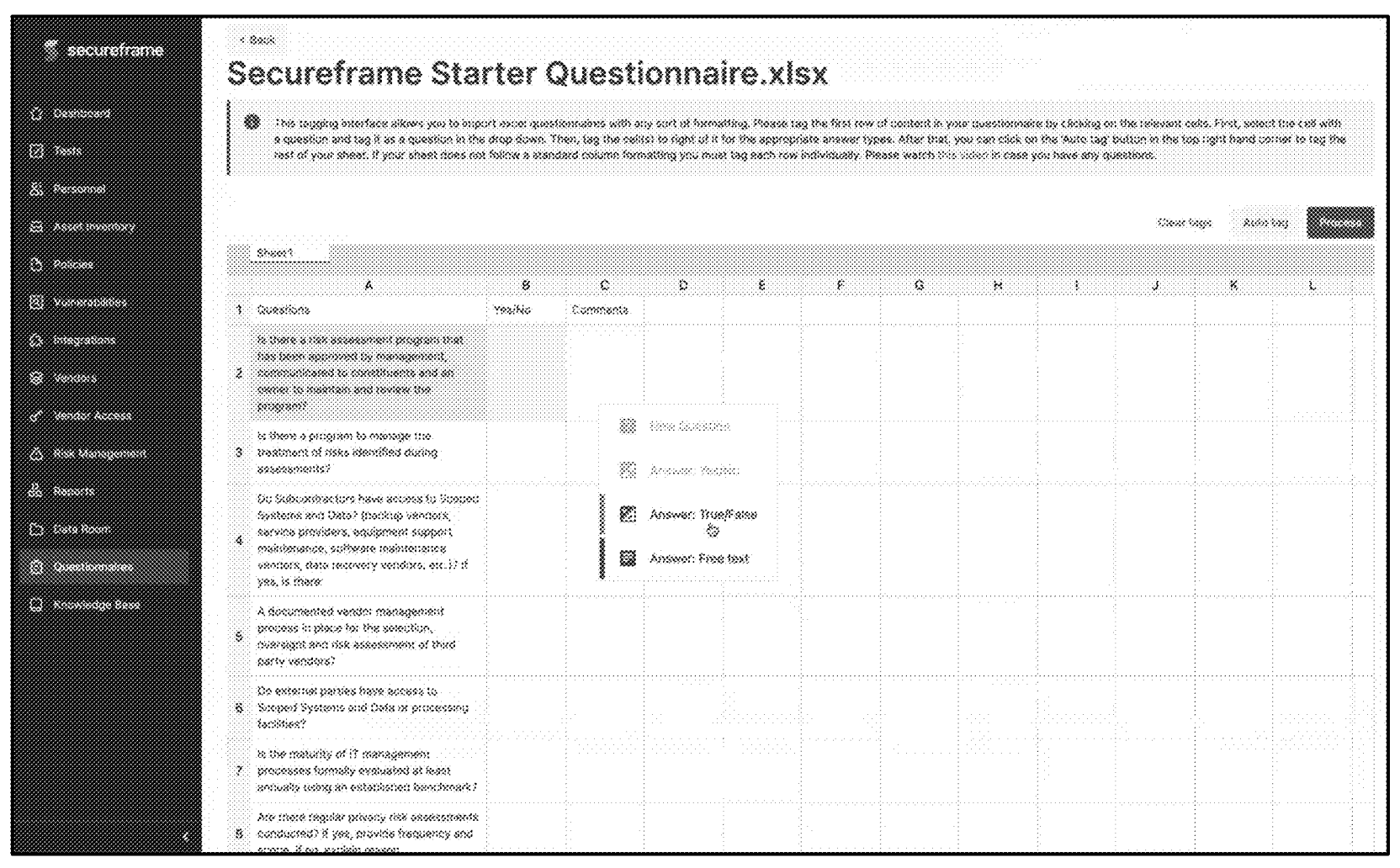
Figure 11:
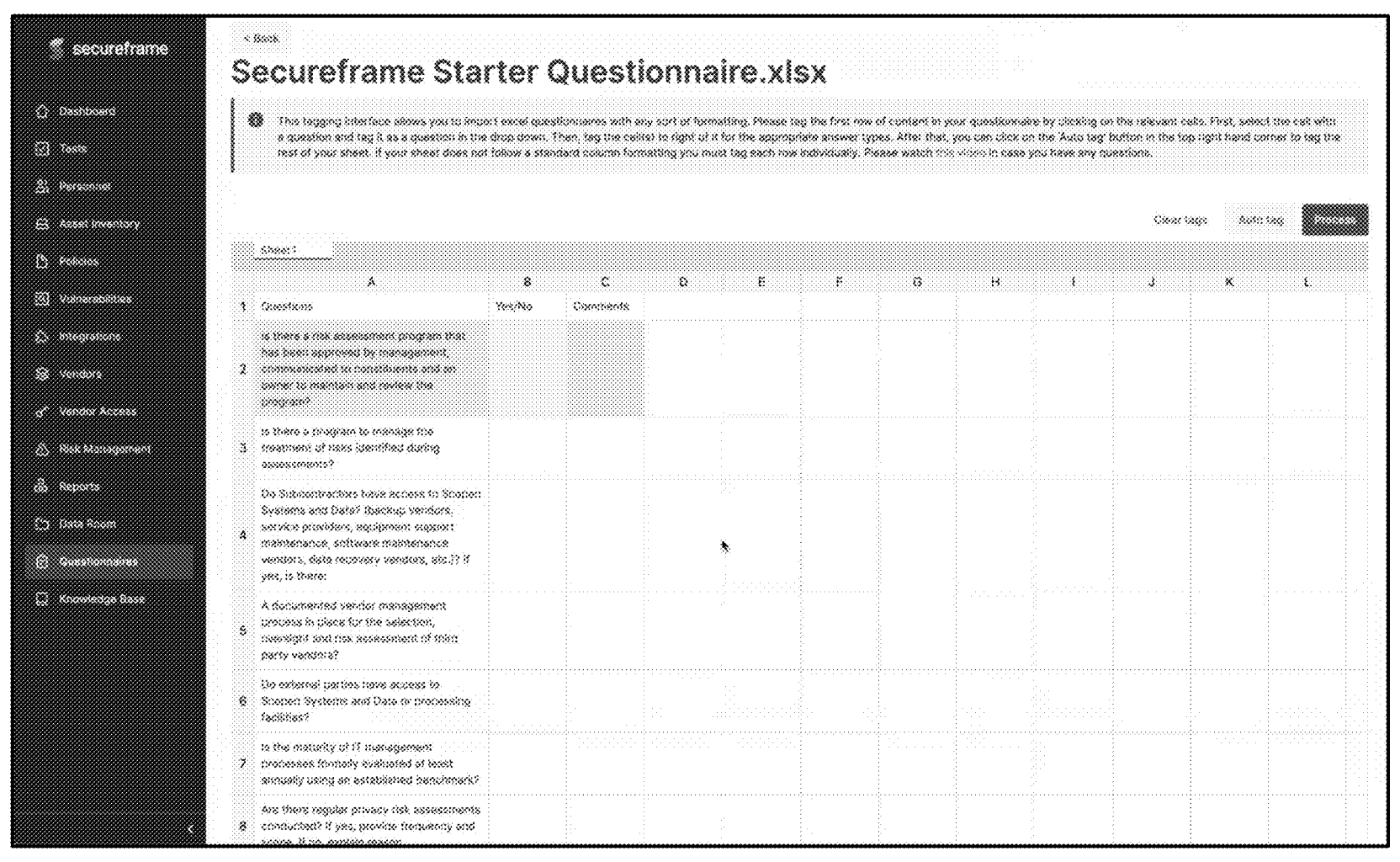

Analogously, in some embodiments, the intelligent content tagging user interface may additionally, or alternatively, be configured to allow a subscriber to tag distinct pieces of content as "binary answer data" and/or "free form answer data." For instance, as shown in FIGS. 9-11, the intelligent content tagging user interface may detect subscriber input(s) indicating that a piece of content includes a binary answer associated with the "head question" and that a piece of content includes a free form/unstructured answer associated with the "head question" and, in response, may digitally tag (and, optionally, visually indicates) the data structures/digital cells corresponding to such content as "binary answer data" and "free form/unstructured answer data," respectively.

Automatically Tagging Pieces of Content Embedded in a Knowledge-Containing Digital Artifact Furthermore, in some embodiments, S220 may additionally, or alternatively, function to automatically tag pieces of content embedded within a knowledge-containing digital artifact. In one implementation of such embodiments, S220 may function to automatically tag pieces of content embedded within a knowledge-containing digital artifact based on (e.g., in response to) a subscriber requesting an automatic-tagging of the knowledge-containing digital artifact.

In one embodiment of such implementation, S220 may function to identify/detect such a request based on subscriber input(s) received at the intelligent content tagging user interface. For instance, in a non-limiting example and as generally illustrated in FIGS. 12-15, the intelligent content tagging user interface may detect subscriber input(s) that correspond to a request to automatically tag the knowledge-containing digital artifact and, in response, may initiate a process to automatically tag pieces of content embedded within the knowledge-containing digital artifact.

Automatically Tagging Question Data

In some embodiments, automatically tagging pieces of content embedded within the knowledge-containing digital artifact may include automatically tagging question data embedded within the knowledge-containing digital artifact. In one implementation of such embodiments, S220 may function to automatically tag question data embedded in the knowledge-containing digital artifact based on the tagging of the "header row" (e.g., the row containing the header question). For instance, in a non-limiting example, based on S220 identifying that the "header question" exists within a respective column (e.g., Column A), S220 may function to identify other pieces of content stored within that respective column and/or determine if any of those pieces of content comprise a question.

Sentence/Language Segmentation Model

In one implementation, to determine if a piece of content relates to a question, S220 may function to implement a sentence (or language) segmentation model. The sentence (or language) segmentation model, in some embodiments, may function to receive a piece of content as input and, in turn, classify the provided piece of content as question data or non-question data. For instance, in a non-limiting example, S220 may function to provide the sentence segmentation model with pieces of content such as the text "D. Asset and Information Management," "Are encryption tools managed and maintained for Scoped Data?", and/or the like and, in turn, may function to classify the piece of content comprising "D. Asset and Information Management" as non-question data and the piece of content comprising "Are encryption tools managed and maintained for Scoped Data?" as question data.

In some embodiments, S220 may function to automatically tag pieces of content based on the inferences produced by the sentence segmentation model. For instance, in a non-limiting example, if the sentence segmentation model identifies that a subject piece of content relates to a question, S220 may function to automatically tag a data structure (e.g., digital cell) corresponding to that piece of content as "question data." Conversely, in another non-limiting example, if the sentence segmentation model identified that a subject piece of content does not relate to a question, S220 may function to forgo tagging a data structure (e.g., digital cell) corresponding to that piece of content.

Language Syntax Rules/Heuristics

In a second implementation, to determine if an identified piece of content relates to a question, S220 may function to implement language syntax rules/heuristics. The language syntax rules, in some embodiments, may function to assess a piece of content and, in turn, determine if the provided piece of content relates to a question. For instance, in a non-limiting example, the language syntax rules may function to assess pieces of content such as "D. Asset and Information Management," "Are encryption tools managed and maintained for Scoped Data?", and/or the like and, in turn, determine that the piece of content comprising the text "D. Asset and Information Management" relates to non-question data and that the piece of content comprising the text "Are encryption tools managed and maintained for Scoped Data?" relates to question data.

In some embodiments, S220 may function to automatically tag pieces of content based on the language syntax rules/heuristics. For instance, in a non-limiting example, if the language syntax rules/heuristics indicate that a subject piece of content relates to a question, S220 may function to tag a data structure (e.g., digital cell) corresponding to that piece of content as containing "question data." Conversely, in another non-limiting example, if the language syntax rules/heuristics indicate that a subject piece of content does not relate to a question, S220 may function to forgo tagging the data structure (e.g., digital cell) corresponding to that piece of content.

Automatically Tagging Answer Data

In some embodiments, automatically tagging pieces of content embedded within the knowledge-containing digital artifact may include automatically tagging answer data for one or more pieces (e.g., each piece) of content tagged as a "question." In one example of such embodiments, S220 may function to tag answer data for a subject piece of content based on the question-to-answer(s) tagging nexus generated for the header question.

For instance, in a non-limiting example, if the question-to-answer(s) tagging nexus derived for the "header question" identified that a binary answer for the header question exists in a target column (e.g., column B), S220 may function to tag a data structure (e.g., digital cell) intersecting the target column (e.g., column B) and a row associated with the subject piece of content as "binary answer data." Similarly, in another non-limiting example, if the question-to-answer(s) tagging nexus derived for the "header question" identified that a free form answer for the header question exists in a target column (e.g., column C), S220 may function to tag a data structure (e.g., digital cell) intersecting interesting the target column (e.g., column C) and the row associated with the subject piece of content as "free form answer data."

It shall be noted that the above examples are not intended to be limiting and that other models, policies, rules, and/or heuristics may be implemented for automatically tagging a knowledge-containing digital artifact without departing from the scope of the inventions contemplated herein. It shall also be noted that, in some embodiments, the pieces of content automatically tagged by S220 may be visually indicated in analogous ways described previously (as also generally illustrated in FIG. 15).

2.30 Constructing Question-To-Answer(s) Data Structures

S230, which includes constructing question-to-answer(s) data structures, may function to create/form one or more question-to-answer(s) data structures based on the question-to-answer(s) tagging nexuses generated in S220. In some embodiments, the one or more question-to-answer(s) data structures may each relate to a distinct (e.g., different) question and/or may comprise any suitable data structure capable of storing question and answer data associated with a distinct question.

In some embodiments, constructing the question-to-answer(s) data structures may include constructing the question-to-answer(s) data structures based on pieces of content tagged in the same row. Accordingly, in one example of such embodiments, S230 may function to construct the question-to-answer(s) data structures by iterating through the rows of the knowledge-containing digital artifact that include tagged pieces of content and, in turn, constructing a distinct question-to-answer(s) data structure based on the pieces of content tagged in a respective row.

In some embodiments, a question-to-answer(s) data structure constructed for a target row may comprise the content tagged within the target row. For instance, in a non-limiting example, if a target row includes a piece of content tagged as question data (e.g., "Do external parties have access to Scoped Systems and Data or processing facilities?"), a piece of content tagged as binary answer data (e.g., "No"), and/or a piece of content tagged as free form answer data (e.g., "No, external parties do not have access to Scoped Systems and Data or processing facilities."), the question-to-answer(s) data structure constructed for such a row may include one or more of those pieces of content as attributes/properties of the data structure.

Surfacing Digital Representations of the Question-To-Answer(s) Data Structures

Additionally, or alternatively, in some embodiments, S230 may function to surface, to a subscriber, digital representations of the question-to-answer(s) data structures. It shall be noted that, in some embodiments, such surfacing may enable the subscriber to efficiently assess question-answer data extracted from a target knowledge-containing digital artifact and/or may enable the subscriber to efficiently perform any necessary adaptations to the extracted question-answer data.

Figure 16:
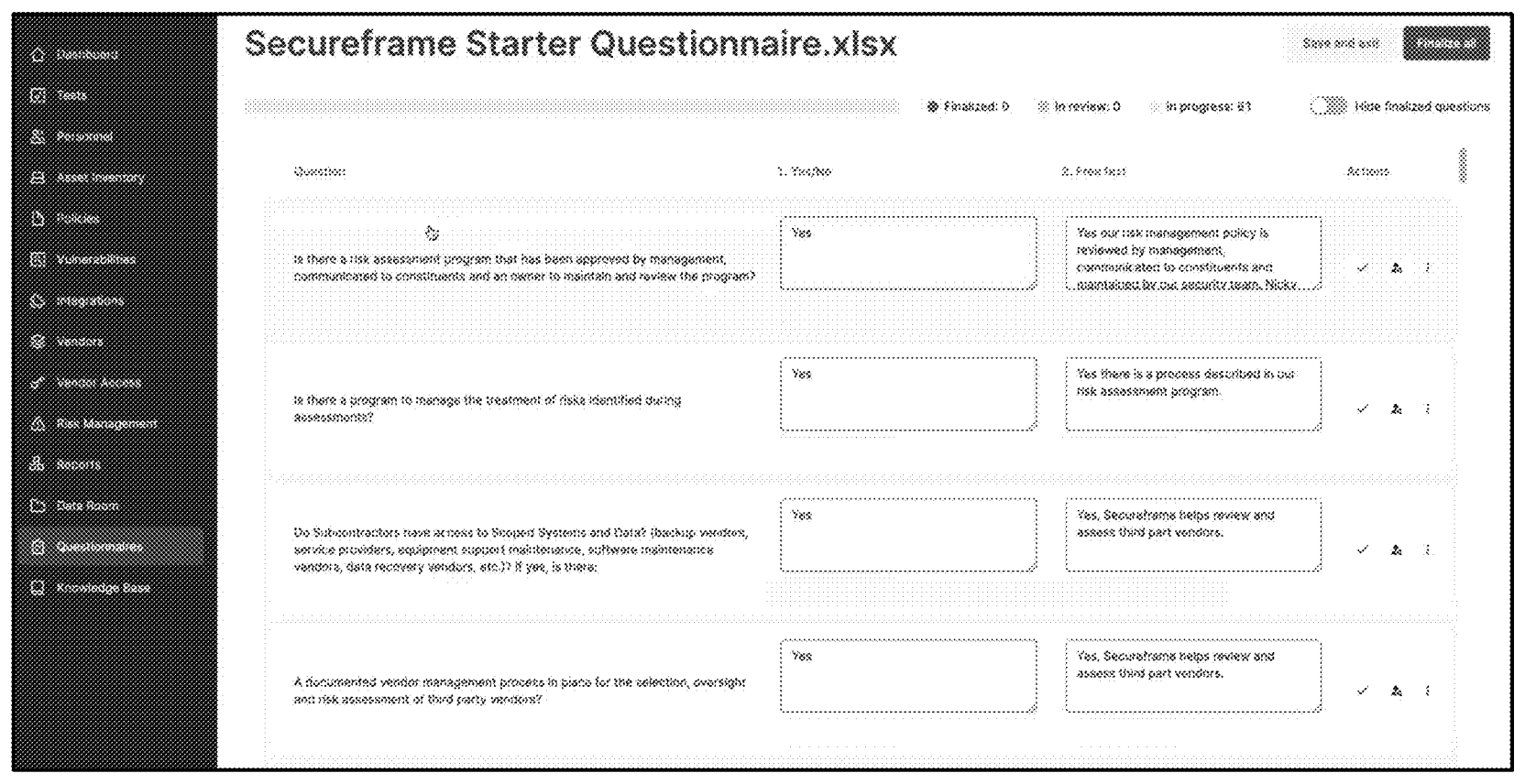

In one implementation of such embodiments, S230 may function to surface digital representations of the question-to-answer(s) data structures via a question-to-answer(s) discovery graphical user interface (as generally illustrated in FIG. 16). The question-to-answer(s) discovery user interface, in some embodiments, may include a digital representation corresponding to one or more (e.g., each) of the question-to-answer(s) data structures constructed by S230 (as also generally illustrated in FIG. 16).

In some embodiments, a digital representation of a target question-to-answer(s) data structure may include a textual representation of the question data associated with the target question-to-answer(s) data structure, a textual representation of the binary answer data associated with the target question-to-answer(s) data structure, and/or a textual representation of the free form answer data associated with the target question-to-answer(s) data structure. Furthermore, in some embodiments, a digital representation of a respective question-to-answer(s) data structure may additionally, or alternatively, include one or more editable user interface elements that enable a subscriber to adapt question data, binary answer data, and/or free form answer data associated with a respective data structure and/or may include selectable user interface elements that, when selected, finalize/confirm the content stored within the question-to-answer(s) data structure.

2.40 Adding the Question-to-Answer(s) Data Structures to a Knowledge Base

S240, which includes adding the question-to-answer(s) data structures to a knowledge base, may function to digitally save the constructed (and, optionally, finalized) question-to-answer(s) data structures to a central data repository. In some embodiments, once added to the knowledge base, a system or service implementing the method 200 may function to reference (or access) such question/answer data to support an automated answering of an inbound security assessment questionnaire.

In some embodiments, adding the constructed question-to-answer(s) data structures to a knowledge base may include adding the constructed question-to-answer(s) data structures as distinct entries in the knowledge base. It shall be noted that a knowledge base, as generally referred to herein, may relate to a searchable data repository that may be specifically configured to store a collection of question-answer(s) pairs (as generally illustrated in FIG. 16).

Surfacing the Knowledge Base

Additionally, or alternatively, in some embodiments, S240 may function to surface the knowledge base to a subscriber. It shall be noted that, in some embodiments, such surfacing may enable the subscriber to efficiently access governance, risk, and compliance (GRC) question-answer data at a centralized location and/or may enable the subscriber to efficiently search for answers to one or more subject questions.

Figure 17:
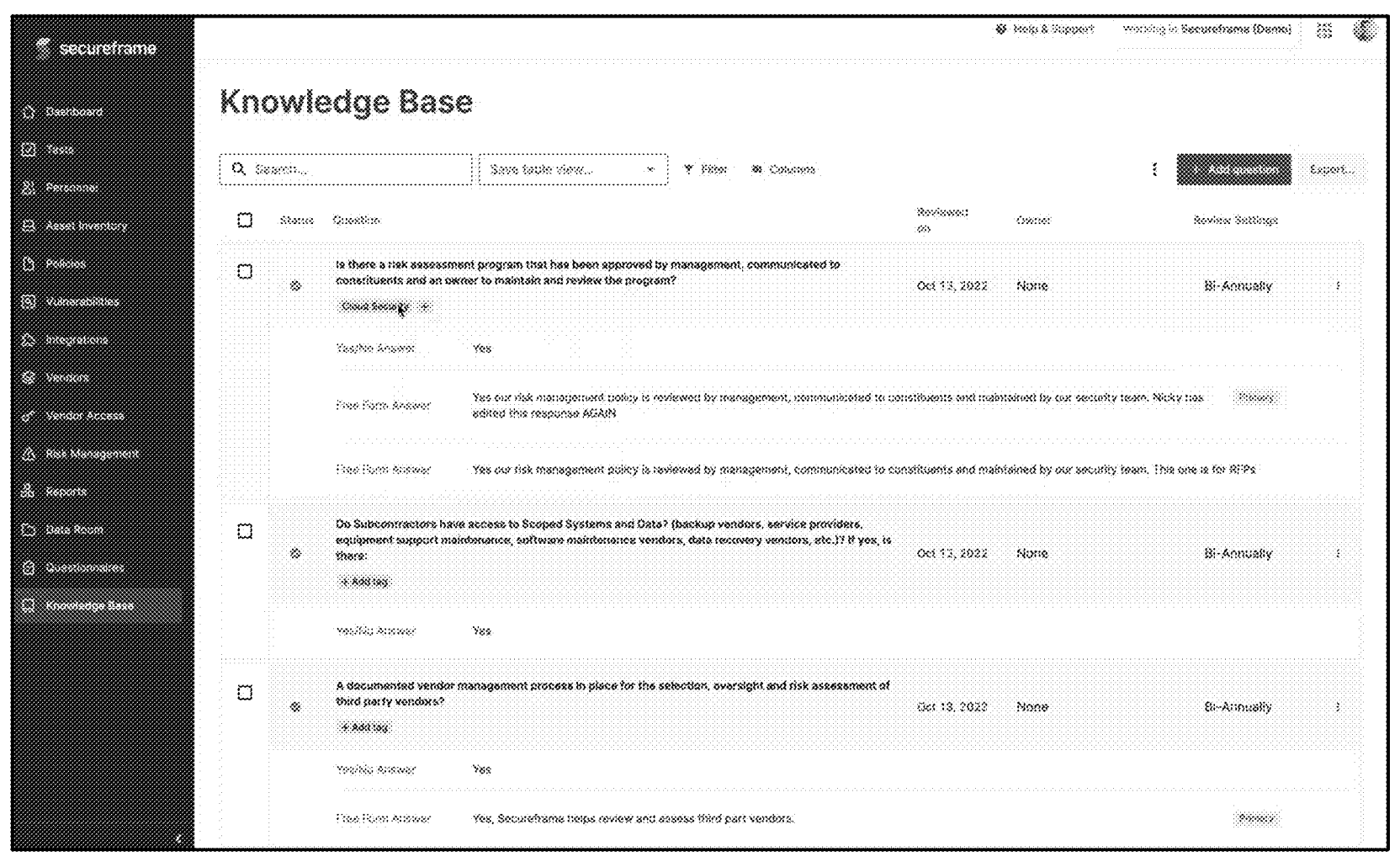

In one implementation of such embodiments, S240 may function to surface the knowledge base via one or more graphical user interfaces ("Knowledge Base User Interface"). The knowledge base user interface, in some embodiments, as generally illustrated in FIG. 17, may include a digital representation of the one or more question-answer(s) pairs digitally stored in the knowledge base.

In some embodiments, a digital representation of a question-answer(s) pair may include a textual representation of the question data associated with such pair, a textual representation of the binary answer data associated with such pair, and/or a textual representation of the free form answer data associated with such pair. Furthermore, in some embodiments, a digital representation of a respective question-to-answer(s) data structure may additionally, or alternatively, include one or more editable user interface elements that enable a subscriber to adapt question data, binary answer data, and/or free form answer data associated with a question-to-answer(s) pair and/or may include selectable user interface elements that, when selected, attach evidence data/policies to a subject question-answer pair.

It shall be noted that, in some embodiments, a digital representation of a question-answer(s) pair may include (display) fewer, additional, or different properties. For instance, in a non-limiting example, the digital representation of a question-answer(s) pair may additionally, or alternatively, include data relating to a digital owner of such pair, include data relating to a date on which such pair was reviewed, and/or the like.

Furthermore, in some embodiments, the knowledge base maybe configured with search and/or filter capabilities. These search and/or filter capabilities, in some embodiments, may enable the knowledge base to be searched for question-answer(s) pairs that satisfy subscriber-defined search and/or filter criteria and/or system-defined search and/or filter criteria.

Figure 3:
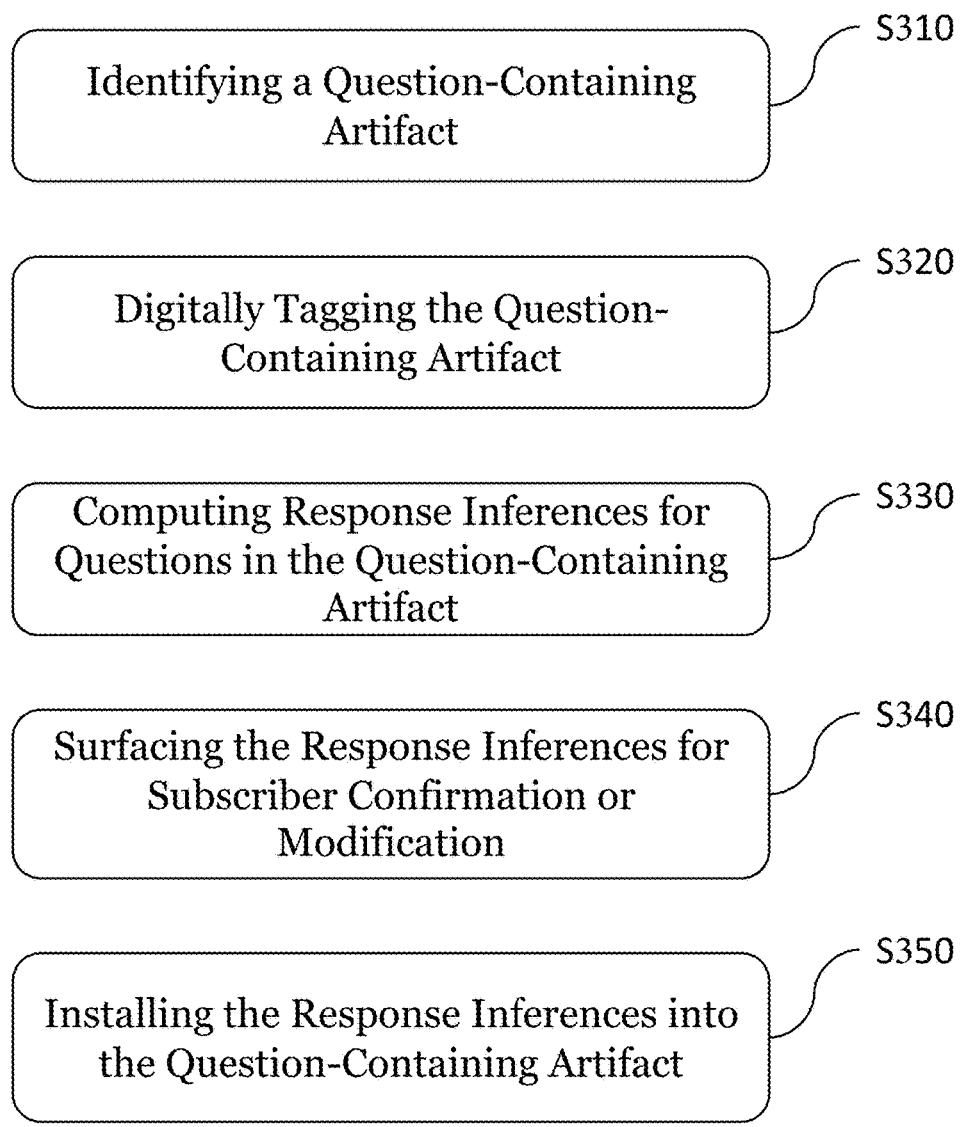
FIG. 3 illustrates an example method 300 in accordance with one or more embodiments of the present application.
Figure 13:
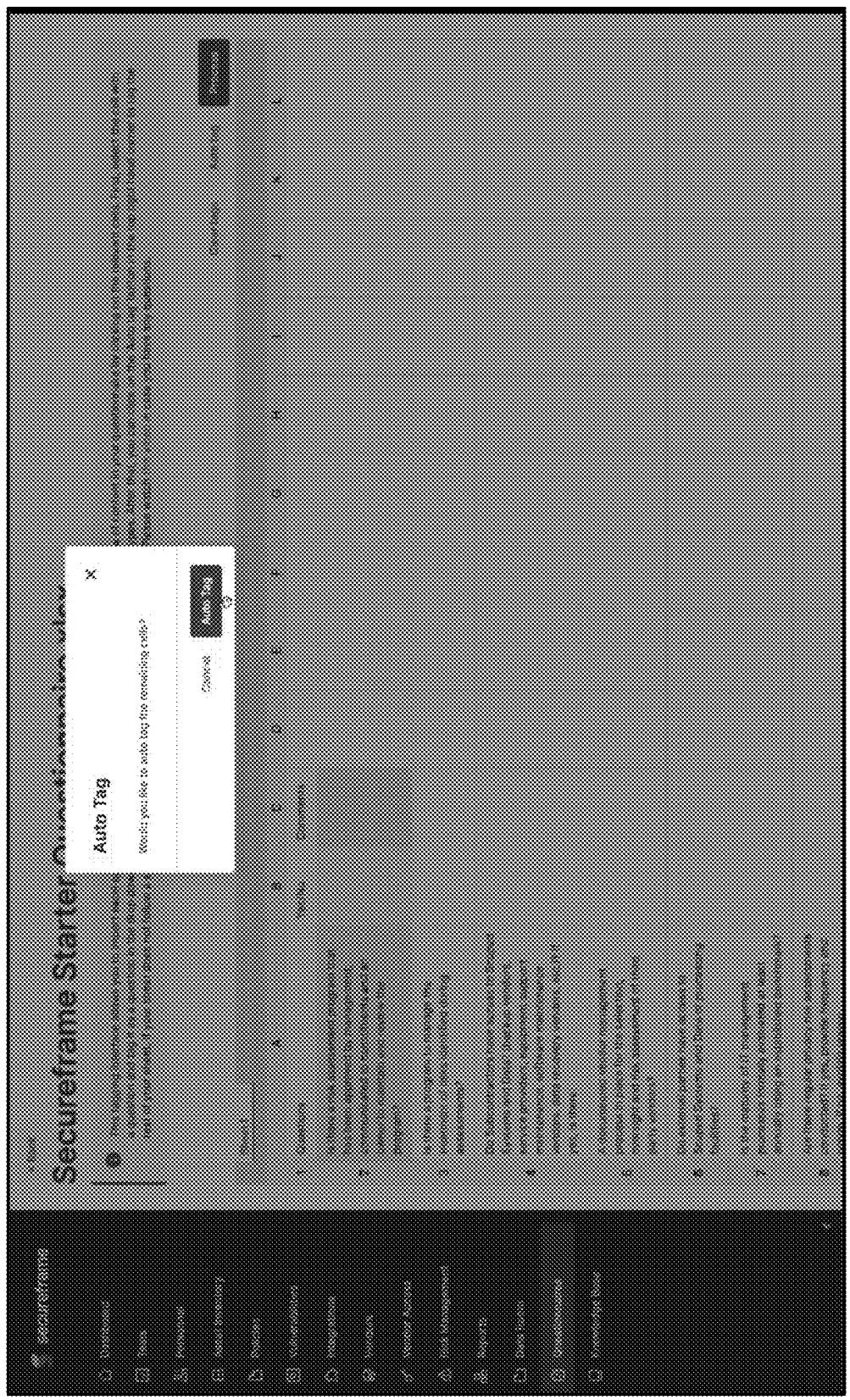

3.00 Machine Learning-Based Method for Accelerating Subscriber Responses to Questionnaires As shown in FIG. 3, a machine learning-based method 300 for accelerating subscriber responses to third-party security questionnaires may include identifying a query-containing digital artifact (S310), digitally tagging the query-containing digital artifact (S320), computing response inferences to queries or prompts of the query-containing digital artifact (S330), surfacing the response inferences and enabling subscriber verification or modification of the response inferences (S340), and installing the response inferences into the query-containing digital artifact (S350).

3.10 Identifying a Query-Containing Digital Artifact

S310, which includes identifying a query-containing digital artifact, may function to source or obtain a query-containing digital artifact from a subscriber. In some embodiments, the query-containing digital artifact identified by S310 may comprise one or more security and/or compliance related queries or prompts that may require one or more responses or answers from the subscriber and/or may have been created by an external entity to gauge security, operational, and privacy practices of the subscriber.

For instance, in a non-limiting example, the query-containing digital artifact identified by S310 may be or relate to a security assessment questionnaire (SAQ), a standardized information gathering (SIG) questionnaire, a request for information (RFI) artifact, or a request for proposal (RFP) artifact comprising one or queries that, when answered by the subscriber, aids the external entity in evaluating governance, risk, and compliance (GRC) practices of the subscriber.

It shall be noted that, in some portions of this description, the query-containing digital artifact identified by S310 may be described as being "incomplete" (or similar recitations) when the query-containing digital artifact does not include a subscriber-provided answer for the one or more queries included in the query-containing digital artifact. Conversely, it shall also be noted that, in some portions of the description, the query-containing digital artifact (or an instance of the query-containing digital artifact) may be described as being "complete" (or similar recitations) when the query-containing digital artifact includes a subscriber-provided answer for the one or more queries included in the query-containing digital artifact.

Obtaining the Query-Containing Digital Artifact

In some embodiments, S310 may function to obtain the query-containing digital artifact from a subscriber by utilizing or implementing any suitable technique. For instance, in a non-limiting example and as generally illustrated in FIGS. 4 and 18-19, S310 may function to obtain the query-containing digital artifact from the subscriber via one or more command line interfaces (CLIs), one or more graphical user interfaces (GUIs), and/or one or more application programming interfaces (APIs) that are specifically configured to enable a system or service implementing the method 300 to obtain one or more query-containing digital artifacts from the subscribe and/or that may enable a subscriber to upload one or more query-containing digital artifacts to a system or service implementing the method 300.

3.20 Digitally Tagging the Query-Containing Digital Artifact

S320, which includes digitally tagging the query-containing digital artifact, may function to digitally tag one or more sub-components (e.g., data entry fields, cells, etc.) underpinning the query-containing digital artifact. It shall be noted that, in some embodiments, digitally tagging the query-containing digital artifact in the manner described herein may provide the method 300 with context about the one or more sub-components (e.g., data entry fields, cells, etc.) underpinning the query-containing digital artifact and/or may enable the method 300 to ingest query-containing digital artifacts having various formats. For instance, in a non-limiting example and as generally illustrated in FIGS. 6-15 and 20-21, a respective sub-component (e.g., cell) tagged by S320 may indicate, to the system or service implementing the method 300, a function of the respective sub-component such as if the respective sub-component is configured to store "section-related content," "subsection-related content," "query-related content," "binary answer-related content," or "free form answer-related content."

Subscriber-Informed Tagging

In some embodiments, S320 may function to tag at least a portion of the one or more sub-components (e.g., data entry fields, cells, etc.) underpinning the query-containing digital artifact based on subscriber input(s). In one example of such embodiments, S320 may function to digitally tag one or more sub-components (e.g., data entry fields, cells, etc.) underpinning the query-containing digital artifacts based on subscriber input(s) received at an intelligent content tagging user interface. The intelligent content tagging user interface, in some embodiments and as generally illustrated in FIGS. 6-15, may enable S320 to receive subscriber input(s) for associating one or more sub-components (e.g., data entry fields, cells, etc.) of the query-containing digital artifact with a distinct digital tag. For instance, as generally illustrated in FIGS. 6-15, S320 may function to detect, via the intelligent content tagging user interface, one or more subscriber inputs for tagging a first, second, and third sub-component (e.g., data entry field, cell) as being associated with a "query," "binary-answer," and a "free-form answer," respectively, and in turn, cause S320 to digitally tag the first, second, and third sub-components as being associated with "query-related content," "binary answer-related content," and "free form answer-related content," respectively.

Furthermore, in some embodiments, as also generally illustrated in FIGS. 6-15, the intelligent content tagging user interface may visually indicate the type of tag currently associated with a subject sub-component (e.g., cell) in the query-containing digital artifact. In one example of such embodiments, visually indicating the type of tag associated with a subject sub-component (e.g., cell) may include highlighting the subject sub-component based on the type of tag currently associated with the subject sub-component. For instance, in a non-limiting example, S320 may function to highlight the subject sub-component with a first distinct color if the subject sub-component is currently associated with a first type of digital tag (e.g., a query-related tag). Conversely, in another non-limiting example, S320 may function to highlight the subject sub-component with a second distinct color if the subject sub-component is currently associated with a second type of digital tag (e.g., a binary answer-related tag).

It shall also be noted that S320 may additionally, or alternatively, function to digitally tag the query-containing digital artifact in one or more ways described in U.S. Provisional Application No. 63/431,115, which is incorporated in its entirety by this reference.

Automatically Tagging the Query-Containing Digital Artifact

Additionally, or alternatively, in some embodiments, S320 may function to automatically tag (or label) one or more sub-components (e.g., data entry fields, cells, etc.) underpinning the query-containing digital artifact. In one example of such embodiments, S320 may function to automatically tag the one or more sub-components (e.g., data entry fields, cells, etc.) underpinning the query-containing digital artifact based on a tagging of a "header row." It shall be noted that, in some embodiments, the "header row," as generally referred to herein, may relate or correspond to a row in the query-containing digital artifact that includes the first query in the query-containing digital artifact (e.g., no other queries appear before such query). In one or more embodiments, each tag or label may be represented by tag or label metadata (e.g., textual or string tag/label metadata, and/or the like) that maybe appended to and/or otherwise associated with a corresponding sub-component of the query-containing digital artifact.

Figure 14:
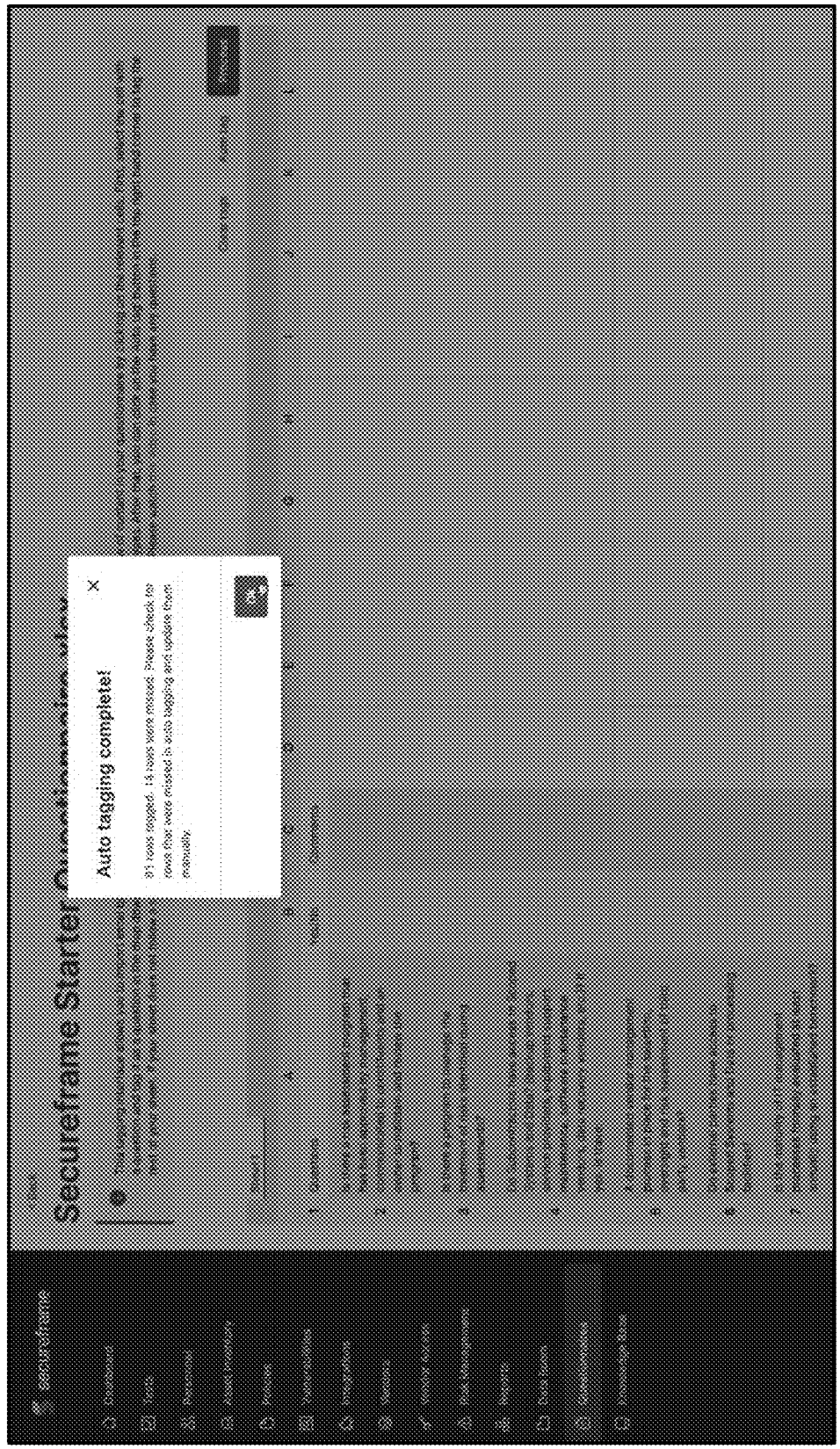
Figure 15:
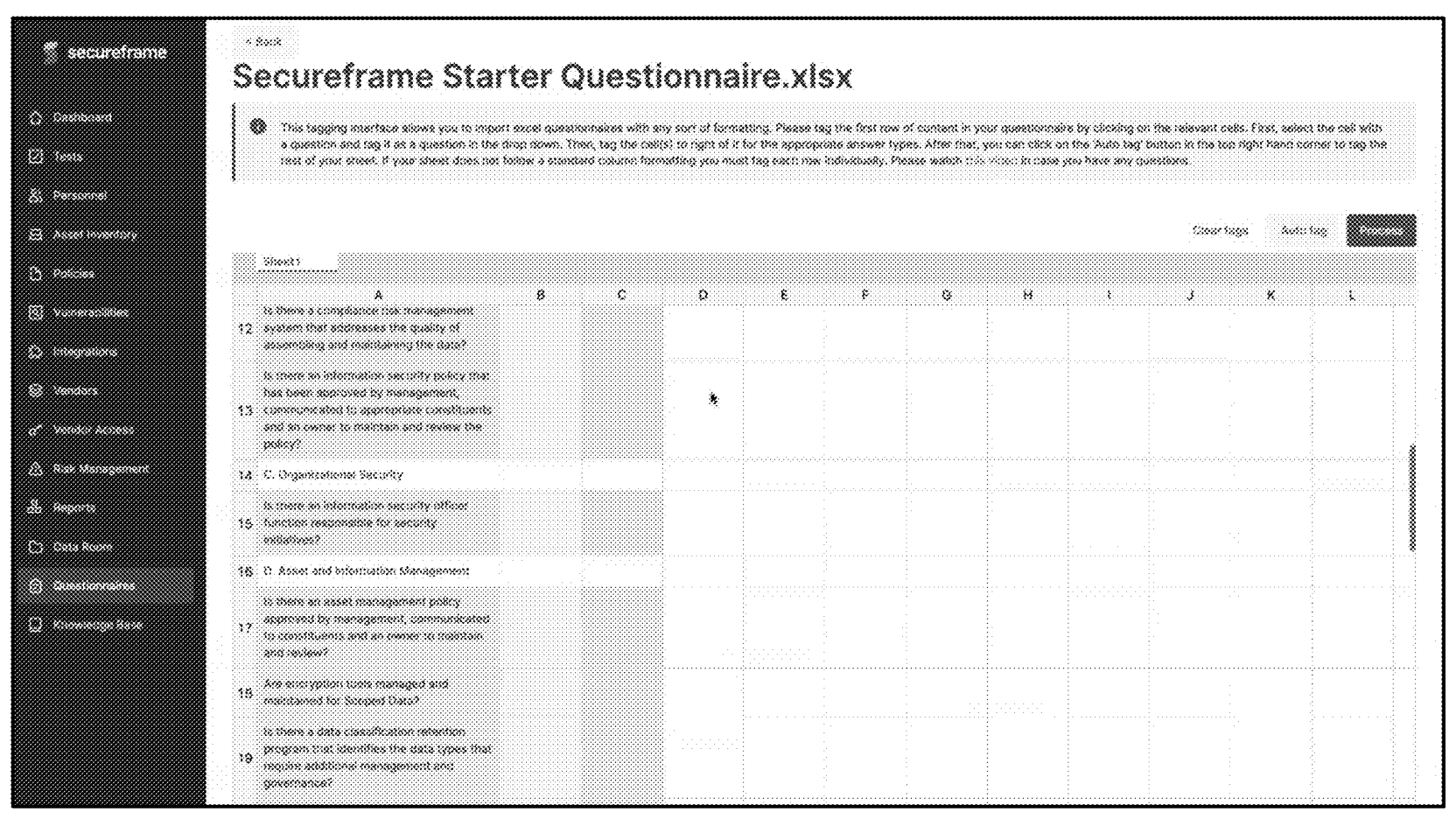

In some embodiments, one or more sub-components (e.g., data entry fields, cells, etc.) of the query-containing digital artifact maybe automatically tagged (or labeled) in the same manner as the header row. For instance, in a non-limiting example and as generally illustrated in FIGS. 12-15, based on S320 identifying that a sub-component (e.g., data entry field, cell) located in a first column (e.g., Column A) of the header row has been tagged as a "query-related" sub-component, S320 may function to identify other sub-components located along the first column and selectively tag the one or more other sub-components positioned along the first column as "query-related" sub-components. It shall be noted that, in some embodiments, selectively tagging the one or more sub-components in the manner described herein may reduce or eliminate an incorrect tagging of the sub-components, such as reducing or eliminating the tagging of sub-components that do not include a query as "query-related" sub-components (as generally illustrated in FIGS. 14-15).

In one implementation, S320 may function to selectively tag a subject sub-component of the one or more other sub-components as a "query-related" sub-component based on an output of a sentence segmentation model. Accordingly, in one example of such embodiments, S320 may function to provide, as input to the sentence segmentation model, one or more strings of text associated with the subject sub-component. In turn, the sentence segmentation model may function to produce an inference indicating if the one or more strings of text include or relate to a query. If the inference produced by the sentence segmentation model indicates that the one or more strings of text include or relate to a query, S320, in turn, may function to tag the subject sub-component as a "query-related" sub-component. Conversely, in some embodiments, if the inference produced by the sentence segmentation model indicates that the one or more strings of text does not include or relate to a query, S320, in turn, may function to forgo tagging the subject sub-component as a "query-related" sub-component.

Additionally, or alternatively, in a second implementation, S320 may function to automatically tag (or label) answer-related sub-components (e.g., data entry fields, cells, etc.) based on a tagging of the header row. For instance, in another non-limiting example and as generally illustrated in FIGS. 12-15, based on S320 identifying that a second and a third sub-component (e.g., cell) located in a second and third column (e.g., Columns B and C) of the header row has been tagged as a "binary answer-related" sub-component and a "free form answer-related" sub-component, respectively, S320 may function to selectively tag one or more other sub-components positioned along the second and third columns as "binary answer-related" sub-components and a "free form answer-related" sub-components, respectively. It shall be noted that, in some embodiments, selectively tagging the one or more sub-components may reduce or eliminate an incorrect tagging of the sub-components, such as reducing or eliminating the tagging of sub-components (e.g., data entry fields, cells, etc.) as "answer-related" sub-components in rows that do not include a "query-related" sub-component (as generally illustrated in FIGS. 14-15).

In some embodiments, S320 may function to selectively tag (or label) a subject sub-component positioned along the second and third columns as a "binary answer-related" or a "free form answer-related" sub-component (e.g., cell), respectively, if S320 determines that the subject sub-components exists in a row that includes a sub-component tagged as a "query." Conversely, in some embodiments, S320 may function to forgo tagging the subject sub-component as a "binary answer-related" or a "free form answer-related" sub-component if S320 determines that the subject sub-components exists in a row that does not include a sub-component tagged as a "query."

It shall be noted that the above examples are not intended to be limiting and that S330 may function to implement other models, policies, rules, and/or heuristics for automatically tagging a query-containing digital artifact without departing from the scope of the invention(s) contemplated herein.

3.30 Computing Response Inferences

S330, which includes computing response inferences, may function to predict one or more likely responses or answers to one or more queries embedded in the target query-containing digital artifact. In some embodiments, S330 may function to compute the response inferences via an automated response generation machine learning pipeline that may be configured to receive one or more target queries (sometimes referred to herein as subject queries) as input and, in turn, return one or more likely (e.g., text-based) answers to each target query provided as input.

Routing Queries to the Automated Response Generation Machine Learning Pipeline

Figure 22:
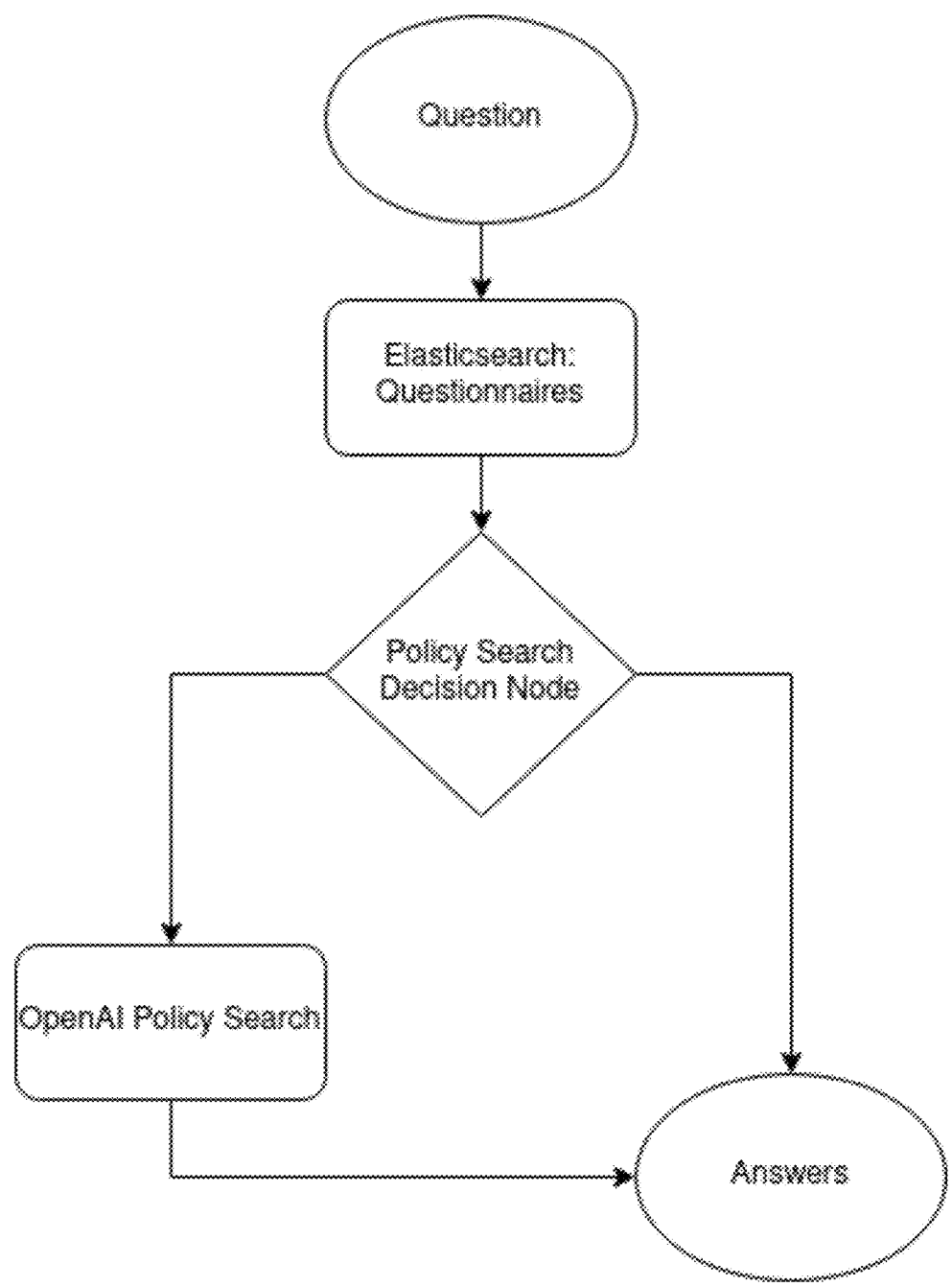
FIGS. 22 and 23 illustrate example schematic representations of an automated response generation machine learning pipeline in accordance with one or more embodiments of the present application.
Figure 23:
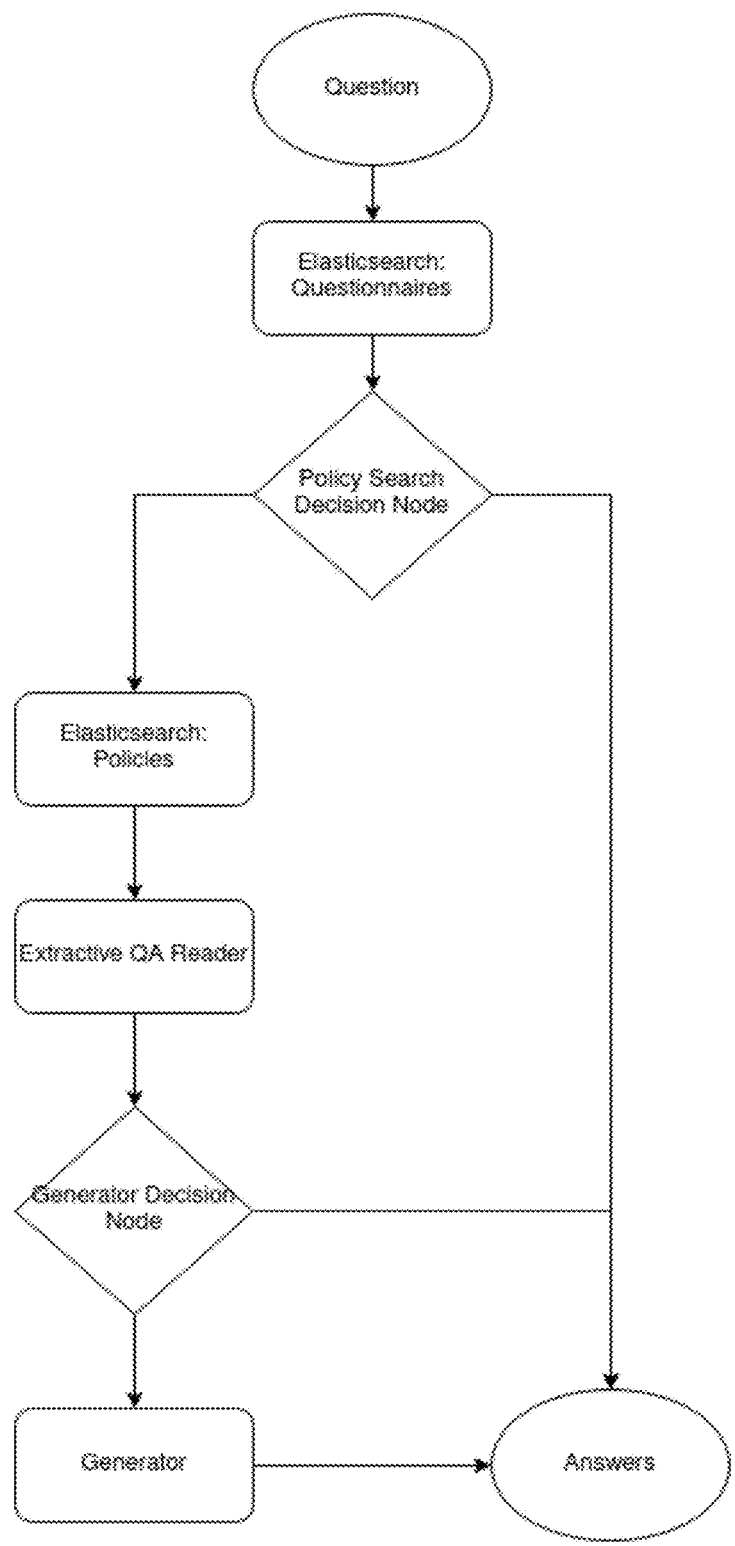
Figure 28:
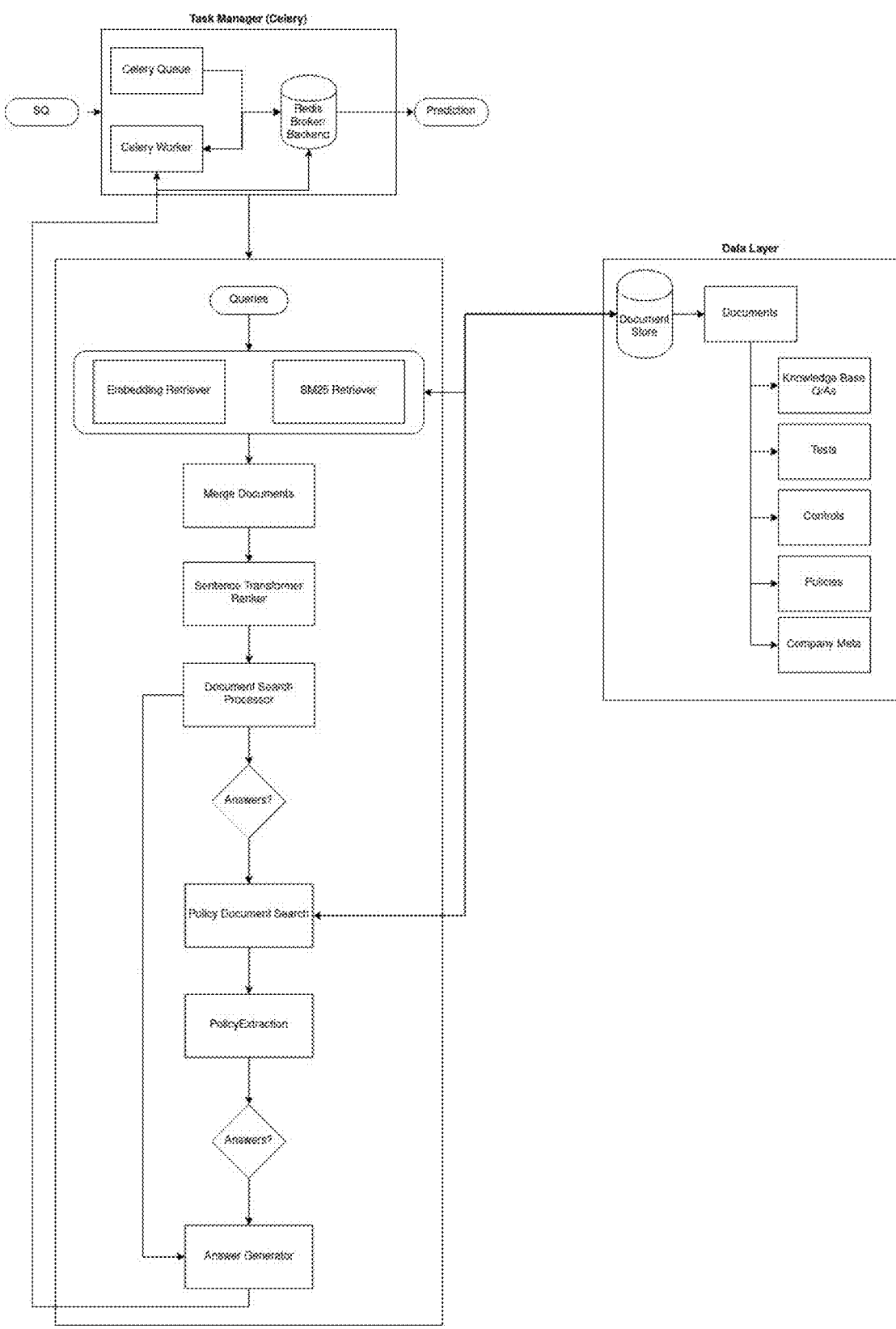
FIG. 28 illustrates an example schematic representation of an automated response generation machine learning pipeline in accordance with one or more embodiments of the present application.

In some embodiments, as generally illustrated in FIGS. 22, 23, and 28, S330 may function to route one or more queries to the automated response generation machine learning pipeline based on the digital tagging of the query-containing digital artifact in S320. For instance, in a non-limiting example, S330 may function to route the query stored in one or more of the sub-components (e.g., data entry fields, cells, etc.) tagged as "query-related" sub-components to the automated response generation machine learning pipeline as input. Similarly, in another second-limiting example, S330 may function to route the query stored in each of the sub-components (e.g., data entry fields, cells, etc.) tagged as a "query-related" sub-component to the automated response generation machine learning pipeline as input.

In some embodiments, S330 may function to identify one or more incomplete queries in the query-containing digital artifact that do not have corresponding answers in the query-containing digital artifact, and S330 may in turn function to route the one or more incomplete queries to the automated response generation machine learning pipeline to generate one or more responses for the incomplete queries. In some embodiments, S330 may function to identify incomplete queries based on corresponding empty or null answer sub-components (e.g., empty answer fields, empty answer cells, and/or the like). In such embodiments, the empty or null answer sub-components may represent missing or lacking answers to corresponding incomplete queries. In some such embodiments, incomplete queries may be referred to as incomplete query-answer sets, each incomplete query-answer set including a query and one or more corresponding empty or null answer values. In some embodiments, S330 may function to compute responses for one or more empty or null answer values for one or more incomplete query-answer sets in the query-containing digital artifact.

Searching a Query-Answer Repository

In a first implementation, based on receiving the one or more target queries as input, the automated response generation machine learning pipeline may function to search a query-answer repository using one or more search algorithms, strategies, and/or engines based on each of one or more queries received as input (as generally illustrated in FIGS. 22, 23, and 28). In some embodiments, the query-answer repository may store one or more query-answer sets familiar to or associated with the subscriber and may, optionally, be constructed based on one or more knowledge bases associated with the subscriber, one or more previously completed questionnaires associated with the subscriber, or the like. In some embodiments, the query-answer repository may include a historical corpus of completed query-containing digital artifacts, wherein each completed query-containing digital artifact may include one or more query-answer sets. It shall be noted that, in some embodiments, a subject query-answer set stored in the query-answer repository may comprise a distinct query (e.g., "Is there a program to manage the treatment of risk during assessments") and one or more subscriber-informed answers associated with the query including, but not limited to, a subscriber-informed binary answer associated with query (e.g., "Yes"), a subscriber-informed free-form answer associated with the query (e.g., "Yes, there is a process described in our risk assessment program."), or the like.

Constructing Embeddings-Based Search Queries

Furthermore, in some embodiments of the first implementation, S330 may function to construct one or more embedding search queries to search the query-answer repository for one or more semantically similar queries among the stored query-answer sets. In one example, each of the one or more embedding search queries constructed by S330 may correspond to a distinct query provided as input to the automated response generation machine learning pipeline. For instance, in a non-limiting example, if S330 provided one or more distinct queries as input to the automated response generation machine learning pipeline, the automated response generation machine learning pipeline, in turn, may function to construct a distinct embedding search query corresponding to each of the one or more queries provided as input. As referred to herein, in some embodiments an embedding-based search or a semantic search may sometimes be referred to as an embeddings-based or semantic search algorithm, an embeddings-based or semantic search strategy, and/or an embeddings-based or semantic search engine.

In some embodiments, an embedding search query constructed for a target query, when executed by S330, may function to search the query-answer repository for semantically similar queries that are within a threshold embedding distance of the target query and return one or more of the queries that are within the threshold embedding distance of the target query as a result to the embedding search query. Accordingly, in some embodiments, constructing an embedding search query for a target query may include computing or generating an embedding representation of the target query and, in turn, using the embedding representation of the target query as a search parameter in the embedding search query.

In some embodiments, S330 may function to compute the embedding representation of the target query via an embedding service or machine learning model. The embedding service or machine learning model, in some embodiments, may be an unsupervised language model (e.g., transformer model, BERT, or the like) that may be configured to receive one or more strings of text as input (e.g., a query) and generate, as output, an embedding representation of the one or strings of text received as input. Accordingly, in some embodiments, obtaining (or computing) the embedding representation of the target query may include providing the target query as input into the embedding service or machine learning model, and in turn, collecting, from the service or model, the outputted embedding representation generated from such input.

Executing the Embedding-Based Search Queries

Additionally, in some embodiments of the first implementation, S330 may function to execute the one or more embedding search queries constructed for the one or more queries provided as input to the automated response generation machine learning pipeline. In one example, based on executing a subject embedding search query, S330 may function to search the query-answer repository for queries that are within a threshold embedding distance of the embedding representation associated with the subject embedding search query and, in turn, return one or more of the queries that are within the threshold embedding distance of the embedding representation as a result to the subject embedding search query. In some embodiments, S330 may function to search for queries within the threshold embedding distance of the embedding representation associated with the subject embedding search query based on a nearest neighbor algorithm or computation. It shall be noted that, if no query is within the threshold distance of the target query, the subject embedding search query may return zero (o) queries as a result to the subject embedding search query.

In some embodiments, identifying queries in the query-answer repository that are within the threshold embedding distance may include computing a (e.g., Euclidean, cosine, etc.) distance between the embedding representation associated with the subject query and each of the embedding representations associated with the one or more queries defined in the query-answer repository in a vector space, and in turn, assessing the computed distance(s) (e.g., via a nearest neighbor computation or algorithm) to determine the one or more queries that are within threshold embedding distance. In such embodiments, each computed distance may represent or relate to a measure of semantic similarity between the subject query and the corresponding stored query of the query-answer repository. For instance, in a non-limiting example, if the query-answer repository includes n-number of queries, S330 may function to compute a (e.g., Euclidean, cosine, etc.) distance between the embedding representation associated with the subject query and each of the n-number of embedding representations of the queries in the query-answer repository. In turn, S330 may function to assess the computed distance(s) to determine which of the n-number of queries are within the threshold embedding distance and which of the n-number of queries are not within the threshold embedding distance. In some such embodiments, the threshold embedding distance may represent or relate to a threshold for evaluating semantic similarity between two queries (e.g., the subject query and a query of the query-answer repository).

In some embodiments, S330 may function to identify a subset of the n-number of queries that are within the threshold embedding distance as candidate queries. In some such embodiments, the subset may include m-number of candidate queries, where m is less than or equal to n. In some embodiments, the number of candidate queries m may be less than the number of queries that are within the threshold embedding distance. That is, in some embodiments, the subset of candidate queries may include only a limited number of the queries that are within the threshold embedding distance. In some such embodiments, the subset of candidate queries may include only the closest m-number of queries to the embedding representation associated with the subject query; that is, the m-number of queries with the lowest threshold embedding distance from the embedding representation associated with the subject query. In some such embodiments, S330 may function to execute a nearest neighbor search based on the m-nearest query neighbors in embeddings space (i.e., vector space).

In some embodiments, each query-answer set in the query-answer repository may be stored with its corresponding embedding representation, such that computing the distance between the embedding representation associated with the subject query and each of the embedding representations associated with the one or more queries defined in the query-answer repository may include retrieving embedding representations of the one or more queries from the query-answer repository. Additionally, or alternatively, in some embodiments, S330 may function to compute an embedding representation for one or more, or each, query-answer set in the query-answer repository using an embedding service or machine learning model, such as the embedding service or machine learning model configured to compute the embedding representation of the target query.

In some embodiments, as generally illustrated in FIG. 22, if the automated response generation machine learning pipeline determines that one or more queries in the query-answer repository are within the threshold embedding distance of a subject embedding search query constructed for a target query, S330 may function to return the answer(s) associated with the one or more queries (e.g., the "answer" of a query-answer set) as likely answers to the target query provided as input (e.g., the query for which the subject embedding search query was constructed). For instance, in a non-limiting example, if S330 identifies that one or more first and second distinct queries in the query-answer repository are within a threshold embedding distance of a subject embedding search query constructed for a first and second query provided as input to the automated response generation machine learning pipeline, respectively, S330 may, in turn, function to identify the answer(s) associated with the one or more first and second distinct queries in the query-answer repository, return the identified answer(s) associated with the one or more first distinct queries as likely answers to the first query provided as input to the automated response generation machine learning pipeline, and return the identified answer(s) associated with the one or more second distinct queries as likely answers to the second query provided as input to the automated response generation machine learning pipeline.

Alternatively, in some embodiments, if the automated response generation machine learning pipeline determines that one or more queries in the query-answer repository are within the threshold embedding distance of a subject embedding search query constructed for a target query, S330 may function to identify the one or more queries within the threshold embedding distance as one or more semantically similar queries. In some such embodiments, S330 may function to retrieve or return the one or more semantically similar queries for further processing in the automated response generation machine learning pipeline.

Configuring and Executing Syntactic Searches

Additionally, or alternatively, in some embodiments, S330 may function to configure and execute one or more syntactic or token-based searches to search the query-answer repository for one or more queries (or query-answer sets) among the stored query-answer sets that may be syntactically similar to the one or more input target queries based on token frequency. In some embodiments, a token may represent one or more words, one or more word fragments, or one or more text fragments (e.g., characters, strings, or the like) in a query or other textual file or data structure. In such embodiments, S330 may function to construct one or more token frequency search queries based on the one or more distinct queries input to the automated response generation machine learning pipeline. As referred to herein, in some embodiments a syntactic search may sometimes be referred to as a syntactic search algorithm, a syntactic search strategy, and/or a syntactic search engine. In one or more embodiments, the syntactic search may be implemented and/or executed based on a bag-of-words model and/or bag-of-words search, such that the search may be implement or executed to search the query-answer repository for query-answer sets in a search strategy that may disregard grammar and/or word order.

In one example, each of the one or more token frequency search queries constructed by S330 may correspond to a distinct target query provided as input to the automated response generation machine learning pipeline. For instance, in a non-limiting example, if S330 provided one or more distinct target queries as input to the automated response generation machine learning pipeline, the automated response generation machine learning pipeline, in turn, may function to construct a distinct token frequency search query corresponding to a distinct target query of the one or more target queries provided as input. In some embodiments, constructing the distinct token frequency search query may include segmenting the corresponding distinct target query into one or more tokens based on a tokenizing scheme or strategy. In such embodiments, the tokenizing scheme or strategy may relate to the scheme or strategy for segmenting a distinct input into tokens (e.g., segmenting an input query into separate words, separate word fragments, separate text fragments, or any other suitable token type). In one or more embodiments, each token frequency search query may include one or more tokens extracted from each corresponding target query based on the tokenizing scheme or strategy.

In some embodiments, a token frequency search query constructed for a target query, when executed by S330, may function to search the query-answer repository for similar stored queries based on token frequency that are within a threshold token frequency score and return one or more of the queries that are within the threshold token frequency score as a result to the token frequency search query. Accordingly, in some embodiments, S330 may function to compute a token frequency score (sometimes referred to herein as a syntactic score) for each stored query (or query-answer set) based on the tokens identified in the token frequency search query. In some such embodiments, the computed token frequency score may be computed based on a distinct token frequency ranking function (e.g., BM25 and/or any other suitable token frequency ranking function). Additionally, or alternatively, in some embodiments, S330 may function to compute a token frequency score based on one or more token-based or syntactic search parameters including, but not limited to, token frequency, inverse document frequency, document length, average document length, and/or any other suitable parameter for executing a syntactic or token-based search. In some such embodiments, the term "document" may refer to a query or query-answer set in the query-answer repository, and/or an artifact including one or more queries or query-answer sets in the query-answer repository.

In some embodiments, if the query-answer repository includes n-number of queries (or query-answer sets), S330 may function to compute a token frequency score for each of the n-number of queries (or query-answer sets) in the query-answer repository. In turn, S330 may function to assess the computed score(s) to determine which of the n-number of queries (or query-answer sets) are within the threshold token frequency score and which of the n-number of queries are not within the threshold token frequency score. In some such embodiments, the threshold token frequency score may represent or relate to a threshold for evaluating syntactic similarity between two queries (e.g., the subject query and a query of the query-answer repository).

In some embodiments, S330 may function to identify a subset of the n-number of queries (or query-answer sets) that are within the threshold token frequency score as candidate queries. In some such embodiments, the subset may include m-number of candidate queries, where m is less than or equal to n. In some embodiments, the number of candidate queries m may be less than the number of queries that are within the threshold token frequency score. That is, in some embodiments, the subset of candidate queries may include only a limited number of the queries that are within the threshold token frequency score. In some such embodiments, the subset of candidate queries may include only the m-number of queries with the highest token frequency scores.

In some embodiments, if the automated response generation machine learning pipeline determines that one or more stored queries in the query-answer repository are within the threshold token frequency score of a subject token frequency search query constructed for a target query, S330 may function to return the answer(s) associated with the one or more stored queries (e.g., the "answer" of a query-answer set) as likely answers to the target query provided as input (e.g., the query for which the subject token frequency search query was constructed). For instance, in a non-limiting example, if S330 identifies that one or more first and second distinct queries in the query-answer repository are within a threshold token frequency score constructed for a first and second query provided as input to the automated response generation machine learning pipeline, respectively, S330 may, in turn, function to identify the answer(s) associated with the one or more first and second distinct queries in the query-answer repository, return the identified answer(s)

associated with the one or more first distinct queries as likely answers to the first query provided as input to the automated response generation machine learning pipeline, and return the identified answer(s) associated with the one or more second distinct queries as likely answers to the second query provided as input to the automated response generation machine learning pipeline.

Alternatively, in some embodiments, if the automated response generation machine learning pipeline determines that one or more queries in the query-answer repository are within the threshold token frequency score of a subject token frequency search query constructed for a target query, S330 may function to identify the one or more queries within the threshold token frequency score as one or more syntactically similar queries. In some such embodiments, S330 may function to retrieve or return the one or more syntactically similar queries for further processing in the automated response generation machine learning pipeline.

Candidate Query Aggregation and Ranking

In one or more embodiments, as generally illustrated in FIG. 28, S330 may function to aggregate one or more candidate queries from a plurality of search algorithms, strategies, or engines. In such embodiments, the use of a plurality of search algorithms, strategies, or engines may provide technical advantages including, but not limited to, improving the quality of responses to the target query and increasing the diversity of candidate queries. In some preferred embodiments, S330 may function to aggregate one or more semantically similar queries from one or more embedding-based searches (e.g., one or more semantically similar query-answer sets from the query-answer repository) and one or more syntactically similar queries from one or more token-based searches (e.g., one or more syntactically similar query-answer sets from the query-answer repository) as candidate queries (sometimes referred to herein as candidate artifacts) in a merged, unprocessed query queue (sometimes referred to herein as a merged corpus or merged queue). In turn S330 may function to rank the aggregated queries in the unprocessed query queue based on relevance to the target query. It shall be noted that, in some embodiments, S330 may function to populate the unprocessed query queue with candidate queries from only one search algorithm, strategy, or engine.

It shall be noted that, in embodiments in which S330 may implement and/or execute a plurality of search algorithms, strategies, and/or engines, each search algorithm, strategy, and/or engine may be independently implemented and/or executed. In some such embodiments, each search algorithm, strategy, and/or engine may be implemented and/or executed in parallel configuration and/or in serial configuration. In some such embodiments, each search algorithm, strategy, and/or engine may be implemented and/or executed synchronously or asynchronously. At least one technical advantage of the parallel search architecture described in one or more embodiments of the present application include an accelerated access of one or more memory devices or databases contain likely candidates for addressing a deficient security digital artifact or the like. In that each of the parallel search engines with the parallel architecture are configured to consume or take in an input of a query and distinct reconfigure the query to perform a unique search technique by each search engine of the parallel search engines. This technical enables a diverse mechanism of searching since the query reconstruction techniques of each search engines creates unique search logic for data access, data discovery, and data retrievable from memory storage. Accordingly, executing the parallel search architecture enables a retrievable of a diverse set of data and/or digital artifacts from memory having a higher probability and higher likelihood of accuracy in attending or technically addressing a target query input to the system(s) executing the method 300 and the like. Thus, a speed of discovery of data (e.g., technical efficiency of dual search mechanisms) and retrieval from memory devices is achieved.

In some embodiments, S330 may function to aggregate the one or more semantically similar queries and the one or more syntactically similar queries as candidate queries in a queue for further processing. In some preferred embodiments, the aggregation of candidate queries from the query-answer repository based on a plurality of search algorithms, strategies, or engines (e.g., semantic similarity searching and syntactic similarity searching) may provide the technical advantage of enabling a retrieval of an improved diversity and quality of candidate queries (or query-answer sets) from which to generate a response inference to a target query.

In one or more embodiments, S330 may function to sort and/or rank the candidate queries for a target query based on relevance to the target query. In some embodiments, S330 may function to compute, calculate, or otherwise identify a relevance value (sometimes referred to herein as a relevance score) for each candidate query. In some such embodiments, S330 may implement one or more machine learning models (e.g., a sentence transformer model, a cross-encoder, and/or the like) or algorithms that may function to compute or calculate relevance values for each candidate query. Accordingly, in one or more embodiments, a trained or pre-trained machine learning model (such as a language or large language model) may function to receive each a pairing of target query and each candidate potential response or answer (e.g., candidate digital artifact) as an input and generate an inference that indicates a degree of relevance, degree of relationship, or a likelihood (e.g., probability or confidence) that the candidate potential response or answer is relevant for responding to or answering the target query. In such embodiments, the inference may include an output value (e.g. a value between o and i) that may be normalized to a relevance score, which may be between a predetermined range of any suitable alphabetic or numerical values (e.g., A-E, 0-100, etc.).

As a non-limiting example, S330 may function to implement a cross-encoder machine learning model that may function to receive, as input, a target query and one or more candidate queries. In turn, the cross-encoder machine learning model may compute and output a relevance value for each input candidate query. In such an example, the relevance value may be a numeric value (e.g., a value between zero and 1, and/or any other suitable range) that may indicate or otherwise relate to a relevance between the target query and a corresponding candidate query.

In one or more embodiments, S330 may function to sort or rank the candidate queries in the unprocessed query queue based on the computed relevance values for each candidate query. Additionally, in some embodiments, S330 may function to return or output a subset of prioritized candidate queries based on a relevance threshold. In such embodiments, the prioritized candidate queries may include one or more candidate queries from the unprocessed query queue that may have corresponding relevance values/scores that exceed the relevance threshold. In one or more embodiments, the relevance threshold preferably relates to a minimum relevance score value. As a non-limiting example, given a relevance threshold of 0.9, the prioritized candidate queries may include any candidate queries from the unprocessed query queue that have a computed relevance value above 0.9. It shall be noted that, in some embodiments, the relevance threshold may define an inclusive range (e.g., in the above non-limiting example, the prioritized candidate queries may include candidate queries that have a computed relevance value of 0.9 or above).

In some embodiments, S330 may function to identify one or more response inferences to the target query based on the relevance scores for each candidate query. In some such embodiments, S330 may function to identify response inferences from the subset of prioritized candidate queries. In such embodiments, S330 may function to return the answer(s) associated with the one or more prioritized candidate queries (e.g., the "answer" of a query-answer set) as likely answers to the target query provided as input. Alternatively, in some embodiments, S330 may function to identify a response inference to the target query based on the candidate query with the highest relevance value, and/or the candidate query with the highest relevance value that exceeds a relevance threshold. In such embodiments, S330 may function to return the answer(s) associated with the candidate query as likely answer(s) to the target query provided as input.

Routing a Target Query to a Generative Response Branch|Implementation #1

Furthermore, in some embodiments of the first implementation and as generally illustrated in FIG. 22, the automated response generation machine learning pipeline may include a generative response branch. In one example, S330 may function to selectively execute the generative response branch for one or more of the queries provided as input to the automated response generation machine learning pipeline. For instance, in a non-limiting example, S330 may function to execute the generative response branch for a target query provided as input to the automated response generation machine learning pipeline when S330 determines that the embedding search query constructed for the target query and/or the syntactic search executed for the target query returned less than a threshold number of likely (candidate) answers for the target query, and/or each of the returned likely (candidate) answers may have corresponding relevance scores or values less than a predetermined relevance threshold. Conversely, in some embodiments, S330 may function to forgo executing the generative response branch for a target query provided as input to the automated response generation machine learning pipeline when S330 determines that the embedding search query constructed for the target query and/or the syntactic search executed for the target query returned at least a threshold number of likely (candidate) answers for the target query.

In some embodiments of the first implementation, the generative response branch may function to generate a likely response to a target query via a generative model. In one example, the generative model may be or comprise a machine learning model that may be configured to generate a likely response or answer to a target query based on one or more sources of truth (e.g., subscriber policies, company documentation, knowledge bases, subscriber security controls, or the like). In some embodiments, such sources may include one or more digital policy artifacts (sometimes referred to herein as subscriber artifacts) that may include data relating to one or more subscriber policies, company documentation, knowledge bases, security controls, and/or the like. For instance, in some embodiments, the generative model may be or relate to a query-answering machine learning model, RA generator machine learning model, a text completions machine learning model, or a Seq2Seq generation machine learning model.

In some embodiments, generating a likely response to a target query via a generative model may include providing, to the generative model, an input comprising a corpus of one or more subscriber artifacts and the target query. Based on receiving the input, in some embodiments, the generative model may function to compute or generate the likely answer to the query based on the one or more subscriber artifacts included in the input.

In some embodiments, the corpus of one or more subscriber artifacts included in the model input may comprise one or more artifacts (e.g., documents) based on one or more governance, risk, and compliance (GRC) policies associated with the subscriber, one or more artifacts (e.g., documents) based on one or more security (cybersecurity) controls associated with the subscriber, and/or the like. It shall be noted that, in some embodiments, a GRC policy, as generally referred to herein, may relate to a distinct information technology (IT) objective and/or may include data (e.g., sentence data, paragraph data, text data, image data, etc.) documenting the tools and processes implemented, by the subscriber, for achieving the distinct information technology objective. In some embodiments, a GRC policy may relate to one or more governance aspects of a subscriber (e.g., leadership and/or organizational structure, strategic objectives, ethical standards, and/or the like), one or more risk management aspects of a subscriber (e.g., risk identification, risk assessment, risk mitigation, risk monitoring, risk review, and/or the like), and/or one or more compliance aspects of a subscriber (e.g., regulatory compliance, internal policies and internal policy compliance, stakeholder reporting, regulatory body reporting, transparency, and/or the like). Similarly, it shall also be noted that a cybersecurity control, as generally referred to herein, may relate to controls (e.g., safeguards) implemented by the subscriber to avoid, detect, or mitigate security risks to physical property, computer systems, and/or other assets associated with the subscriber.

Figure 24:
FIG. 24 illustrates an example governance, risk, and compliance (GRC) policy associated with a subscriber in accordance with one or more embodiments of the present application.
Figure 27:
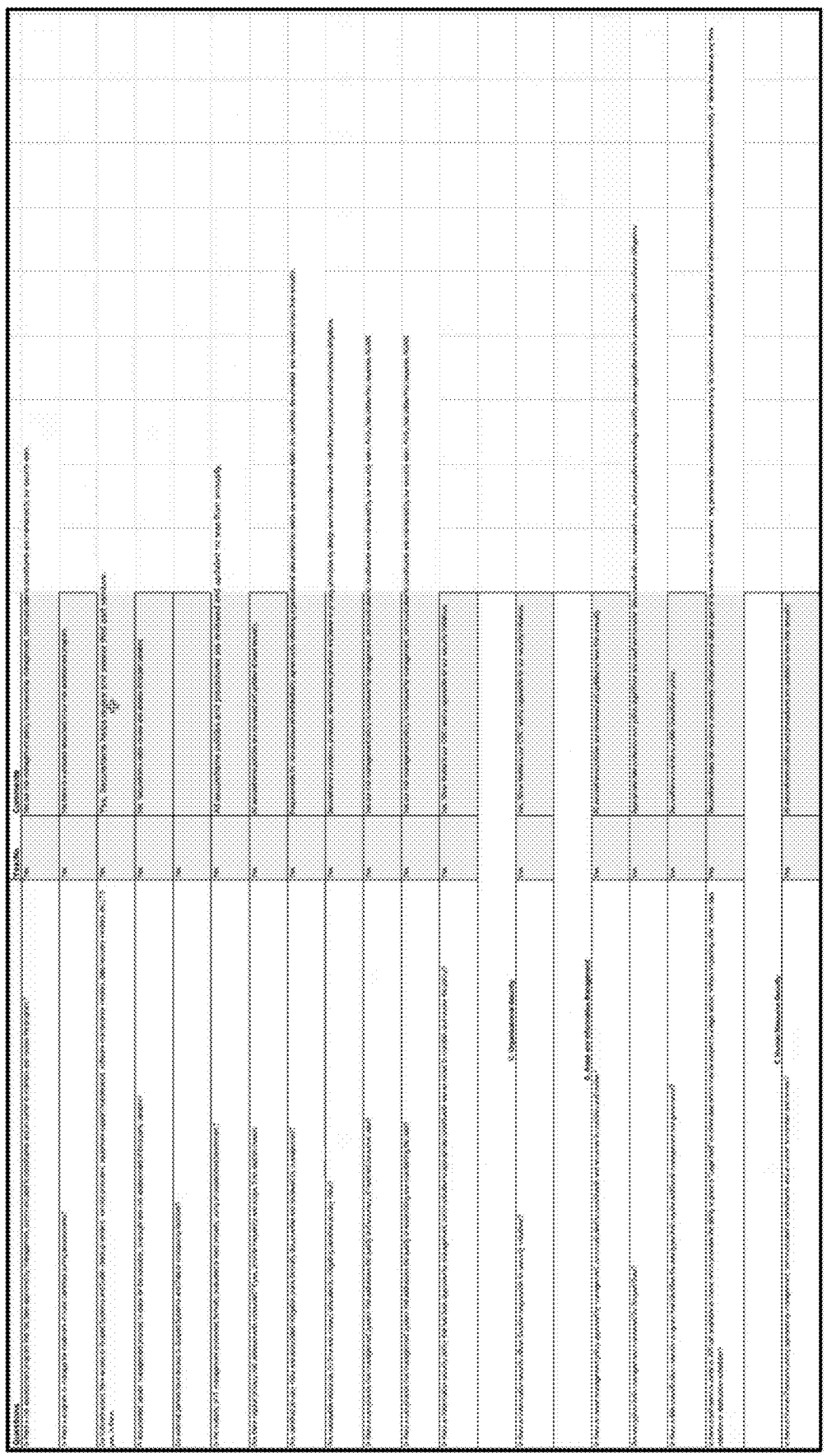
FIG. 27 illustrates an example result from installing response inferences into a query-containing digital artifact in accordance with one or more embodiments of the present application.

In some embodiments, the one or more GRC or other subscriber policies provided to the generative model as input may be encoded or segmented based on one or more encoding criteria. In one example and as generally illustrated in FIGS. 24-25, encoding a target GRC or other subscriber policy based on the one or more encoding criteria may include identifying one or more paragraphs existing in the target GRC or other subscriber policy (e.g., finding HTML paragraph tags) and, in turn, creating a distinct document or artifact for each of the one or more paragraphs. Accordingly, in some embodiments, the input provided to the generative model may comprise one or more documents or artifacts that each include a distinct paragraph extracted from a distinct GRC or other subscriber policy, such that each such document or artifact may include a policy segment. Such a document or artifact may sometimes be referred to herein as a policy segment, policy segment artifact, or document segment artifact.

Additionally, or alternatively, in a second example and as generally illustrated in FIGS. 24 and 26, encoding or segmenting a target GRC or other subscriber policy based on the one or more encoding criteria may include identifying one or more parent/child relationships existing in the target GRC or other subscriber policy (e.g., HTML header tags and associated paragraph data) and, in turn, creating a distinct document or artifact for each of the one or more parent/child relationships. Such a document or artifact may sometimes be referred to herein as a policy segment, policy segment artifact, or document segment artifact. Accordingly, in some embodiments, the input provided to the generative model may comprise one or more documents or artifacts that include a distinct parent/child relationship extracted from a distinct GRC or other subscriber policy.

Furthermore, in some embodiments of the first implementation and as generally illustrated in FIG. 22, the automated response generation pipeline may function to return the output of the generative model as a likely answer to the target query. In one example, the output of the generative model may include one or more sentences or paragraphs. For instance, in a non-limiting example, the output of the generative model computed for the target query "Is there a program to manage the treatment of risk identified during assessments?" may comprise textual data such as "Yes, our risk management policy is reviewed by management, communicated to constituents and maintained by our security team."

Extractive Response Branch Implementation

Additionally, or alternatively, in a second implementation and as generally illustrated in FIGS. 23 and 28, the generative response branch may function to compute a likely response to a target query via an extractive query-answering model. In one example of such embodiments, S330 may function to provide, to the extractive query-answering model, an input comprising a target query and a corpus of one or more GRC policies (and/or other subscriber policies and/or policy segments) associated with the target query. In turn, based on receiving the input, the extractive query-answering model may function to extract an answer to the target query from the corpus of one or more GRC policies (and/or other subscriber policies and/or policy segments).

For instance, in a non-limiting example, based on input comprising the target query "What assets does your Security Incident Response Plan cover?" and a corpus of GRC policies including the text "<h1><strong >Purpose and Scope</strong></h1><p>The Security Incident Response Plan provides a systematic incident response process for all Information Security Incident(s) (defined below) that affect any of {{company_name}}'s information technology systems, network, or data, including {{company_name}} data held or services provided by third-party vendors or other service providers. From time to time, {{company_name}} may update this policy and implement different levels of security controls for different information assets, based on risk and other considerations.</p><p>This plan applies to all {{company_name}} assets utilized by personnel acting on behalf of {{company_name}} or accessing its applications, infrastructure, systems or data. All personnel are required to read, accept and follow all {{company_name}} policies and plans.</p>," the extractive query-answering model may extract, from the corpus of GRC policies, an answer comprising "This plan applies to all {{company_name}} assets utilized by personnel acting on behalf of {{company_name}} or accessing its applications, infrastructure, systems or data."

Searching a GRC Policy Repository

In some embodiments, the one or more GRC policies included in the input provided to the extractive query-answering model may be GRC policies associated with the subscriber and/or may be GRC policies that S330 identified as likely relating to the target query. In one example and as generally illustrated in FIGS. 23 and 28, identifying one or more GRC policies likely relating to the target query may include searching a GRC policy repository based on the target query. The GRC policy repository, in some embodiments, may store one or more encoded or parsed GRC policy documents in association with a corresponding embedding value. For instance, in a non-limiting example, a subject GRC policy document stored within the GRC policy repository may include data based on the one or more encoding or segmenting schemes described above and, optionally, may be stored in association with an embedding value corresponding to the subject GRC policy. It shall be noted that, in one or more embodiments, S330 may additionally or alternatively function to identify one or more policy segments (in addition to, or as an alternative to, one or more GRC policies) as likely relating to the target query based on one or more encoding or segmenting schemes described above.

Figure 33:
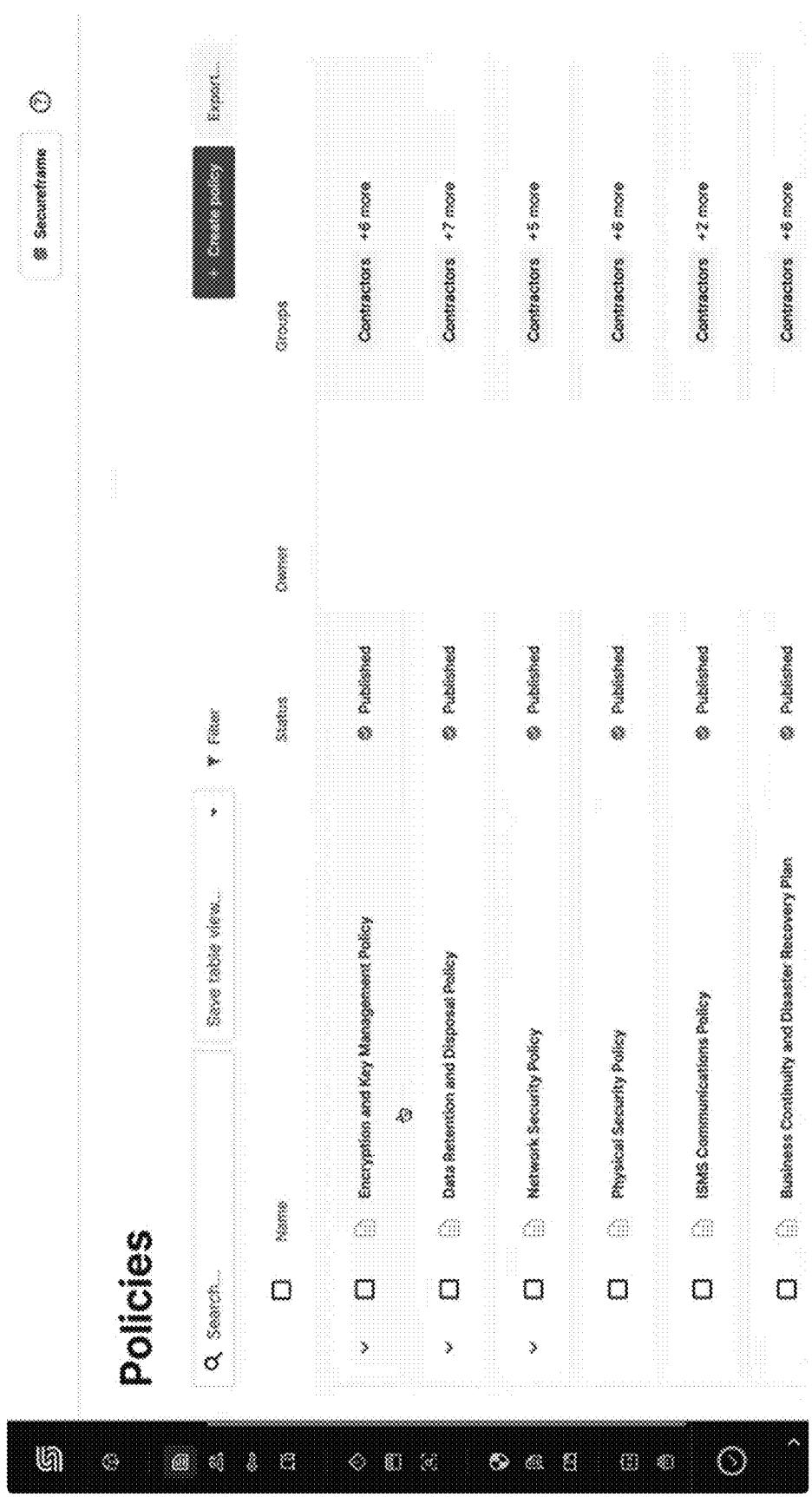

In one or more embodiments, a subscriber or user may create, edit, manage, and/or otherwise configure one or more subscriber policies or policy artifacts in the policy repository via a subscriber policy management user interface, as generally illustrated in FIG. 33.

Constructing a GRC Policy Embedding Search Query

In some embodiments, searching the GRC policy repository for one or more policies (or policy segments) related to the target query may include constructing a GRC policy embedding search query for the target query. In some embodiments, the GRC policy embedding search query, when executed by S330, may function to search the GRC policy repository for one or more policies that are within a threshold embedding distance of the target query and return one or more of the GRC policies that are within the threshold embedding distance of the target query as a result to the embedding search query. Accordingly, in some embodiments, constructing the GRC policy embedding search query for the target query may include computing or generating an embedding representation of the target query and, in turn, using the embedding representation of the target query as a search parameter in the embedding search query.

In some embodiments, S330 may function to compute the embedding representation of the target query via an embedding service or machine learning model. The embedding service or machine learning model, in some embodiments, may be an unsupervised language model (e.g., transformer model, BERT, or the like) that may be configured to receive one or more strings of text as input (e.g., a query) and generate, as output, an embedding representation of the one or strings of text received as input. Accordingly, in some embodiments, obtaining (or computing) the embedding representation of the target query may include providing the target query as input into the embedding service or machine learning model, and in turn, collecting, from the service or model, the outputted embedding representation generated from such input.

Executing the GRC Policy Embedding Search Query

Additionally, in some embodiments of the second implementation, S330 may function to execute the GRC policy embedding search query constructed for the target query. In one example, based on executing the GRC policy embedding search query, S330 may function to search the GRC policy repository for GRC policies (or policy segments) that are within a threshold embedding distance of the embedding representation associated with the GRC policy embedding search query and, in turn, return one or more of the GRC policies (or policy segments) that are within the threshold embedding distance of the embedding representation as a result to the GRC policy embedding search query. In some embodiments, S330 may function to search for policies within the threshold embedding distance of the embedding representation associated with the GRC policy embedding search query based on a nearest neighbor algorithm or computation. It shall be noted that, if no GRC policy or policy segment is within the threshold distance of the target query, the GRC policy embedding search query may return zero (0) queries as a result to the GRC policy embedding search query.

In some embodiments, identifying policies (or policy segments) in the GRC policy repository that are within the threshold embedding distance may include computing a (e.g., Euclidean, cosine, etc.) distance in a vector space between the embedding representation associated with the subject query and each of the one or more policies (or policy segments) defined in the GRC repository and, in turn, assessing the computed distance(s) to determine the one or more policies (or policy segments) that are within threshold embedding distance. For instance, in a non-limiting example, if the GRC policy repository includes n-number of GRC policies, S330 may function to compute a (e.g., Euclidean, cosine, etc.) distance between the embedding representation associated with the GRC policy embedding search query and each of the n-number of GRC policies (or policy segments). In turn, S330 may function to assess the computed distance(s) to determine which of the n-number of GRC policies (or policy segments) are within the threshold embedding distance and which of the n-number of GRC policies are not within the threshold embedding distance.

In some embodiments, S330 may function to identify a subset of the n-number of GRC policies (or policy segments) that are within the threshold embedding distance as candidate policies. In some such embodiments, the subset may include m-number of candidate policies, where m is less than or equal to n. In some embodiments, the number of candidate policies m maybe less than the number of policies that are within the threshold embedding distance. That is, in some embodiments, the subset of candidate policies may include only a limited number of the policies that are within the threshold embedding distance. In some such embodiments, the subset of candidate policies may include only the closest m-number of policies to the embedding representation associated with the GRC policy embedding search query; that is, the m-number of policies with the lowest threshold embedding distance from the embedding representation associated with the GRC policy embedding search query. In some such embodiments, S330 may function to execute a nearest neighbor search based on the m-nearest policy neighbors in embeddings space (i.e., vector space).

In some embodiments, S330 may function to extract a candidate response to the target input query from each of the policies (or policy segments) identified as within the threshold embedding distance, or, alternatively, each of the subset of candidate policies (or policy segments). In some such embodiments, S330 may function to implement an extractive query-answering machine learning model or algorithm that may receive, as input, each of the identified candidate policies (or each of the subset of candidate policies), and the extractive query-answering machine learning model or algorithm may in turn output, as output, one or more candidate responses or candidate answers to the target query for each input candidate policy. In some such embodiments, the extractive machine learning model or algorithm may include a transformer model and/or the like.

In some embodiments, as generally illustrated in FIGS. 23 and 28, S330 may function to return the output (e.g., inference) of the extractive query-answering model as a likely answer to the target query. In one example, S330 may function to return the output of the extractive query-answering model as a likely answer to the target query if S330 determines that the output (e.g., inference) of the extractive query-answering model was computed with at least a threshold amount of confidence. Conversely, in some embodiments and as generally illustrated in FIGS. 23 and 28, S330 may function to forgo returning the output of the extractive query-answering model as a likely answer to the target query if S330 determines that the extractive query-answering model computed its output with less than a threshold amount of confidence.

Computing a Response Inference via a Generative Model

In some embodiments, based on determining that the extract query-answering model produced an output (e.g., inference) with less than a threshold amount of confidence or relevance, S330 may function to compute one or more likely or candidate responses to the target query via a generative model. In one example, the generative model may be or comprise a machine learning model that may be configured to generate a likely response or answer to a target query based on one or more sources of truth (e.g., subscriber policies, company documentation, knowledge bases, subscriber security controls, or the like). For instance, the generative model may be or relate to a RA generator machine learning model, a completions machine learning model, and/or a Seq2Seq generation machine learning model. In some embodiments, the generative model may include a large language model and/or the like. In some embodiments, the generative model may include a third party generative model service.

In some embodiments, generating a likely response to a target query via a generative model may include providing, to the generative model, an input comprising a corpus of one or more subscriber artifacts and the target query. In one example, based on receiving the input, the generative model may function to compute or generate the likely answer to the query based on the one or more subscriber artifacts included in the input. It shall be noted that, in some embodiments, the corpus of one or more subscriber artifacts included in the input provided to the generative model may be similar to, or the same as, the corpus of subscriber artifacts included in the input provided to the extractive query-answering model. In some embodiments, the corpus of one or more subscriber artifacts may include one or more (or all) policies and/or policy segments identified as candidate policies or candidate policy segments (or a subset thereof) by a policy embedding search query (e.g., GRC policy embedding search query) executed to provide input for the extractive query-answering model. Additionally, or alternatively, in some embodiments the corpus of one or more subscriber artifacts may include one or more (or all) query-answer sets, queries, query artifacts, and/or the like that may have been retrieved from an embedding-based search (e.g., a semantic search), a token-based search (e.g., a syntactic search), a merged corpus of queries, a historical corpus of queries, and/or other query-answer sets, queries, query artifacts, and/or the like that may have been retrieved in an embedding-based search, a token-based search, a parallel search, and/or the like as described above.

In one or more embodiments, the corpus of one or more subscriber artifacts may be parsed into a subscriber artifact prompt input that may be provided as input to the generative model. In one or more embodiments, the generative model may function to provide, as output, one or more response inferences to the target query based on the subscriber artifact prompt input and/or the corpus of one or more subscriber artifacts. Additionally, or alternatively, in some embodiments, the generative model may provide, as output, a response generation failure token that may function to indicate that the generative model failed to generate a viable response inference.

Furthermore, in some embodiments of the second implementation and as generally illustrated in FIGS. 23 and 28, the automated response generation pipeline may function to return the output of the generative model as a likely answer to the target query. In one example, the output of the generative model may include one or more sentences or paragraphs. For instance, in a non-limiting example, the output of the generative model computed for the target query "Is there a program to manage the treatment of risk identified during assessments?" may comprise textual data such as "Yes, our risk management policy is reviewed by management, communicated to constituents and maintained by our security team."

3.40 Surfacing the Response Inferences

S340, which includes surfacing the response inferences, may function to display (or return) the one or more response inferences computed in S330 for subscriber confirmation or modification. In some embodiments, surfacing the response inferences in the manner described herein may enable a subscriber to efficiently assess the system-generated response(s) computed for the one or more queries underpinning the query-containing digital artifact and/or may enable the subscriber to perform any necessary modifications or adaptations to the system-generated response inferences (e.g., add text data to the response inferences, remove text data from the response inferences, insert text data into the response inferences, or the like).

Response Discovery and Insights User Interface

In some embodiments, surfacing the response inferences computed in S330 may include displaying the response inferences in a response discovery and insights graphical user interface (GUI). The response discovery and insights user interface, as generally illustrated in FIGS. 16 and 30-32, may include a query-answer matrix or a tabular query-answer data structure comprising one or more rows and one or more columns. In some embodiments, the one or more columns of the query-answer matrix, as generally illustrated in FIG. 16, may include a first column that is configured to store one or more queries along a first dimension of the query-answer matrix, a second column that is configured to store one or more binary answers computed for one or more target queries along a second dimension of the query-answer data structure, a third column that is configured to store one or more free-form answers computed for one or more target queries along a third dimension of the query-answer data structure, a fourth column that is configured to configured to store one or more selectable user interface elements along a fourth dimension of the query-answer data structure that, when selected, causes S340 to perform a respective action associated with a target query, and/or the like.

In some embodiments, the one or more rows of the query-answer matrix may correspond or relate to a distinct query in the query-containing digital artifact (identified in S310). For instance, in a non-limiting example and as generally illustrated in FIG. 16, the query-answer matrix includes—among others—a first row corresponding to a first query in the query-containing digital artifact (e.g., "Is there a risk assessment program that has been approved by management, communicated to constituents and an owner to maintain and review the program?") and a second row corresponding to a second query in the query-containing digital artifact (e.g., "Is there a program to manage treatment of risks identified during assessments?").

In some embodiments, as also generally illustrated in FIG. 16, a respective row in the query-answer matrix may store the subject query corresponding to the respective row in a position or location (e.g., the cell or sub-component of the query-answer matrix) that intersects the first column, the binary response inference computed for the subject query in a position or location (e.g., the cell or sub-component of the query-answer matrix) that intersects the second column, the free form response inference computed for the subject query in a position or location (e.g., the cell or sub-component of the query-answer matrix) that intersects the third column, the one or more selectable user interface elements for performing actions associated with the subject query in a position or location that that intersects the fourth column, and/or the like.

It shall be noted that, in some embodiments and as generally illustrated in FIG. 16, a respective row of the query-answer matrix may store the binary response inference, the free form response inference, and/or other content associated with the respective row in an editable user interface element that enables S340 to obtain or receive input, from a subscriber, for modifying/adapting such inferences or content (e.g., text input field). Furthermore, it shall also be noted that, in some embodiments, the one or more selectable user interface elements stored in a respective row may at least include a first selectable user interface element that, when selected, finalizes or confirms the one or more response inference(s) stored in the respective row.

Additionally, or alternatively, in some embodiments, a response inference confidence value may be displayed in the user interface for each response inference, whereby each response inference confidence value may relate to a confidence or probability that the corresponding response inference is a valid or correct response. In some such embodiments, the response confidence value may be a text value or text label that may represent a relative confidence in a text string or text format (e.g., "low," "medium," "high," and/or the like). Alternatively, in some embodiments, the response confidence value may be a numeric value that may represent a computed confidence metric for the corresponding response inference as a percentage (e.g., a value from 0% to 100% inclusive), as a fractional value (e.g., a value from 0/10 to 10/10 inclusive, and/or the like), and/or any other suitable numeric value for representing a computed confidence value. In some embodiments, the response inference confidence value may relate to and/or be derived from a relevance value or score computed for each response inference (as described in 3.30). In some embodiments, S340 may function to automatically populate each response inference position or location in the query-answer matrix with the computed response inference for the corresponding query with the highest confidence value.

In some embodiments, the one or more selectable user interface elements stored in a respective row may include one or more response inference selectable list control objects (e.g., a dropdown list, a list of radio buttons, a list of checkboxes, and/or the like) that may function to select from one or more response inferences for one or more (or each) row of the displayed query-answer matrix. In some embodiments, each response inference selectable list control object may be populated with one or more response inferences computed by S330. In some such embodiments, a visual arrangement and/or sorting order of the response inferences in the response inference selectable list control object may be determined by the response inference confidence value associated with each response inference. As a non-limiting example, a response inference selectable list control object may include a plurality of response inferences arranged in a vertical list arranged top-to-bottom according to the respective response inference confidence value of each response inference (e.g., highest-to-lowest confidence value).

It should be understood by one of ordinary skill in the art that the above examples and embodiments are not intended to be limiting and that the response inferences computed for the one or more queries included in the query-containing digital artifact maybe returned or displayed to a subscriber in other ways without departing from the scope of the invention(s) contemplated herein.

3.50 Installing the Response Inferences into the Query-Containing Digital Artifact S350, which includes installing the response inferences, may function to use the one or more response inferences computed in S330 and, optionally, finalized in S340 to automatically answer the one or more queries included in the query-containing digital artifact. It shall be noted that, in some embodiments installing the (finalized) response inferences in the manner described herein may enable a system or service implementing the method 300 to deliver a completed query-containing digital artifact (e.g., questionnaire) to a subscriber.

In some embodiments, as generally illustrated in FIG. 4, installing the one or more response inferences into the query-containing digital artifact may include identifying a sub-component (e.g., data entry field, cell) associated with each of the one or more response inferences and, in turn, installing a subject response inference into the sub-component (e.g., cell) to which it corresponds. It shall be noted that, in some embodiments, installing the one or more response inferences into the corresponding sub-components may enable a system or service implementing the method 300 to return or deliver the completed query-containing digital artifact in a same or similar format as the originally received, incomplete query-containing digital artifact (e.g., the query-containing digital artifact sourced by S310). Accordingly, in some embodiments, S350 may function to finalize a transformation of an incomplete query-containing digital artifact (e.g., a query-containing digital artifact including one or more empty or null response values for one or more queries) into a complete query-containing digital artifact (e.g., a query-containing digital artifact including filled or non-empty response values for each query). Alternatively, in some embodiments, S350 may function to finalize a transformation of an incomplete query-containing digital artifact into a partially complete query-containing digital artifact (e.g., a query-containing digital artifact including filled or non-empty response values for one or more queries and one or more empty or null response values for one or more queries).

In some embodiments, S330 may function to identify the sub-component (e.g., cell) corresponding to each of the one or subject response inferences based on the tagging of the query-containing digital artifact in S320. In one example, identifying the sub-component (e.g., cell) corresponding to a free-form response inference computed for a subject query may include locating the row or sub-component storing the subject query in the query-containing digital artifact and, in turn, identifying the sub-component digitally tagged as a "free-form answer" sub-component within the same row of the subject query. Similarly, in a second non-limiting example, identifying the sub-component corresponding to a binary response inference computed for a subject query may include locating the sub-component or row storing the subject query in the query-containing digital artifact and, in turn, locating the sub-component digitally tagged as a "binary answer" sub-component within the same row as the subject query.

In some embodiments, as also generally illustrated in FIG. 4, installing the response inference into a corresponding sub-component may include installing text associated with the response inference into the corresponding sub-component. For instance, in a non-limiting example, if the response inference computed for a target query corresponds to a sub-component (e.g., data entry field, cell) at Row B, Column C and comprises the text "Yes, there is a process described in our risk assessment program.", S330 may function install the text of the response inference at the sub-component at Row B, Column C.

In some embodiments, installing the response inference into a corresponding sub-component and/or finalizing the query-containing digital artifact may be based on receiving a user confirmation or verification of the query-containing digital artifact via the response discovery and insights GUI (as described in 3.40). In some such embodiments, the response discovery and insights GUI may function to display one or more selectable control interface objects (e.g., a button and/or the like) that may be selected by a user to confirm or verify that the query-containing digital artifact may be finalized.

Figure 29:
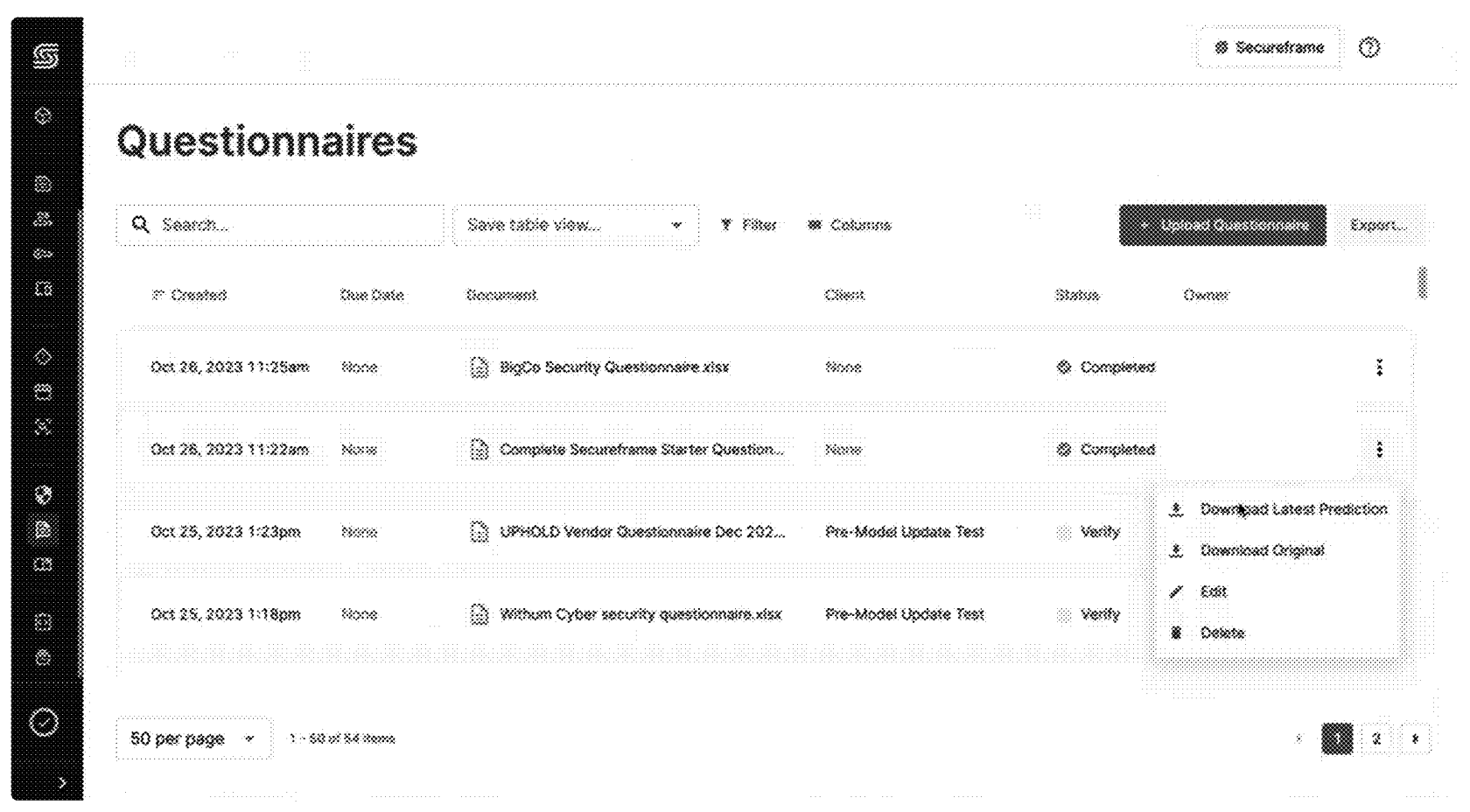

In some embodiments, a finalized or completed query-containing digital artifact may be returned to the subscriber upon finalization. As generally illustrated in FIG. 29, a query-containing digital artifact management user interface may include one or more selectable control objects (e.g., a button and/or the like) that may function to receive user input that may activate and/or enable an electronic delivery or transmission (e.g., downloading from a remote server) of the finalized query-containing digital artifact. Additionally, or alternatively, a finalized query-containing digital artifact may be uploaded or otherwise stored in the query-answer repository (as discussed in 3.30 above) and/or other subscriber-based repositories upon finalization. Such storing of the finalized query-containing digital artifacts in the query-answer repository may preferably facilitate the generation of responses or response inferences for other subsequently-input query-containing digital artifacts in subsequent iterations of S330 and/or method 300.

4. Computer-Implemented Method and Computer Program Product

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for machine learning- informed augmentation of incomplete query-embedded digital artifacts, the method comprising:
at a remote security response generation service being implemented by a distributed network of computers:
receiving, via a user interface, a target security query;
executing, by one or more processors, a security query search based on the target security query, wherein executing the security query search includes:
(i) implementing a plurality of parallel search engines, the plurality of parallel search engines including a first search engine and a second search engine distinct from the first search engine;
(ii) retrieving a first corpus of candidate digital artifacts via the first search engine based on an input of the target security query;
(iii) retrieving a second corpus of candidate digital artifacts via the second search engine based on an input of the target security query;
constructing a merged corpus of candidate digital artifacts, the merged corpus comprising at least a subset of the first corpus of candidate digital artifacts and at least a subset of the second corpus of candidate digital artifacts;
providing, as input, each candidate digital artifact of the merged corpus of candidate digital artifacts to a sentence transformer machine learning model to compute a relevance score for each candidate digital artifact in the merged corpus; and
returning, via the user interface, a subset of prioritized candidate digital artifacts from the merged corpus of candidate digital artifacts that each have a corresponding relevance score that satisfies a relevance threshold.

2. The method according to claim 1, further comprising:
if less than a threshold quantity of candidate digital artifacts in the merged corpus have corresponding relevance scores that satisfy the relevance threshold:
retrieving one or more digital policy artifacts from a digital policy artifact repository based on one or more computed embedding distances, wherein each of the one or more computed embedding distances is based on a distance in a vector space between a computed embedding of each of the one or more digital policy artifacts and a computed embedding of the target security query;
extracting one or more candidate responses to the target security query based on providing, as input, the target security query and each of the one or more retrieved digital policy artifacts to a response extraction model; and
surfacing a subset of the one or more candidate responses via the graphical user interface.

3. The method according to claim 1, further comprising:
if less than a threshold quantity of candidate digital artifacts in the merged corpus have corresponding relevance scores that satisfy the relevance threshold:
constructing, by the one or more processors, a security query prompt artifact comprising the target security query and one or more candidate digital artifacts from the merged corpus of candidate digital artifacts;
providing, as input, the security query prompt artifact to a language generative machine learning model; and
returning one or more candidate responses output by the language generative machine learning model via the graphical user interface.

4. The method according to claim 1, wherein:
implementing the plurality of parallel search engines includes implementing the first search engine, wherein implementing the first search engine includes:
constructing, by the one or more processors, a security query embedding based on an input of the target security query to an embeddings model,
computing an artifact embedding distance for each of one or more security digital artifacts, wherein computing the artifact embedding distance comprises computing a distance in a vector space between the security query embedding and an embedding of a corresponding security digital artifact of the one or more security digital artifacts, and
retrieving a number n of security digital artifacts as the first corpus of candidate digital artifacts, wherein each of the n number of security digital artifacts has a corresponding artifact embedding distance that satisfies an embedding distance threshold.

5. The method according to claim 1, wherein:
implementing the plurality of parallel search engines includes implementing the second search engine, wherein implementing the second search engine includes:
extracting one or more tokens from the target security query based on a tokenizing scheme,
computing a token frequency score for each security query artifact in a historical corpus of security query artifacts based on a token frequency for each token extracted from the target security query, and
retrieving a number m of security query artifacts of the historical corpus of security query artifacts as the first corpus of candidate digital artifacts, wherein each of the m number of security query artifacts has a corresponding token frequency score that satisfies a token frequency threshold.

6. The method according to claim 1, wherein
the first corpus of candidate digital artifacts and the second corpus of candidate digital artifacts are returned from a historical corpus of completed query-embedded digital artifacts.

7. The method according to claim 1, further comprising:
at the remote security response generation service:
receiving, via the user interface, a user verification of a distinct prioritized candidate digital artifact of the subset of prioritized candidate digital artifacts for the target security query; and
identifying the distinct prioritized candidate digital artifact as a confirmed response digital artifact for the target security query.

8. The method according to claim 1, further comprising:
at the remote security response generation service:
sorting the candidate digital artifacts in the merged corpus of candidate digital artifacts in a sorting order based on the computed relevance score for each candidate digital artifact;
wherein the subset of prioritized candidate digital artifacts is returned in a sorted list based on the sorting order.

9. The method according to claim 1, wherein:
the target security query is one of a plurality of security queries of a query-embedded digital artifact, wherein the query-embedded digital artifact includes one or more incomplete query-answer sets that each include a security query and at least one empty answer value.

10. The method according to claim 9, further comprising:
at the remote security response generation service:
automatically appending query tag metadata to each security query of the query-embedded digital artifact.

11. The method according to claim 1, wherein:
the relevance score for each candidate digital artifact indicates a degree of likelihood that the candidate digital artifact is relevant for responding to the target query, and the relevance threshold comprises a minimum relevance score value.

12. A computer-implemented method for machine learning-informed augmentation of incomplete query-embedded digital artifacts, the method comprising:
at a remote security response generation service implemented by a distributed network of computers:
receiving, via a user interface, a target security query;
executing, by one or more processors, a security query search based on the target security query, wherein executing the security query search includes retrieving a first corpus of candidate digital artifacts from a first search engine based on an input of the target security query;
constructing an unprocessed queue of candidate digital artifacts, the unprocessed queue including at least a subset of the first corpus of candidate digital artifacts;
providing, as input, each candidate digital artifact of the unprocessed queue of candidate digital artifacts to a sentence transformer machine learning model to generate a relevance score for each candidate digital artifact in the unprocessed queue;
generating one or more candidate responses to the target security query based on a subset of prioritized candidate digital artifacts, the subset of prioritized candidate digital artifacts including one or more candidate digital artifacts from the unprocessed queue that each have a corresponding relevance score that satisfies a relevance threshold; and
surfacing, via the user interface, the one or more candidate responses to the target security query.

13. The method according to claim 12, wherein:
executing the security query search includes retrieving a second corpus of candidate digital artifacts from a second search engine distinct from the first search engine; and
constructing the unprocessed queue of candidate digital artifacts includes aggregating each candidate digital artifact of the first corpus of candidate digital artifacts and each candidate digital artifact of the second corpus of candidate digital artifacts in the unprocessed queue.

14. The method according to claim 12, wherein:
executing the security query search includes implementing the first search engine, where implementing the first search engine includes:
constructing a security query embedding based on an input of the target security query to an embeddings model,
computing an artifact embedding distance for each of one or more security digital artifacts, wherein computing the artifact embedding distance comprises computing a distance in a vector space between the security query embedding and an embedding of a corresponding security digital artifact of the one or more security digital artifacts, and
retrieving a number n of security digital artifacts as the first corpus of candidate digital artifacts, wherein each of the n number of security digital artifacts has a corresponding artifact embedding distance that satisfies an embedding distance threshold.

15. The method according to claim 12, further comprising:
if less than a threshold quantity of candidate digital artifacts in the unprocessed queue have corresponding relevance scores that satisfy the relevance threshold:
retrieving one or more digital policy artifacts from a digital policy artifact repository based on one or more computed embedding distances, wherein each of the one or more computed embedding distances is based on a distance in a vector space between a computed embedding of each of the one or more digital policy artifacts and a computed embedding of the target security query; and
extracting the one or more candidate responses to the target security query based on providing, as input, the target security query and each of the one or more retrieved digital policy artifacts to a response extraction model.

16. The method according to claim 12, wherein:
if less than a threshold quantity of candidate digital artifacts in the unprocessed queue have corresponding relevance scores that satisfy the relevance threshold:
constructing a security query prompt artifact comprising the target security query and one or more candidate digital artifacts from the unprocessed queue of candidate digital artifacts; and
generating the one or more candidate responses based on output by a language generative machine learning model, wherein the output of the language generative model is based on providing, as input, the security query prompt artifact to the language generative machine learning model.

17. The method according to claim 12, wherein the target security query is one of a plurality of security queries of a query-embedded digital artifact, wherein the query-embedded digital artifact includes one or more incomplete query-answer sets that each include a security query and at least one empty answer value.

18. A computer-implemented method for machine learning-informed augmentation of an incomplete query-embedded digital artifact, the method comprising:
at a remote security response generation service implemented by a distributed network of computers:
receiving, via a user interface, the incomplete query-embedded digital artifact;
identifying one or more incomplete governance, risk, and compliance (GRC) query-answer sets in the incomplete query-embedded digital artifact, wherein each incomplete GRC query-answer set includes a GRC query and at least one empty answer value;
computing, by one or more processors, one or more candidate response values for each of the at least one empty answer values for each incomplete GRC query-answer set, wherein computing the one or more candidate response values for each incomplete GRC query-answer set includes:
(i) retrieving a first corpus of candidate historical query-answer sets based on executing a first search algorithm with an input of the GRC query of the incomplete GRC query-answer set and a second corpus of candidate historical query-answer sets based on executing a second search algorithm with an input of the GRC query of the incomplete GRC query-answer set, wherein the second search algorithm is distinct from the first search algorithm, (ii) constructing a merged corpus of candidate historical query- answer sets, the merged corpus comprising at least a subset of the first corpus of candidate historical query-answer sets and at least a subset of the second corpus of candidate historical query-answer sets, (iii) providing, as input, each candidate historical query-answer set of the merged corpus of candidate historical query-answer sets to a sentence transformer machine learning model to compute a relevance score for each candidate historical query-answer set in the merged corpus, and (iv) generating the one or more candidate response values based on a subset of prioritized candidate historical query-answer sets from the merged corpus that each have a corresponding relevance score that satisfies a relevance threshold; and surfacing the one or more candidate response values for each of the at least one empty answer values for each incomplete GRC query-answer set via the user interface.

19. The method according to claim 18, further comprising:

transforming the incomplete query-embedded digital artifact to a completed query-embedded digital artifact based on automatically populating each of the at least one empty answer values of each incomplete GRC query-answer set with one of the one or more candidate response values computed for the corresponding at least one empty answer value.

20. The method according to claim 19, further comprising:

storing the completed query-embedded digital artifact in a historical query-embedded digital artifact repository.

* * * * *